(12) United States Patent
Jeong

(10) Patent No.: US 9,311,439 B2
(45) Date of Patent: Apr. 12, 2016

(54) METHODS OF PATTERNING WAFERS USING SELF-ALIGNED DOUBLE PATTERNING PROCESSES

(71) Applicant: Moon-Gyu Jeong, Gwangmyeong-si (KR)

(72) Inventor: Moon-Gyu Jeong, Gwangmyeong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/336,155

(22) Filed: Jul. 21, 2014

(65) Prior Publication Data

US 2015/0193570 A1    Jul. 9, 2015

(30) Foreign Application Priority Data

Jan. 9, 2014    (KR) .................. 10-2014-0003073

(51) Int. Cl.
| | |
|---|---|
| *G06F 17/50* | (2006.01) |
| *H01L 21/027* | (2006.01) |
| *G03F 7/20* | (2006.01) |

(52) U.S. Cl.
CPC .......... *G06F 17/5068* (2013.01); *H01L 21/027* (2013.01); *G03F 7/70466* (2013.01); *G06F 17/5081* (2013.01); *G06F 2217/12* (2013.01); *H01L 21/0274* (2013.01); *H01L 2223/54426* (2013.01); *Y02P 90/265* (2015.11)

(58) Field of Classification Search
CPC ............ G03F 7/70466; G06F 17/5081; G06F 2217/12; H01L 21/0274; H01L 2223/54426; H01L 21/027
USPC .......................................... 716/51, 53, 54, 55
See application file for complete search history.

(56) References Cited

U.S. PATENT DOCUMENTS

| | | | | |
|---|---|---|---|---|
| 5,753,417 | A * | 5/1998 | Ulrich | G03F 7/2022 430/312 |
| 6,233,044 | B1 * | 5/2001 | Brueck | G03F 7/2022 355/67 |
| 6,518,180 | B1 * | 2/2003 | Fukuda | G03F 1/144 257/E21.577 |
| 6,670,080 | B2 * | 12/2003 | Sugita | G03F 1/144 430/30 |
| 6,800,428 | B2 * | 10/2004 | Okada | G03F 7/70466 430/30 |
| 6,981,240 | B2 * | 12/2005 | Pierrat | H01L 27/0207 430/5 |
| 7,419,909 | B2 * | 9/2008 | Kim | H01L 21/0337 257/E21.038 |
| 7,536,671 | B2 * | 5/2009 | Shin | H01L 21/0337 378/35 |
| 7,539,970 | B2 * | 5/2009 | Jung | G03F 1/144 378/35 |
| 7,615,496 | B2 * | 11/2009 | Lee | H01L 21/0337 257/E21.038 |
| 7,873,935 | B2 * | 1/2011 | Jung | G03F 1/144 378/34 |

(Continued)

FOREIGN PATENT DOCUMENTS

| | | |
|---|---|---|
| JP | 2008-235462 | 10/2008 |
| KR | 1020090066925 A | 6/2009 |

*Primary Examiner* — Helen Rossoshek
(74) *Attorney, Agent, or Firm* — Myers Bigel & Sibley, P.A.

(57) ABSTRACT

Provided are methods of forming patterns of wafers using self-aligned double patterning processes. The methods include preparing an initial layout having a first design pattern, a second design pattern, and a third design pattern disposed between the first design pattern and the second design pattern, extracting a first sub-layout including the first design pattern and a second sub-layout including the second design pattern from the initial layout using a computer, forming a first modified sub-layout including a first modified design pattern obtained by modifying the first design pattern of the first sub-layout using the computer, generating a modified layout including the first modified sub-layout and the second sub-layout using the computer, and performing a double patterning process using the modified layout.

12 Claims, 61 Drawing Sheets

(56) References Cited

U.S. PATENT DOCUMENTS

| | | | | |
|---|---|---|---|---|
| 7,926,001 B2* | 4/2011 | Pierrat | | H01L 21/3086 430/5 |
| 8,043,925 B2* | 10/2011 | Yang | | H01L 21/0337 257/304 |
| 8,187,967 B2* | 5/2012 | Lee | | H01L 27/11519 438/618 |
| 8,219,939 B2* | 7/2012 | Schultz | | G03F 1/144 716/50 |
| 8,312,394 B2* | 11/2012 | Ban | | G06F 17/5068 716/50 |
| 8,486,818 B2* | 7/2013 | Yeom | | H01L 21/76224 257/E21.546 |
| 8,782,575 B1* | 7/2014 | Hsu | | G06F 17/5081 716/112 |
| 8,799,834 B1* | 8/2014 | Chen | | G06F 17/5081 430/30 |
| 8,871,104 B2* | 10/2014 | Park | | H01L 21/0337 216/41 |
| 8,889,560 B2* | 11/2014 | Chung | | H01L 21/0337 438/702 |
| 8,898,606 B1* | 11/2014 | Abou Ghaida | | G06F 17/5081 716/111 |
| 8,986,911 B2* | 3/2015 | Yoo | | G03F 7/20 430/311 |
| 2005/0240895 A1* | 10/2005 | Smith | | G03F 7/705 700/121 |
| 2008/0097729 A1* | 4/2008 | Jung | | G03F 1/144 703/1 |
| 2008/0305642 A1* | 12/2008 | Lee | | H01L 21/0332 438/703 |
| 2009/0081563 A1* | 3/2009 | Wang | | G03F 1/14 430/5 |
| 2009/0321931 A1* | 12/2009 | Lee | | H01L 21/0337 257/741 |
| 2010/0187611 A1* | 7/2010 | Schiwon | | G03F 1/14 257/369 |
| 2011/0018146 A1 | 1/2011 | Pierrat | | |
| 2011/0159691 A1* | 6/2011 | Shih | | H01L 21/0337 438/689 |
| 2011/0300711 A1* | 12/2011 | Martin | | G03F 7/40 438/696 |
| 2012/0076393 A1* | 3/2012 | Ivanchenko | | G03F 7/70466 382/145 |
| 2012/0137261 A1* | 5/2012 | Ban | | G06F 17/5068 716/52 |
| 2012/0219917 A1* | 8/2012 | McGuinness | | G03F 7/70466 430/312 |
| 2013/0207108 A1* | 8/2013 | Mehta | | H01J 21/31144 257/48 |
| 2014/0245239 A1* | 8/2014 | Du | | G03F 1/70 716/52 |
| 2014/0320627 A1* | 10/2014 | Miyamoto | | G03F 7/70633 348/80 |
| 2014/0349236 A1* | 11/2014 | Chen | | H01L 21/0332 430/311 |

\* cited by examiner

FIG. 1A
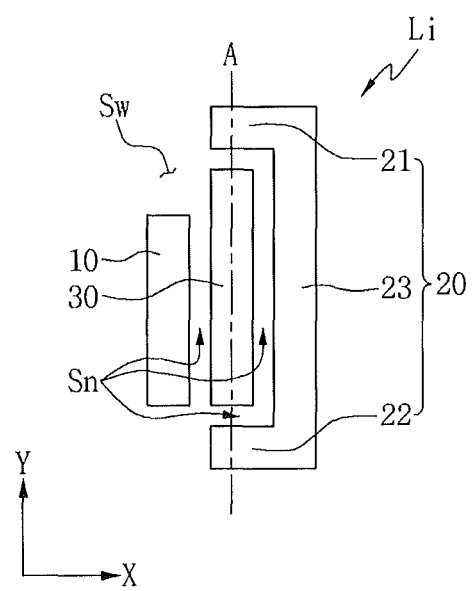
FIG. 1B
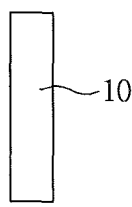
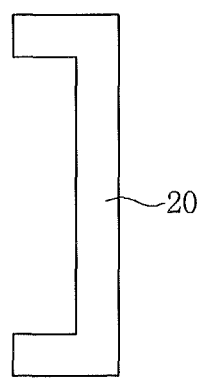
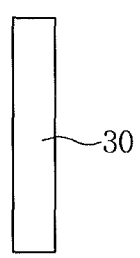

FIG. 3C
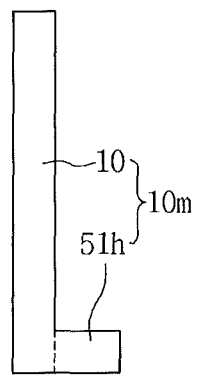
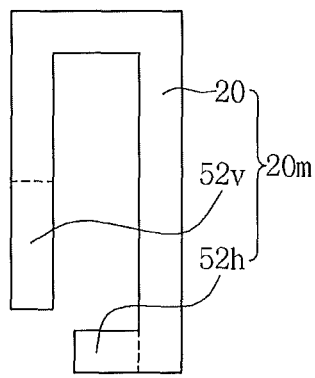
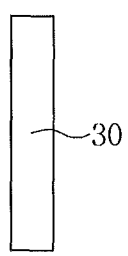
FIG. 3D
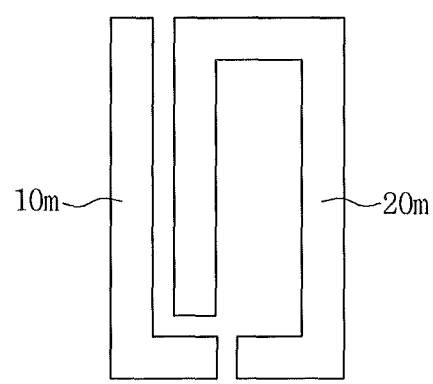

(A)　　　　　(B)

(A)　　　　　(B)

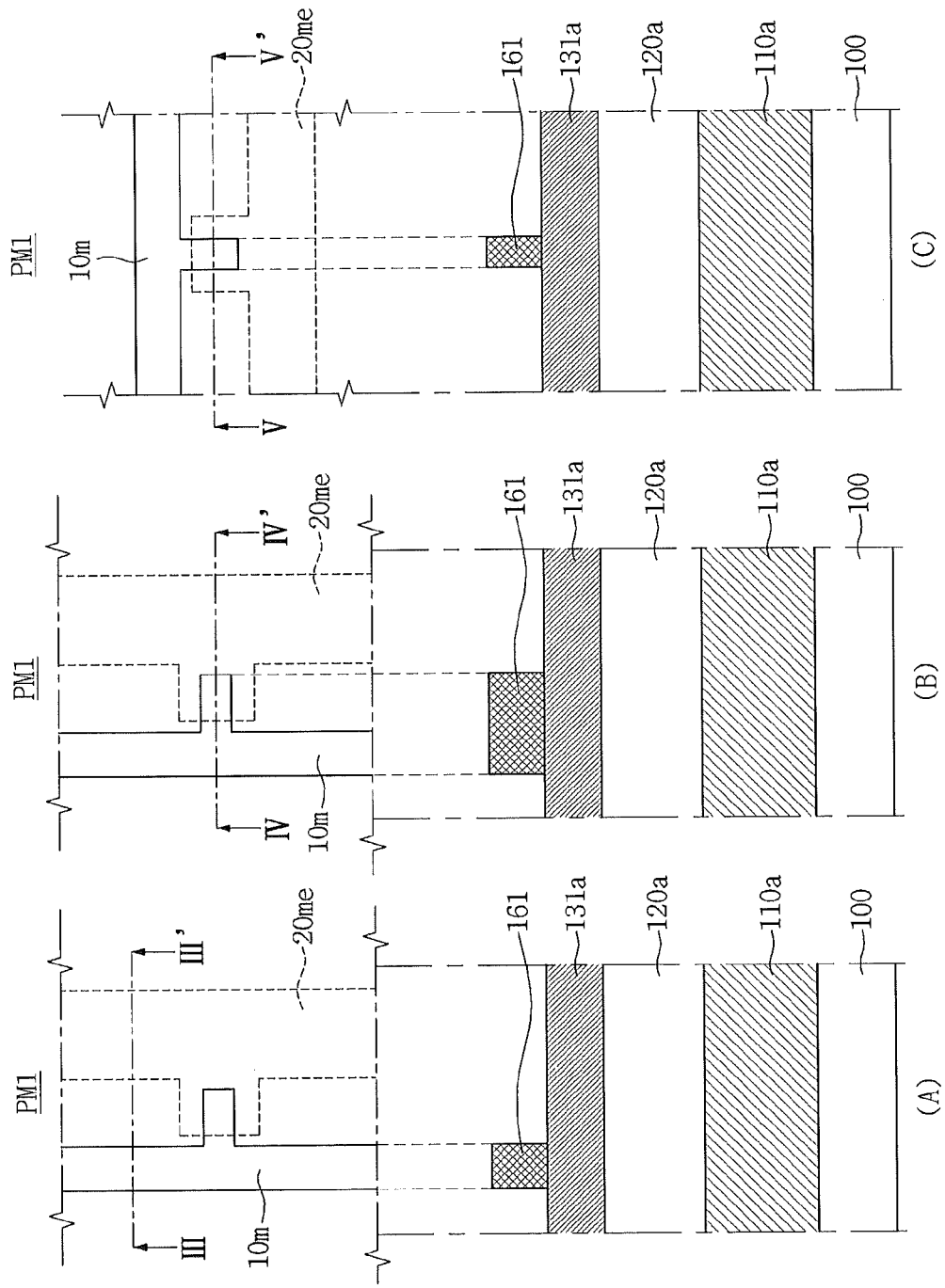

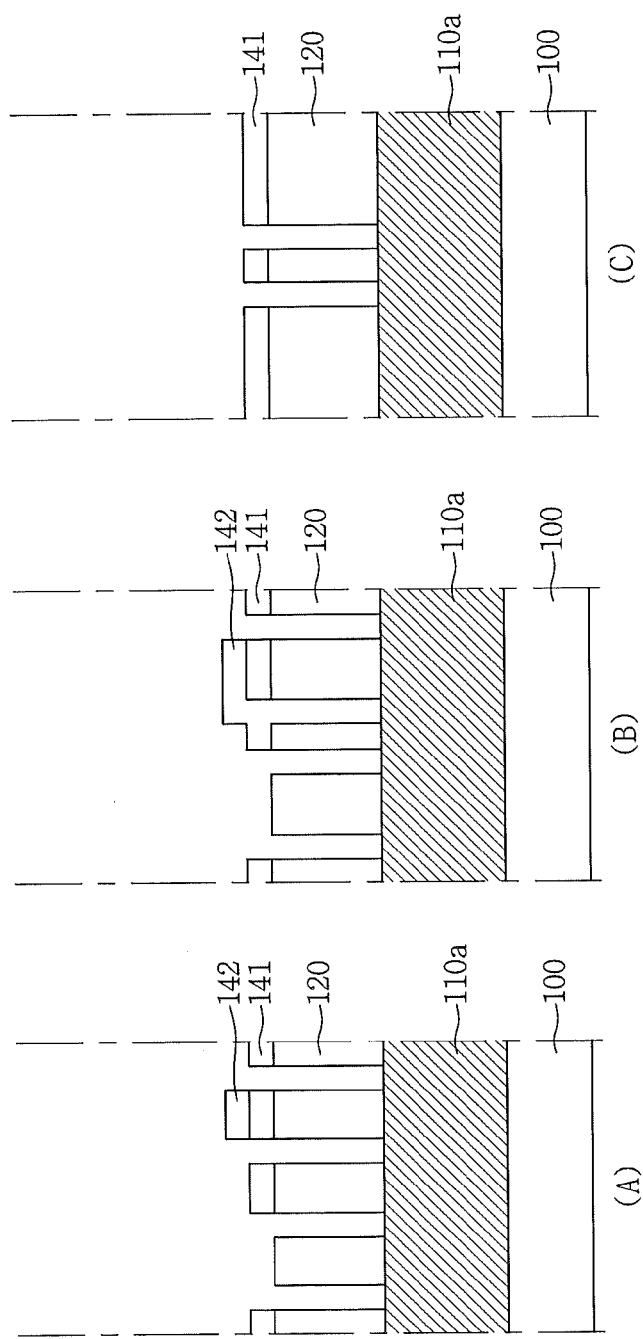

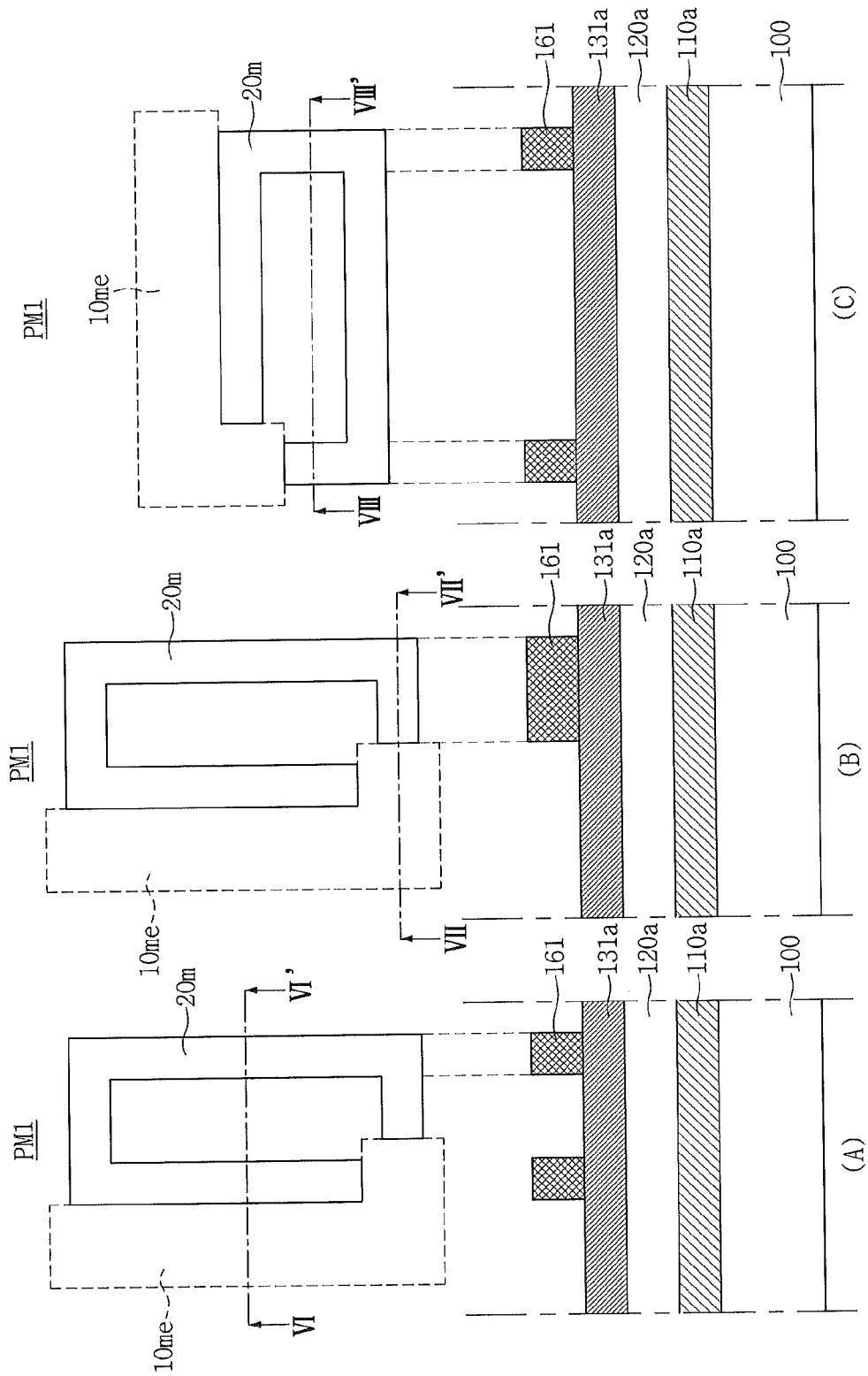

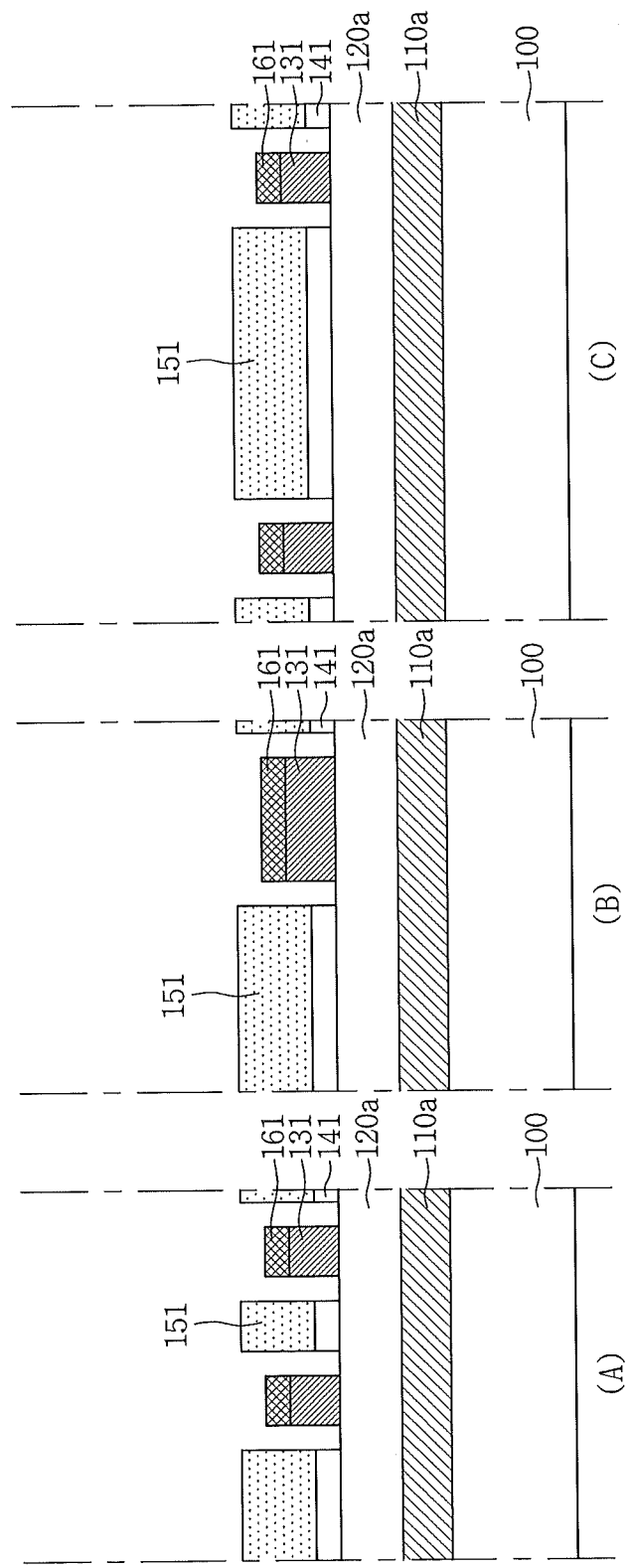

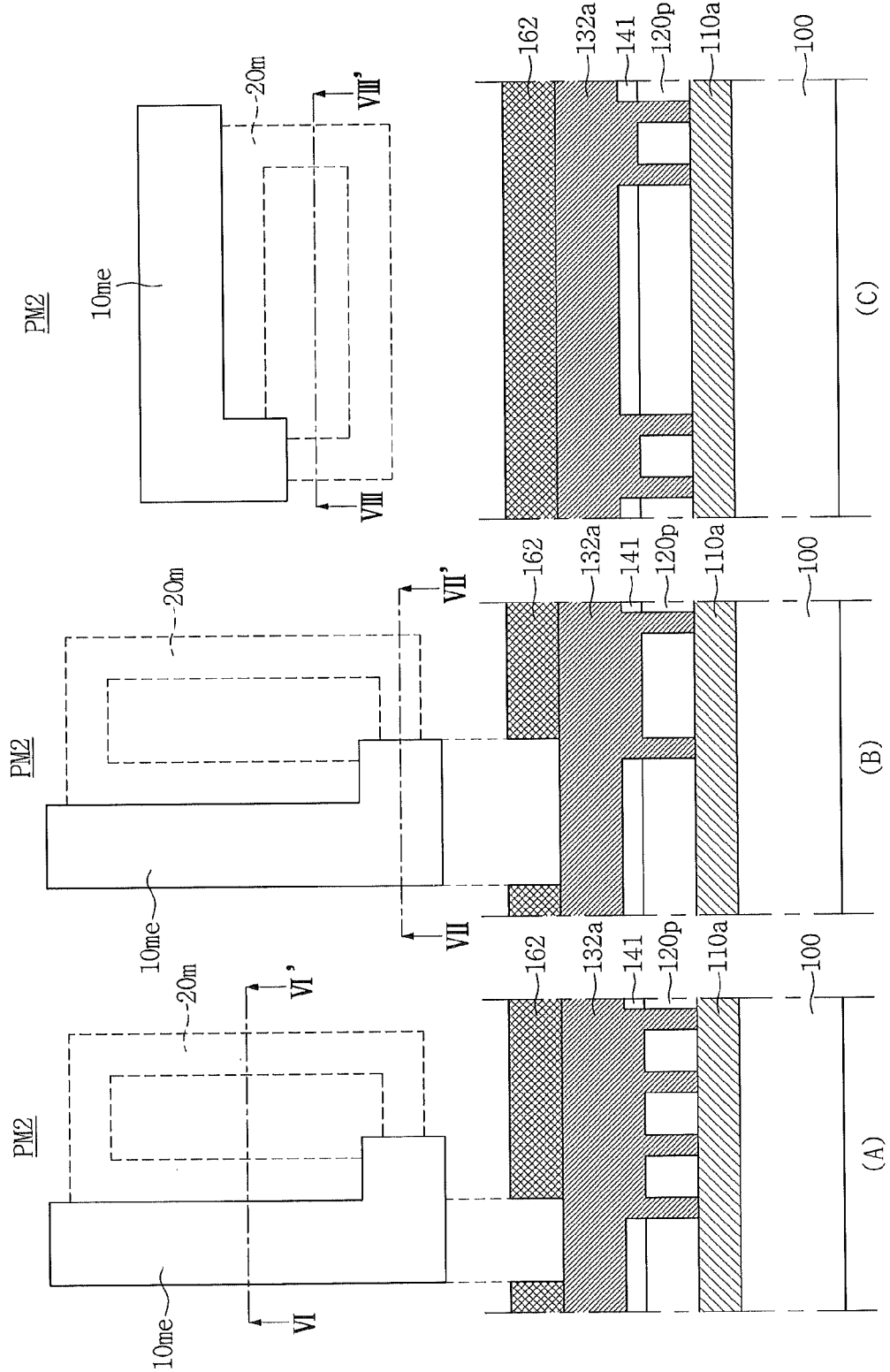

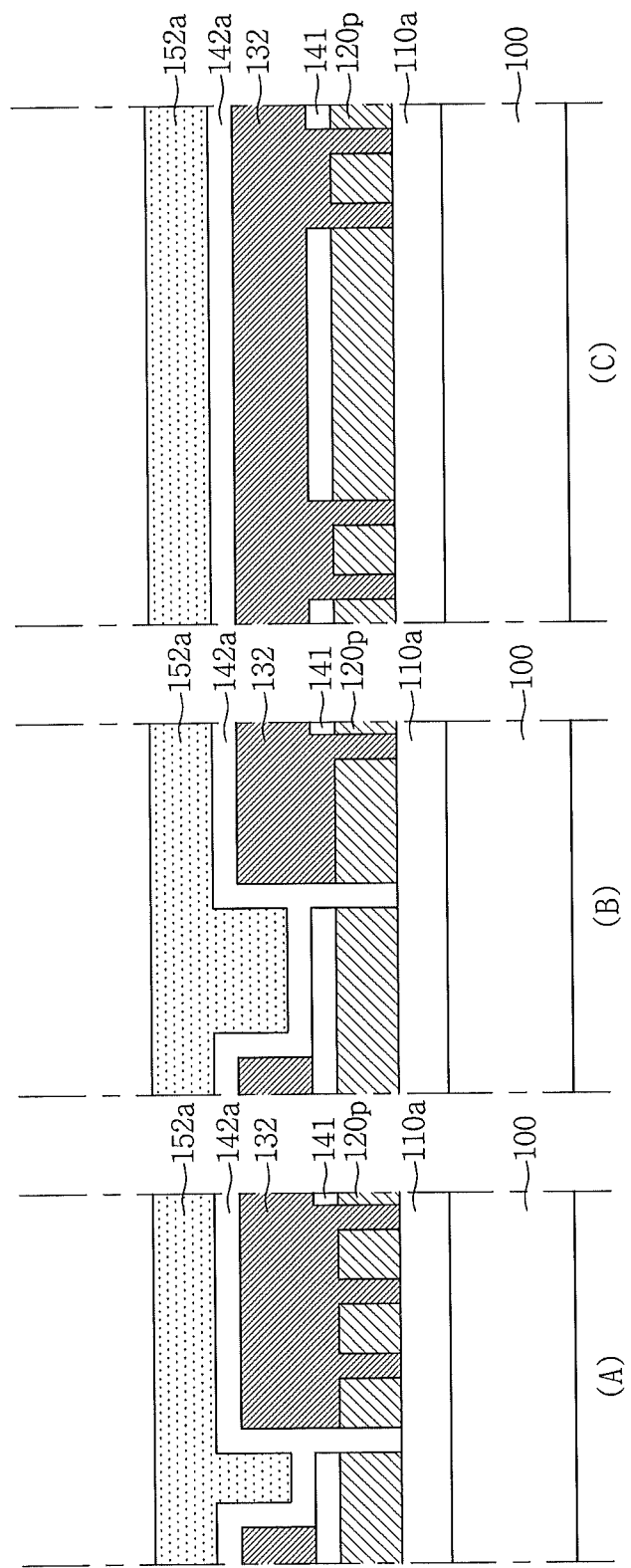

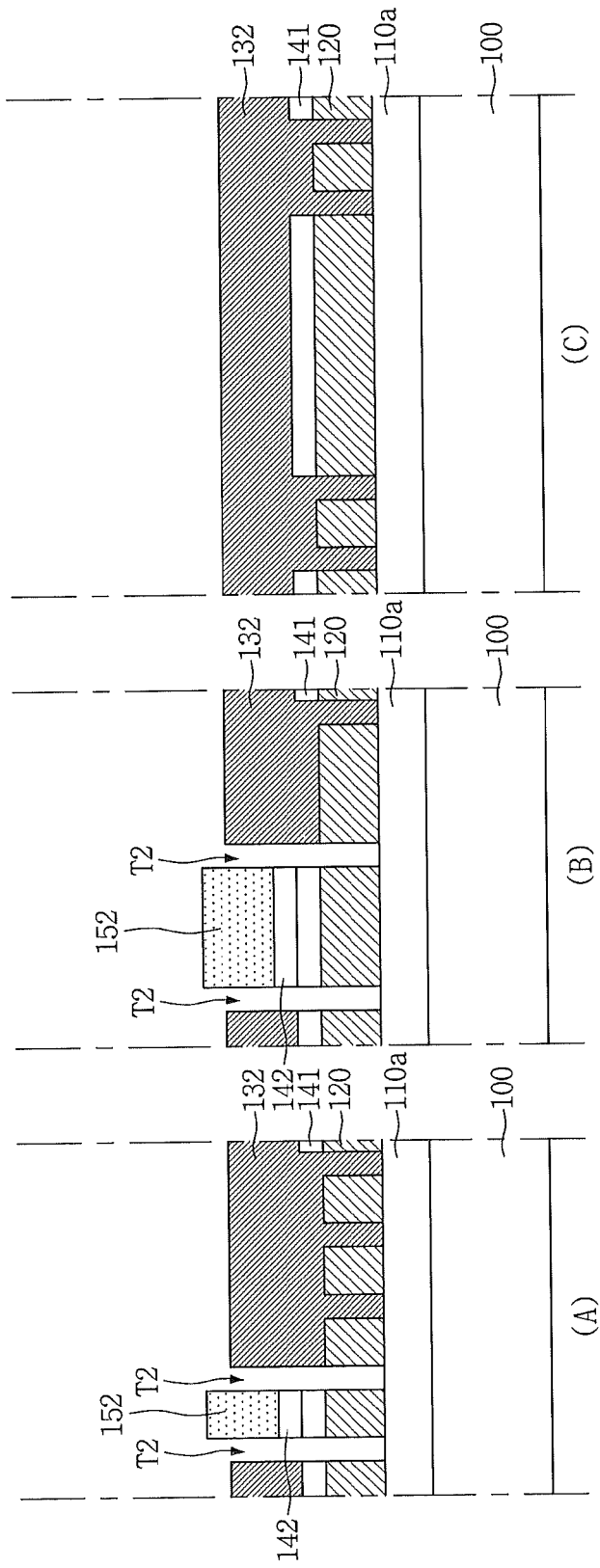

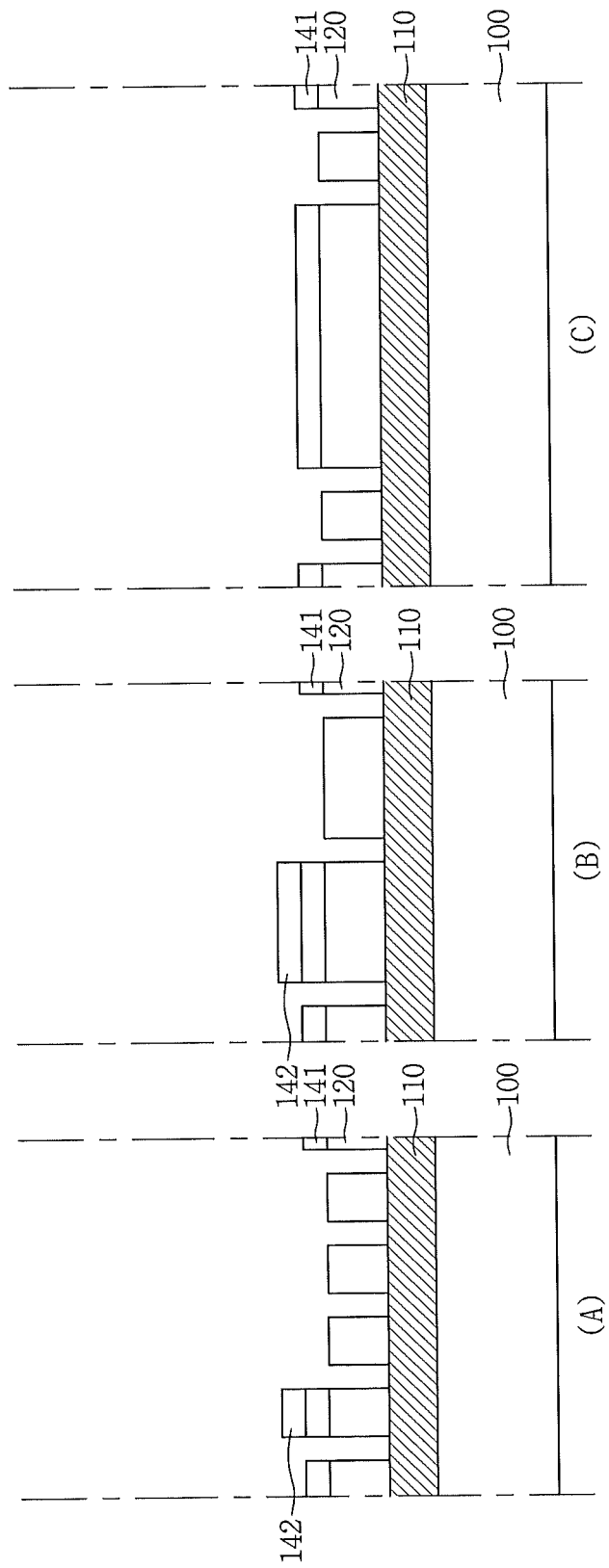

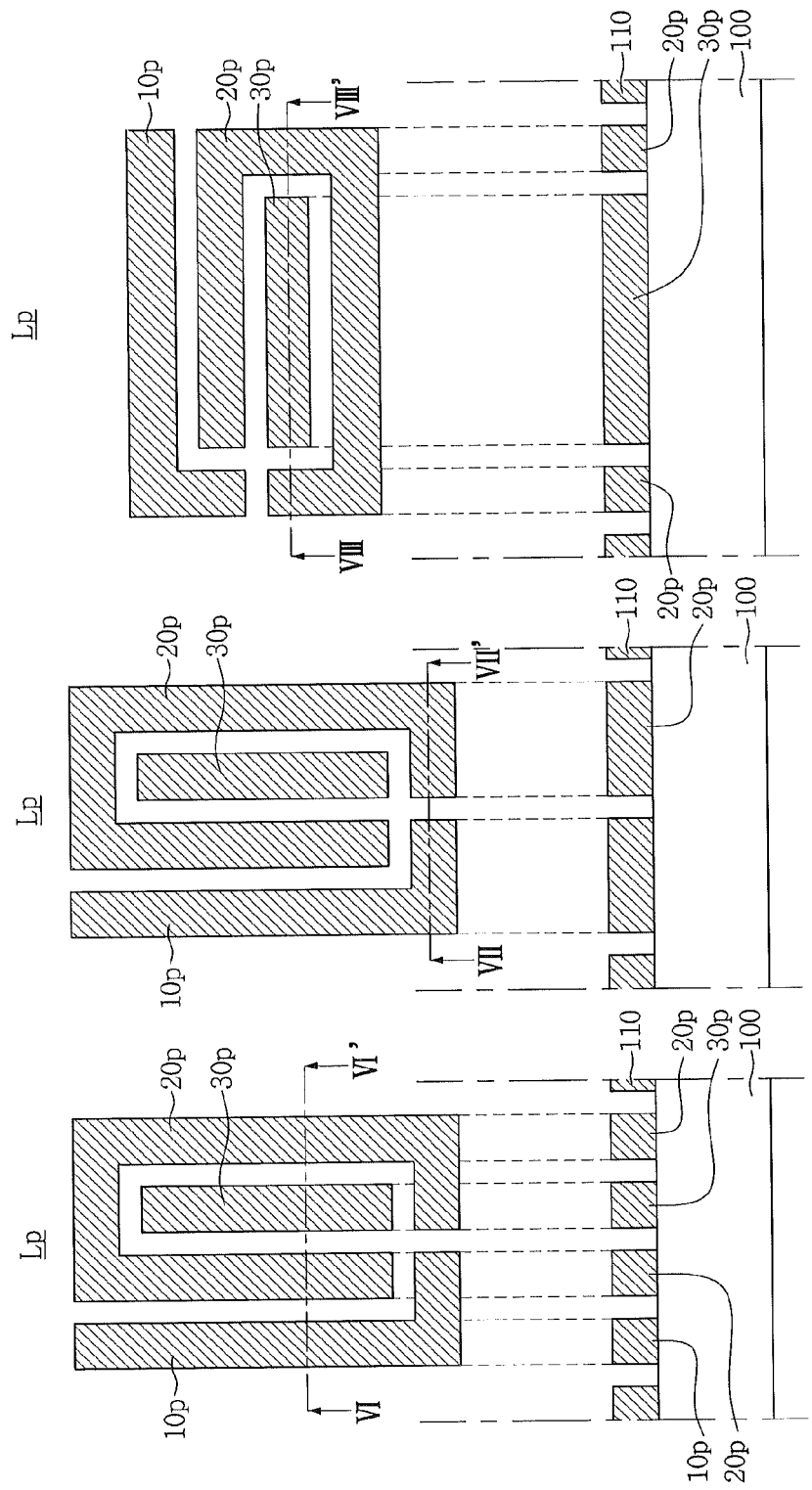

METHODS OF PATTERNING WAFERS USING SELF-ALIGNED DOUBLE PATTERNING PROCESSES

CROSS-REFERENCE TO RELATED APPLICATION

This application claims priority under 35 U.S.C. §119 to Korean Patent Application No. 10-2014-0003073, filed on Jan. 9, 2014, the disclosure of which is hereby incorporated by reference herein in its entirety.

BACKGROUND

1. Field

Embodiments of the inventive concepts relate to methods of designing layouts for a self-aligned double patterning process, and patterning wafers that include semiconductor devices using such layouts.

2. Description of Related Art

As the degree of integration of semiconductor devices increases, it may be difficult to form fine patterns using photolithography processes that exceed a limit of resolution. Accordingly, a variety of ideas are being proposed and studied in order to form fine patterns which exceed the limit of resolution.

SUMMARY

Embodiments of the inventive concepts provide methods of forming patterns in a wafer that includes one or more semiconductor device using modified layouts.

Other embodiments of the inventive concepts provide methods of designing modified layouts that may be used to form patterns in a wafer that includes one or more semiconductor device using a self-aligned double patterning process.

The technical objectives of the inventive concepts are not limited to the above disclosure; other objectives may become apparent to those of ordinary skill in the art based on the following description.

In accordance with an aspect of the inventive concepts, a method of patterning a wafer includes preparing an initial layout having a first design pattern, a second design pattern, and a third design pattern, where the third design pattern is between the first design pattern and the second design pattern, extracting a first sub-layout that includes the first design pattern and a second sub-layout that includes the second design pattern from the initial layout using a computer, forming a first modified sub-layout that includes a first modified design pattern obtained by modifying the first design pattern of the first sub-layout using the computer, generating a modified layout that includes the first modified sub-layout and the second sub-layout using the computer, and performing a double patterning process using the modified layout.

In accordance with another aspect of the inventive concept, a method of patterning a wafer includes preparing an initial layout including a first design pattern, a second design pattern in parallel with the first design pattern, a third design pattern disposed between the first design pattern and the second design pattern, a fourth design pattern disposed between the first design pattern and the second design pattern, the third and fourth design patterns including co-linear segments that are separated by a space that is between the third design pattern and the fourth design pattern, using a computer to form a modified layout that includes the second design pattern and a first modified design pattern obtained by modifying the first design pattern, wherein the first modified design pattern includes the first design pattern and a first extra pattern that extends from the first design pattern onto the space, and forming first to fourth final patterns corresponding to the first to fourth design patterns respectively by performing a double patterning process using the modified layout.

In accordance with still another aspect of the inventive concepts, a layout design method includes preparing an initial layout including a first design pattern, a second design pattern, a third design pattern that is between the first design pattern and the second design pattern, and a first space that is between the first design pattern and the second design pattern, the first space having a width that is greater than a width of the third design pattern, using a computer to add a first extra pattern that overlaps at least a part of the first space, and using the computer to form a modified layout that only includes the first design pattern, the second design pattern and the first extra pattern.

In accordance with yet another aspect of the inventive concepts, a layout design method includes preparing an initial layout including a first design pattern, a second design pattern, a third design pattern, and a first space in contact with one surface of the third design pattern and having a first width greater than a width of the third design pattern, adding a first extra pattern extending onto the first space from a part of the first design pattern using a computer, and forming a modified layout including the first design pattern, the second design pattern and the first extra pattern, and excluding the third design pattern using the computer.

In accordance with yet another aspect of the inventive concepts, a method of patterning a wafer is provided in which a self-aligned double patterning process is performed on the wafer using a first photo mask and a second photo mask to pattern a first final pattern, a second final pattern and a third final pattern in the wafer. The third final pattern is between the first final pattern and the second final pattern. The first photo mask includes a first design pattern that corresponds to the first final pattern and the second photo mask includes a both second design pattern that corresponds to the second final pattern and an extra pattern. The first and second photo masks do not include a separate pattern that corresponds to the third final pattern.

BRIEF DESCRIPTION OF THE DRAWINGS

FIGS. 1A to 1K are schematic plan views that illustrate methods of designing modified layouts for a self-aligned double patterning process, and patterns in a wafer that are formed using the modified layouts in accordance with various embodiments of the inventive concepts;

FIGS. 3A to 3E are plan views that illustrate methods of designing modified layouts for a self-aligned double patterning process, and patterns in a wafer that are formed using the modified layouts in accordance with still other embodiments of the inventive concepts;

DETAILED DESCRIPTION OF THE EMBODIMENTS

Figure 1C:
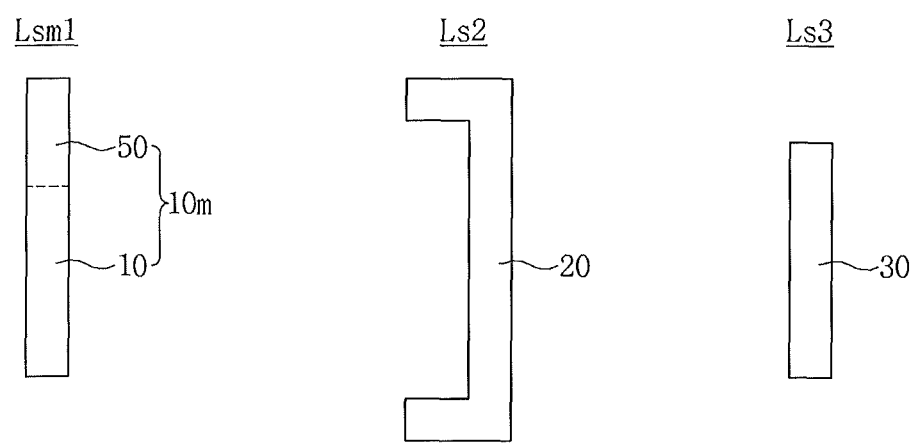

Various embodiments will now be described more fully with reference to the accompanying drawings, in which some embodiments are shown. These inventive concepts may, however, be embodied in different forms and should not be construed as limited to the embodiments set forth herein. Rather, these embodiments are provided so that this disclosure is thorough and complete and fully conveys the inventive concepts to those skilled in the art.

The terminology used herein to describe embodiments of the inventive concepts is not intended to limit the scope of the inventive concepts. The articles "a," "an," and "the" are singular in that they have a single referent; however, the use of the singular form in the present document should not preclude the presence of more than one referent. In other words, elements of the inventive concepts referred to in the singular may number one or more, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the drawings, the sizes and relative sizes of layers and regions may be exaggerated for clarity. It will also be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Embodiments are described herein with reference to cross-sectional illustrations that may be schematic illustrations of idealized embodiments and intermediate structures. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present inventive concepts.

Like numerals refer to like elements throughout the specification. Accordingly, the same numerals and similar numerals can be described with reference to other drawings, even if not specifically described in a corresponding drawing. However, it will be appreciated that these like elements may take on different shapes or configurations in different embodiments. For example, various first, second and third design patterns 10, 20, 30 are described herein. These design patterns may have different shapes in different embodiments, yet are described as first, second and third design patterns 10, 20 and 30 in each of the embodiments despite these differences in shape. Similarly, various modified layouts are described herein that may have different configurations in different embodiments. Once again, these modified layouts are consistently referred to using the reference identifier Lm despite these differences in configuration because in each case the element identified by reference identifier Lm is a modified layout.

In embodiments of the inventive concepts, various initial layouts and modified layouts may comprise digital data that may be generated, stored and/or displayed on a computer. The initial layouts and modified layouts may be parts of design data or photo mask pattern data. For example, various initial layouts and modified layouts shown in the drawings herein may be parts of pattern designs that may be displayed on a computer monitor. Final layouts may be ideal, realistic and practical patterns formed on a wafer. The wafer may include one or more semiconductor devices that are formed thereon or therein. It will be appreciated that the wafer may include, for example, a substrate and one or more layers that are formed on the substrate. The substrate may be a semiconductor substrate or a non-semiconductor substrate. It will also be appreciated that the substrate may be thinned or even removed. The patterning that is performed on the wafer may comprise, for example, patterning of one or more layers that are at the same height above a bottom surface of the substrate.

In the specification, references to spaces denote empty areas between patterns. That is, the spaces are areas in which patterns are not formed. The spaces may include narrow spaces and wide spaces. The narrow spaces may denote intervals which may disappear when spacer patterns are formed on perimeters of the patterns, and the wide spaces may denote intervals which do not disappear when spacer patterns are formed on perimeters of the patterns. The inventive concepts may be especially useful for a self-aligned double patterning process. A self-aligned process denotes a process which forms a pattern that does not exist in a layout by forming a spacer on perimeters of a pattern that exists in the layout. A double patterning process is a process which forms patterns in the same layer and/or level by performing photolithography processes twice using two photo masks. Therefore, the inventive concepts may include performing both the self-aligned process and the double patterning process.

FIGS. 1A to 1K are plan views illustrating methods of designing modified layouts for a self-aligned double patterning process, and patterns in a wafer that are formed using the modified layouts in accordance with various embodiments of the inventive concepts.

Referring to FIG. 1A, the method of designing the modified layouts in accordance with an embodiment of the inventive concepts may include preparing an initial layout Li.

The initial layout Li may include at least three design patterns, such as first to third design patterns 10, 20 and 30 that are formed at the same layer and/or level in the device structure. The first design pattern 10 and the second design pattern 20 are spaced apart from each other, and the third design pattern 30 may be between the first design pattern 10 and the second design pattern 20. For example, the first design pattern 10 may have a bar or line shape extending in a Y direction. The second design pattern 20 may have a body 23 that extends in the Y direction, a first end 21 that extends in an X direction from a first end portion of the body 23 and/or a second end 22 that extends in the X direction from a second end portion of the body 23. The first end 21, the second end 22 and the body 23 may have a bar, elbow and/or line shape. The third design pattern 30 may have a bar shape extending in the Y direction. In an example embodiment of the inventive concepts, the first end 21 and the second end 22 of the second design pattern 20 may cross or overlap an axis "A" that is defined by the third design pattern 30. In another embodiment, one of the first end 21 and the second end 22 may be omitted.

Each of the first design pattern 10 and the second design pattern 20 may be spaced apart from the third design pattern 30 by a narrow space Sn. Each narrow space Sn may have a width that is less than a limiting resolution of a photolithography apparatus that is used in the patterning the wafer. The initial layout Li may have at least one wide space Sw that has a width that is greater than the limiting resolution of a photolithography apparatus that is used in the patterning the wafer. Spacer patterns that are formed in the wide space Sw by performing the double patterning process may define perimeters of the first to third design patterns 10, 20 and 30. Since the wide space Sw is located adjacent to or abutting the first to third design patterns 10, 20 and 30 rather than between the first to third design patterns 10, 20 and 30, it may be regarded that the wide space Sw does not separate the first to third design patterns 10, 20 and 30. The wide space Sw may have a width that is greater than the limiting resolution of the photolithography apparatus and the narrow spaces Sn.

The limiting resolution of the photolithography apparatus refers to a minimum pattern width that may be formed using a specific photolithography apparatus. Accordingly, the limiting resolution may be different according to a photolithography apparatus, a photolithography process, etc. Generally, the limiting resolution is defined by following Equation 1.

$$R = k \frac{\lambda}{N_A} \quad \text{(Equation 1)}$$

R: limiting resolution
k: process constant
λ: wavelength of light
$N_A$: numerical aperture of projection lens of photolithography apparatus The process constant denotes the ability of an operator who performs a photolithography process. For example, when it is assumed that a wavelength of light is 193 nm, a numerical aperture of the projection lens is 0.8, and the process constant is 0.5 for use in the photolithography process, the limiting resolution is about 120 nm. When a double patterning technique is used according to embodiments of the inventive concepts, the limiting resolution may be reduced to half or less.

Referring to FIG. 1B, the method may include separating the initial layout Li into at least three sub-layouts Ls1, Ls2 and Ls3. The at least three sub-layouts Ls1, Ls2 and Ls3 may include the first, second and third design patterns 10, 20 and 30. The first, second and third design patterns 10, 20 and 30 may be different from one another and do not overlap. As shown in FIG. 1B, separating the initial layout Li may include extracting and separating the first design pattern 10 from the initial layout Li, generating a first sub-layout Ls1 that includes the first design pattern 10, extracting and separating the second design pattern 20 from the initial layout Li, and generating a second sub-layout Ls2 that includes the second design pattern 20. Separating the initial layout Li may also include extracting and separating the third design pattern 30 from the initial layout Li, and generating a third sub-layout Ls3 that includes the third design pattern 30. In another embodiment, the method may include extracting and separating the first sub-layout Ls1 including the first design pattern 10 and the second sub-layout Ls2 including the second design pattern 20 from the initial layout Li, and the third sub-layout Ls3 including the third design pattern 30 may be omitted.

Referring to FIG. 1C, the method may include forming a first modified sub-layout Lsm1 that includes a first modified design pattern 10m that is obtained by modifying the first design pattern 10 of the first sub-layout Ls1. Forming the first modified design pattern 10m may include adding an extra pattern 50 to the first design pattern 10 that at least partly fills the wide space Sw that is included in the initial layout Li. As can be seen with reference to FIGS. 1A and 1C, the extra pattern 50 may extend onto the wide space Sw from one end of the first design pattern 10. The extra pattern 50 may have a bar, line, or elbow shape and may extend from and be connected to the first design pattern 10. In another embodiment, the extra pattern 50 may be discontinuous with the first design pattern 10. The first modified sub-layout Lsm1 may correspond to a first photo mask layout, and the second sub-layout Ls2 may correspond to a second photo mask layout.

Figure 1D:
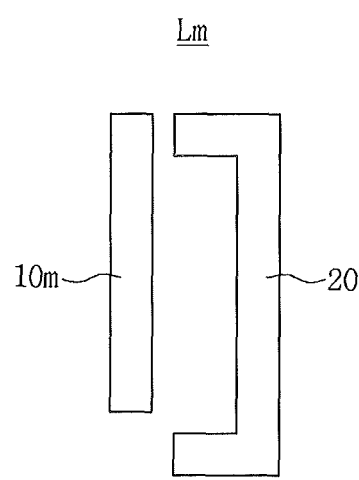

Referring to FIG. 1D, the method may include generating a modified layout Lm that includes the first modified sub-layout Lsm1 and the second sub-layout Ls2. The first modified sub-layout Lsm1 of the modified layout Lm may include the first modified design pattern 10m, and the second sub-layout Ls2 of the modified layout Lm may include the second design pattern 20. In comparison with the initial layout Li shown in FIG. 1A, the first design pattern 10 is replaced with the first modified design pattern 10m, the second design pattern 20 is the same, and the third design pattern 30 is omitted. The wide space Sw shown in FIG. 1A may be removed, or may be reduced in size to have a width that is similar to the width of the narrow space Sn that is equal to or less than the limiting resolution, by the first modified design pattern 10m. Thereafter, the method may further include performing a self-aligned double patterning process on a wafer using the modified layout Lm. The modified layout Lm may be separated into two layouts on two photo masks, respectively, in the self-aligned double patterning process. Further referring to FIG. 1C, the modified layout Lm may be separated into the first photo mask and the second photo mask and used for the self-aligned double patterning process.

Figure 1E:
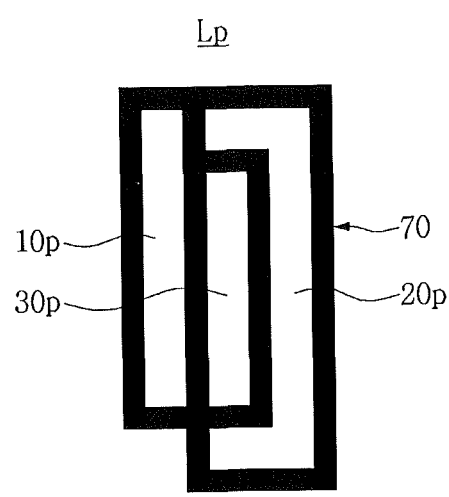

FIG. 1E is a pattern layout Lp conceptually illustrates regions in which spacer patterns 70 are formed on a wafer when a self-aligned double patterning process is performed using the modified layout Lm of FIG. 1D. The pattern layout Lp may correspond to an ideal top view of patterns to be formed on the wafer. Referring to FIG. 1E, the spacer patterns 70 may be formed on perimeters of the first modified design pattern 10m and the second design pattern 20, and thus a first final pattern 10p, a second final pattern 20p and a third final pattern 30p may be formed. In other words, when the self-aligned double patterning process is performed using the modified layout Lm of FIG. 1D, the spacer patterns 70 formed on perimeters of the first final pattern 10p and the second final pattern 20p may define the third final pattern 30p.

Figure 1F:
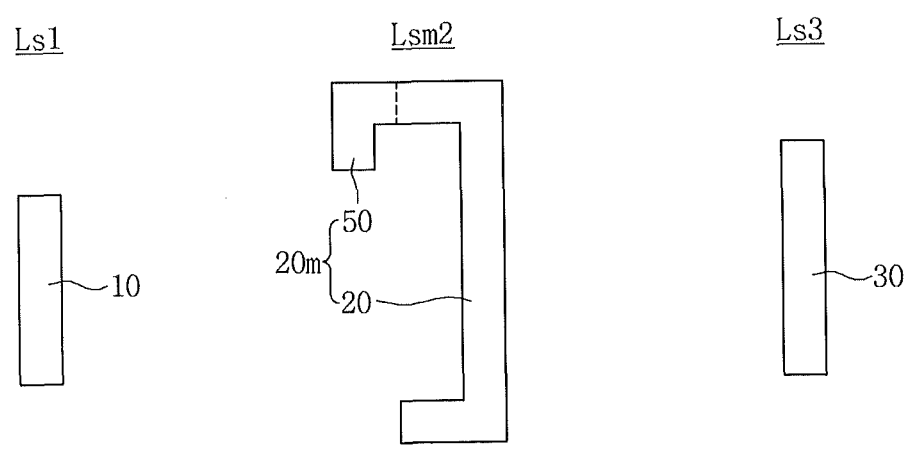
Figure 1G:
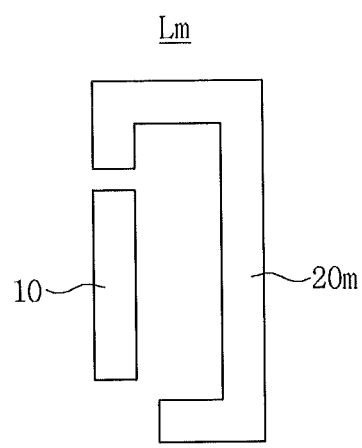
Figure 1H:
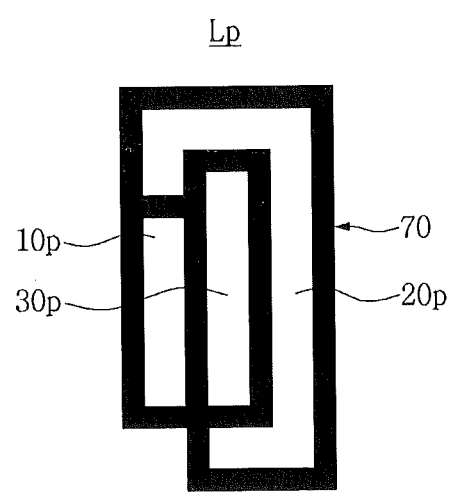

FIGS. 1F to 1H are plan views that illustrate methods of designing modified layouts for a self-aligned double patterning process, and patterns in a wafer formed using the modified layouts in accordance with an embodiment of the inventive concepts.

Referring to FIGS. 1A, 1B and 1F, the method may include preparing the initial layout Li, separating the initial layout Li into at least three sub-layouts Ls1, Ls2 and Ls3, and forming a second modified sub-layout Lsm2 that includes a second modified design pattern 20m that is obtained by modifying the second design pattern 20 of second sub-layout Ls. In comparison with FIG. 1C, forming the second modified design pattern 20m may include adding an extra pattern 50 which overlaps the wide space Sw and extends onto the wide space Sw from one end of the second design pattern 20. Furthermore, forming the second modified design pattern 20m may include extending one end of the second design pattern 20 to remove or reduce the size of the wide space Sw. The extra pattern 50 may have a bar, line, or elbow shape and may extend from the second design pattern 20. In another embodiment, the extra pattern 50 may be discontinuous with the second design pattern 20. Referring again to FIG. 1C, the first sub-layout Ls1 may correspond to a first photo mask layout, and the second modified sub-layout Lsm2 may correspond to a second photo mask layout.

In another embodiment, separating the initial layout Li may include extracting and separating the first sub-layout Ls1 that includes the first design pattern 10 and extracting the second sub-layout Ls2 that includes the second design pattern 20, and omitting the third design pattern 30.

Referring to FIG. 1G, the method may include generating a modified layout Lm that includes the first sub-layout Ls1 and the second modified sub-layout Lsm2. The first sub-layout Ls1 of the modified layout Lm includes the first design pattern 10, and the second modified sub-layout Lsm2 of the modified layout Lm includes the second modified design pattern 20m. In comparison with the initial layout Li shown in FIG. 1A, the first design pattern 10 still exists, the second design pattern 20 is replaced with the second modified design pattern 20m, and the third design pattern 30 is omitted. The wide space Sw shown in FIG. 1A may be removed, or may be reduced in size to have a width that is similar to the width of the narrow space Sn that is equal to or less then the limiting resolution, by the second modified design pattern 20m. Thereafter, the method may further include performing a self-aligned double patterning process on a wafer using the modified layout Lm. As described above, the modified layout Lm may be separated into two layouts on two respective photo masks in the self-aligned double patterning process. Further referring to FIG. 1F, the modified layout Lm may be separated into the first photo mask and the second photo mask and used for the self-aligned double patterning process.

FIG. 1H is a pattern layout Lp conceptually illustrating shapes in which spacer patterns 70 are formed on a wafer when a self-aligned double patterning process is performed using the modified layout Lm of FIG. 1G Referring to FIG. 1H, the spacer patterns 70 may be formed on perimeters of the first final pattern 10p and the second final pattern 20p, thereby forming the first final pattern 10p, the second final pattern 20p, and the third final pattern 30p. In other words, when the self-aligned double patterning process is performed using the modified layout Lm, the spacer patterns 70 formed on the perimeters of the first final pattern 10p and the second final pattern 20p may define the third final pattern 30p.

Figure 1I:
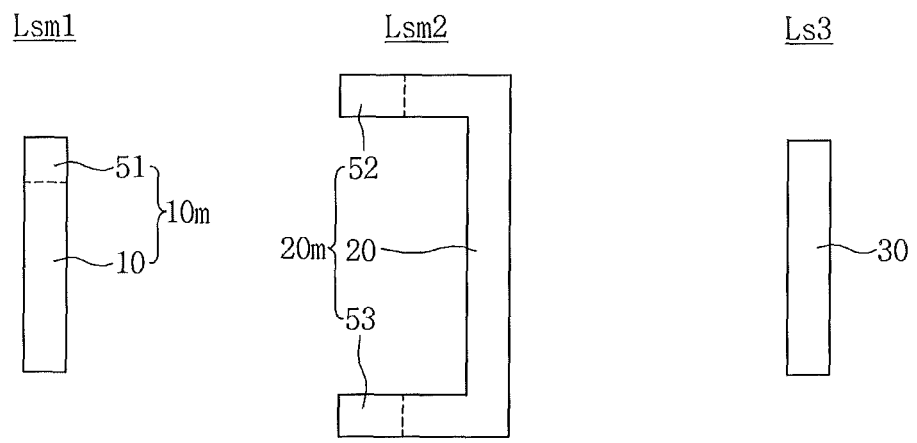
Figure 1J:
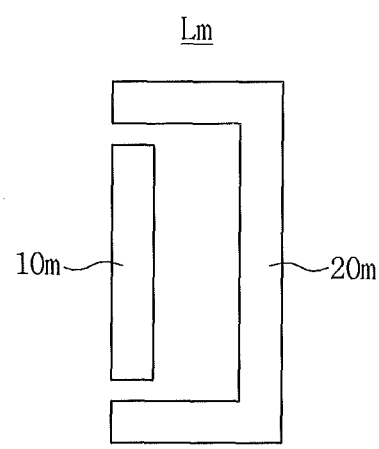
Figure 1K:
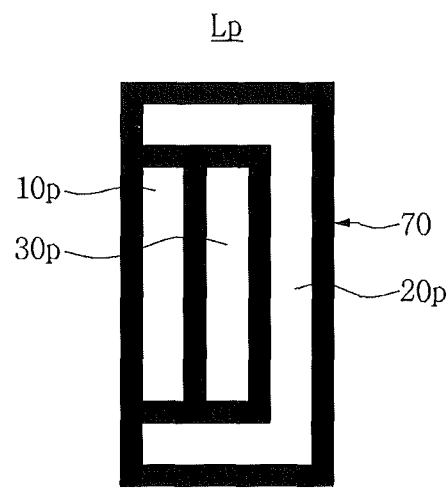

FIGS. 1I to 1K are plan views that illustrate methods of designing modified layouts for a self-aligned double patterning process, and patterns in a wafer formed using the modified layouts in accordance with an embodiment of the inventive concepts.

Referring to FIGS. 1A, 1B and 1I, the method may include preparing the initial layout Li, separating the initial layout Li into at least three sub-layouts Ls1, Ls2 and Ls3, and forming a first modified sub-layout Lsm1 including a first modified design pattern 10m that is obtained by modifying the first design pattern 10 of the first sub-layout Ls1 and a second modified sub-layout Lsm2 including a second modified design pattern 20m that is obtained by modifying the second design pattern 20 of the second sub-layout Ls2. In comparison with FIGS. 1C and 1F, forming the first modified design pattern 10m and the second modified design pattern 20m may include adding a first extra pattern 51 that extends onto the wide space Sw from the first design pattern 10 and adding a second extra pattern 52 that extends onto the wide space Sw from the second design pattern 20, respectively. The first extra pattern 51 and the second extra pattern 52 may have a bar, line, or elbow shape. In some embodiments, the method may further include adding a third extra pattern 53 that defines one end of the first modified design pattern 10m that extends from the other end of the second design pattern 20. The third extra pattern 53 may also have a bar, line, or elbow shape. In other embodiments, one or more of the first to third extra patterns 51, 52 and 53 may be discontinuous with respect to both the first and design pattern 10 and the second design pattern 20. The first modified sub-layout Lsm1 may correspond to a first photo mask layout, and the second modified sub-layout Lsm2 may correspond to a second photo mask layout.

In another embodiment, separating the initial layout Li may include extracting and separating the first sub-layout Ls1 including the first design pattern 10 and the second sub-layout Ls2 including the second design pattern 20, and omitting the third design pattern 30.

Referring to FIG. 1J, the method may include generating a modified layout Lm that includes the first modified sub-layout Lsm1 and the second modified sub-layout Lsm2. The modified layout Lm may include a first modified design pattern 10m and a second modified design pattern 20m. In comparison with the initial layout Li shown in FIG. 1A, the first design pattern 10 is replaced with the first modified design pattern 10m, the second design pattern 20 is replaced with the second modified design pattern 20m, and the third design pattern 30 is omitted. The wide space Sw shown in FIG. 1A may be removed, or may be reduced in size to have a width that is similar to the width of the narrow space Sn that is equal or less than the limiting resolution, by the first modified design pattern 10m and the second modified design pattern 20m. Thereafter, the method may further include performing a self-aligned double patterning process on a wafer using the modified layout Lm. As described above, the modified layout Lm may be separated into two layouts on two photo masks, respectively, in the self-aligned double patterning process. Further referring to FIG. 1I, the modified layout Lm may be separated into the first photo mask and the second photo mask and used for the self-aligned double patterning process.

FIG. 1K is a pattern layout Lp conceptually illustrating shapes in which spacer patterns 70 are formed on a wafer when a self-aligned double patterning process is performed using the modified layout Lm shown in FIG. 1J. Referring to FIG. 1K, the spacer patterns 70 may be formed on perimeters of the first modified design pattern 10m and the second modified design pattern 20m, and thus the first final pattern 10p, the second final pattern 20p, and the third final pattern 30p may be formed. In other words, the spacer patterns 70 formed on the perimeters of the first modified design pattern 10m and the second modified design pattern 20m may define the third final pattern 30p.

According to various embodiments of the inventive concepts, the initial layout Li having various patterns may separated into the at least two sub-layouts Ls1 and Ls2 having first to third patterns 10, 20 and 30 which do not overlap, respectively, a modified layout Lm is generated by modifying at least one of the two sub-layouts Ls1 and Ls2, and a photolithography process is then performed using only the modified layout Lm to form final patterns 10p, 20p and 30p which are substantially the same as or similar to the initial layout Li. In other words, a pattern that was included in the initial layout Li but which was omitted from the modified layout Lm may be formed by a self-aligned double patterning process. That is, according to an embodiment of the inventive concepts, patterns of the initial layout Li formed only by performing the photolithography process three times may be formed as the final patterns 10p, 20p and 30p which are substantially the same as the patterns of the initial layout Li by performing the photolithography process twice using the modified layout Lm.

When a space which has a greater width than a specific pattern is adjacent to or abuts the specific pattern, the specific pattern may not be defined and formed independently and connected or unified to be continued with the space. According to embodiments of the inventive concepts, the specific pattern which could not be separated by a general double patterning process, and the space which does not have a pattern may be separated by technical aspects of the inventive concepts, and the specific pattern may be independently defined and formed. For example, the space which has a greater width than the specific pattern may be smaller than the width of the specific pattern or removed by the technical aspects of the inventive concepts.

Figure 1L:
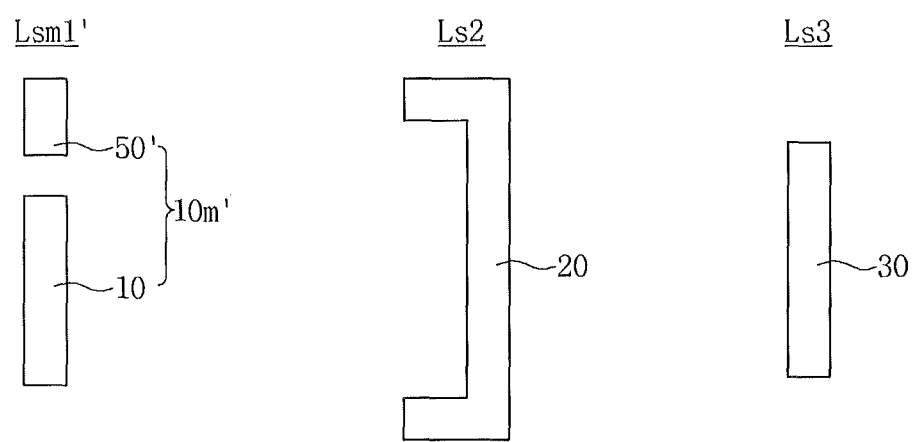
FIGS. 1L and 1M are schematic plan views that illustrate methods of designing modified layouts for a self-aligned double patterning process, and patterns in a wafer that are formed using the modified layouts in accordance with an alternative embodiment of the inventive concepts.
Figure 1M:
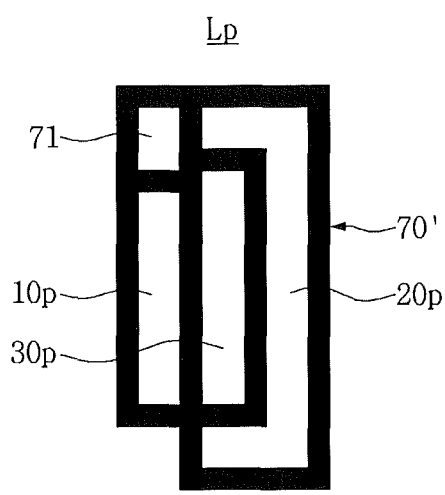

As noted above with respect to the discussion of FIG. 1C, in some embodiments the extra pattern 50 may be discontinuous with the first design pattern 10. FIG. 1L illustrates an alternative first modified design pattern 10m' that may be used in place of the first modified design pattern 10m of FIG. 1C. As shown in FIG. 1L, the alternative first modified design pattern 10m' includes an extra pattern 50' that is discontinuous with the first design pattern 10. When the alternative first modified design pattern 10m' is used in place of the first modified design pattern 10m, the pattern layout Lp of FIG. 1E is changed to the modified pattern layout Lp' of FIG. 1M having spacer pattern 70'. A dummy pattern 71 is provided in addition to the first through third final patterns 10p, 20p, 30p, as shown in FIG. 1M.

FIGS. 2A to 2K are plan views that illustrate methods of designing modified layouts for a self-aligned double patterning process, and patterns in a wafer formed using the modified layouts in accordance with various embodiments of the inventive concepts. For example, methods of designing the modified layouts including various separated patterns will be described.

FIGS. 2A to 2E are plan views that illustrate methods of designing modified layouts for a self-aligned double patterning process, and patterns in a wafer formed using the modified layouts in accordance with an embodiment of the inventive concepts.

Figure 2A:
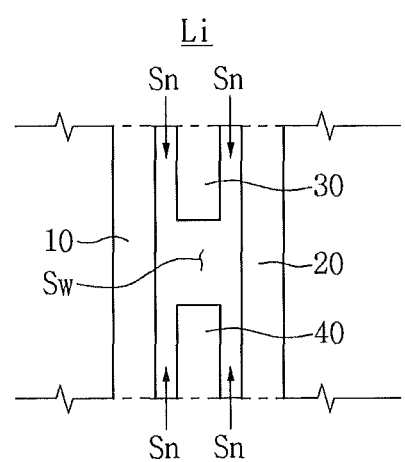
FIGS. 2A to 2K are plan views that illustrate methods of designing modified layouts for a self-aligned double patterning process, and patterns in a wafer that are formed using the modified layouts in accordance with other embodiments of the inventive concepts.

Referring to FIG. 2A, the method may include preparing an initial layout Li. The initial layout Li may include at least four separated patterns 10, 20, 30 and 40. The patterns 10, 20, 30 and 40 may include a first design pattern 10, a second design pattern 20 that extends parallel to the first design pattern 10, and a third design pattern 30 and a fourth design pattern 40 which are both disposed between the first design pattern 10 and the second design pattern 20 and which are spaced apart from each other by a wide space Sw. Narrow spaces Sn may also be disposed between the first to fourth design patterns 10, 20, 30 and 40, as shown in FIG. 2A. The third design pattern 30 may be longitudinally aligned with the fourth design pattern 40 and spaced apart from the fourth design pattern 40. The third design pattern 30 and the fourth design pattern 40 may be in parallel with the first design pattern 10 and/or the second design pattern 20.

Figure 2B:
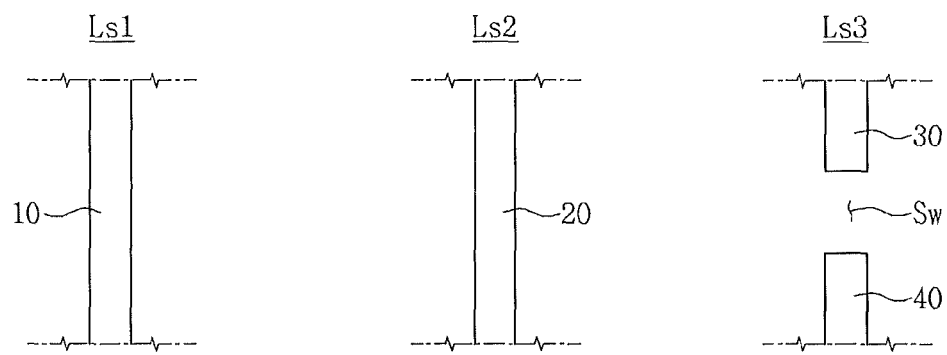

Referring to FIG. 2B, the method may include separating the initial layout Li into first, second and third sub-layouts Ls1, Ls2 and Ls3. Each of the first to third sub-layouts Ls1, Ls2 and Ls3 may include at least one of the first to fourth design patterns 10, 20, 30 and 40. For example, the method may include generating the first sub-layout Ls1 that includes the first design pattern 10 by extracting and separating the first design pattern 10 from the initial layout Li, and generating the second sub-layout Ls2 that includes the second design pattern 20 by extracting and separating the second design pattern 20 from the initial layout Li. In some embodiments, the third design pattern 30 and the fourth design pattern 40 may not be separated as an independent layout and may instead be omitted. That is, the third sub-layout Ls3 may not be generated and may instead be omitted.

Figure 2C:
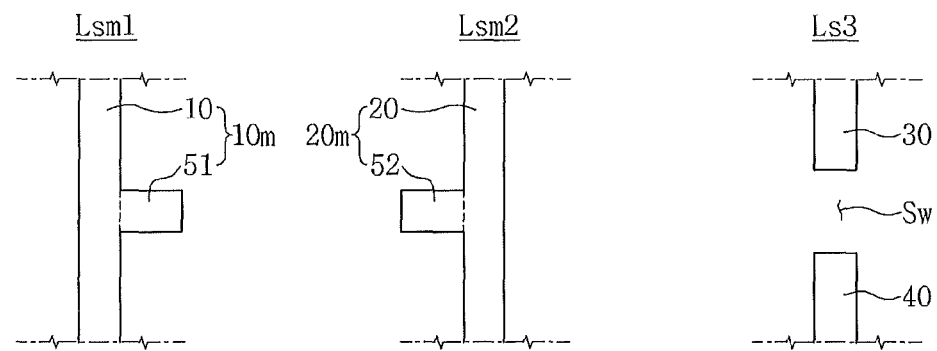

Referring to FIG. 2C, the method may include forming a first modified sub-layout Lsm1 that includes a first modified design pattern 10m that is obtained by modifying the first design pattern 10 of the first sub-layout Ls1, and/or forming a second modified sub-layout Lsm2 that includes a second modified design pattern 20m that is obtained by modifying the second design pattern 20 of the second sub-layout Ls2. Forming the first modified design pattern 10m may include adding a first extra pattern 51 which overlaps the wide space Sw and extends onto the wide space Sw from the first design pattern 10 to remove at least a portion of the wide space Sw. Forming the second modified design pattern 20m may include adding a second extra pattern 52 which overlaps the wide space Sw and extends onto the wide space Sw from the second design pattern 20 to remove at least a portion of the wide space Sw. Each of the first extra pattern 51 and the second extra pattern 52 may have a bar, line, or elbow shape and may extend from the first design pattern 10 or the second design pattern 20, respectively. In an embodiment, the first extra pattern 51 and the second extra pattern 52 may extend from middle portions of the first design pattern 10 and the second design pattern 20, respectively, to have branch shapes. In another embodiment, the first and second extra patterns 51 and 52 may be discontinuous with the first and second design patterns 10 and 20. The first modified sub-layout Lsm1 may correspond to a first photo mask layout, and the second modified sub-layout Lsm2 may correspond to a second photo mask layout.

Figure 2D:
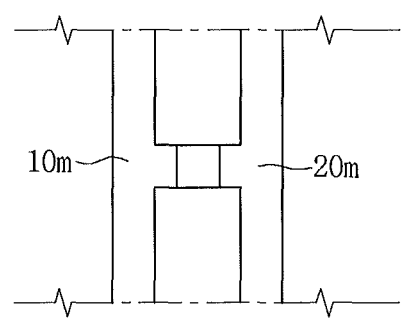

FIG. 2D is a modified layout Lm in which the first modified sub-layout Lsm1 overlaps the second modified sub-layout Lsm2. Referring to FIG. 2D, the modified layout Lm may include the first modified sub-layout Lsm1 having the first modified design pattern 10m and the second modified sub-layout Lsm2 having the second modified design pattern 20m. In comparison with the initial layout Li shown in FIG. 2A, the first design pattern 10 is replaced with the first modified design pattern 10m, the second design pattern 20 is replaced with the second modified design pattern 20m, and the third design pattern 30 and the fourth design pattern 40 are omitted. The wide space Sw shown in FIG. 2A may be removed, or may be reduced in size to have a width that is similar to the width of the narrow space Sn that is equal or less than the limiting resolution, by the first modified design pattern 10m and/or the second modified design pattern 20m. As shown in FIG. 2D, the first modified design pattern 10m and the second modified design pattern 20m may partly overlap each other. Thereafter, the method may further include performing a self-aligned double patterning process on a wafer using the modified layout Lm. As described above, the modified layout Lm may be separated into two layouts on two photo masks, respectively, in the self-aligned double patterning process. Further referring to FIG. 2C, the modified layout Lm may be separated into the first photo mask and the second photo mask that are used in the self-aligned double patterning process.

Figure 2E:
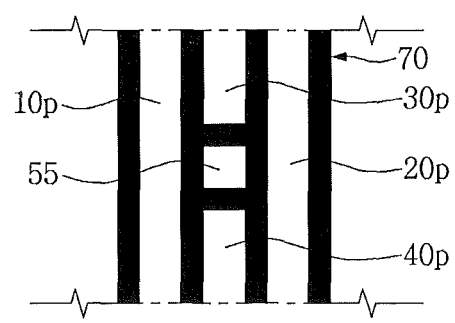

FIG. 2E is a pattern layout Lp ideally and conceptually illustrating shapes in which spacer patterns 70 are formed on a wafer when a self-aligned double patterning process is performed using the modified layout Lm shown in FIG. 2D. Referring to FIG. 2E, spacer patterns 70 may be formed on perimeters of the first modified design pattern 10m and the second modified design pattern 20m, and then a first final pattern 10p, a second final pattern 20p, a third final pattern 30p, and a fourth final pattern 40p may be formed. In other words, the spacer patterns 70 formed on the perimeters of the first final pattern 10p and the second final pattern 20p may define the third final pattern 30p and the fourth final pattern 40p. The first extra pattern 51 of the first final pattern 10p and the second extra pattern 52 of the second modified design pattern 20m may separate the third final pattern 30p from the fourth final pattern 40p. A dummy pattern 55 may be formed at the location of the wide space Sw disposed between the third final pattern 30p and the fourth final pattern 40p.

Figure 2F:
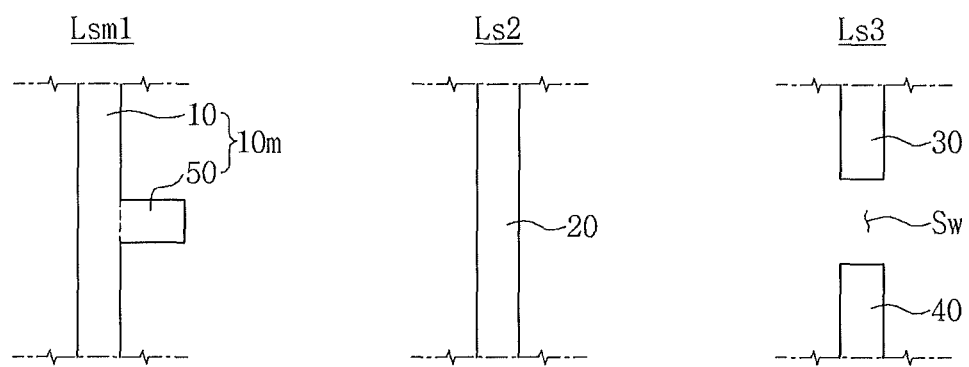
Figure 2G:
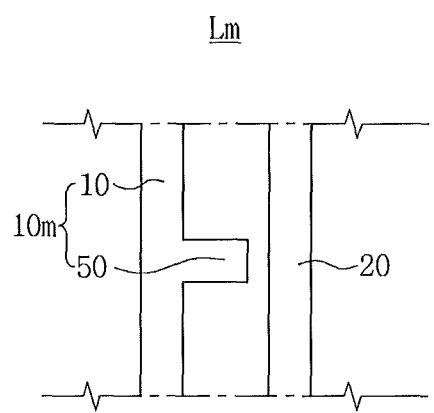
Figure 2H:
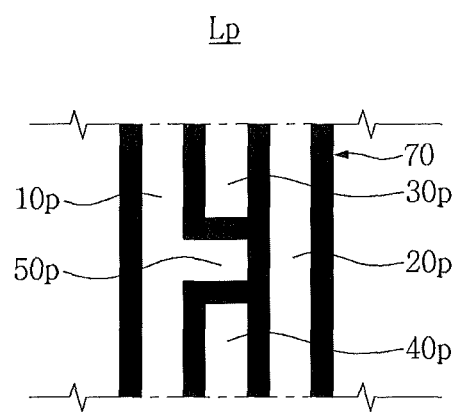

FIGS. 2F to 2H are plan views that illustrate methods of designing modified layouts for a self-aligned double patterning process, and patterns in a wafer formed using the modified layout in accordance with an embodiment of the inventive concepts.

Referring to FIGS. 2A, 2B and 2F, the method may include separating the initial layout Li into a plurality of sub-layouts Ls1, Ls2 and Ls3, and forming a first modified sub-layout Lsm1 by replacing the first design pattern 10 of the first sub-layout Ls1 with the first modified design pattern 10m. The first modified design pattern 10m may include an extra pattern 50 having a branch shape. The first modified sub-layout Lsm1 may correspond to a first photo mask layout, and the second sub-layout Ls2 may correspond to a second photo mask layout.

In another embodiment, separating the initial layout Li may include extracting and separating the first sub-layout Ls1 including the first design pattern 10 and the second sub-layout Ls2 including the second design pattern 20, and omitting the third design pattern 30.

FIG. 2G is a modified layout Lm in which the first modified sub-layout Lsm1 and the second sub-layout Ls2 are provided. Referring to FIGS. 2F and 2G, the modified layout Lm may include the first modified sub-layout Lsm1 including the first modified design pattern 10m and the second sub-layout Ls2 including the second design pattern 20. In the modified layout Lm, the extra pattern 50 of the first modified design pattern 10m may be adjacent to the second design pattern 20, and may abut or overlap the second design pattern 20. In comparison with the initial layout Li shown in FIG. 2A, the first design pattern 10 is replaced with the first modified design pattern 10m, the second design pattern 20 remains unchanged, and the third design pattern 30 and the fourth design pattern 40 are omitted. The wide space Sw disposed between the third design pattern 30 and the fourth design pattern 40 shown in FIG. 2A may be removed, or may be reduced in size to have a width that is similar to the width of the narrow space Sn that is equal or to or less than the limiting resolution, by the extra pattern 50 of the first modified design pattern 10m. Thereafter, the method may further include performing a self-aligned double patterning process on a wafer using the modified layout Lm. As described above, the modified layout Lm may be separated into two layouts on two photo masks, respectively, in the self-aligned double patterning process. Further referring to FIG. 2F, the modified layout Lm may be separated into the first photo mask and the second photo mask, and used for the self-aligned double patterning process.

FIG. 2H is a pattern layout Lp conceptually illustrating shapes in which spacer patterns 70 are formed on a wafer when a self-aligned double patterning process is performed using the modified layout Lm shown in FIG. 2G. Referring to 2H, the spacer patterns 70 may be formed on perimeters of the first modified design pattern 10m and the second design pattern 20 to form a first final pattern 10p, a second final pattern 20p, a third final pattern 30p, and a fourth final pattern 40p. The spacer patterns 70 formed on perimeters of the extra pattern 50 of the first modified design pattern 10m may separate the third final pattern 30p and the fourth final pattern 40p.

Figure 2I:
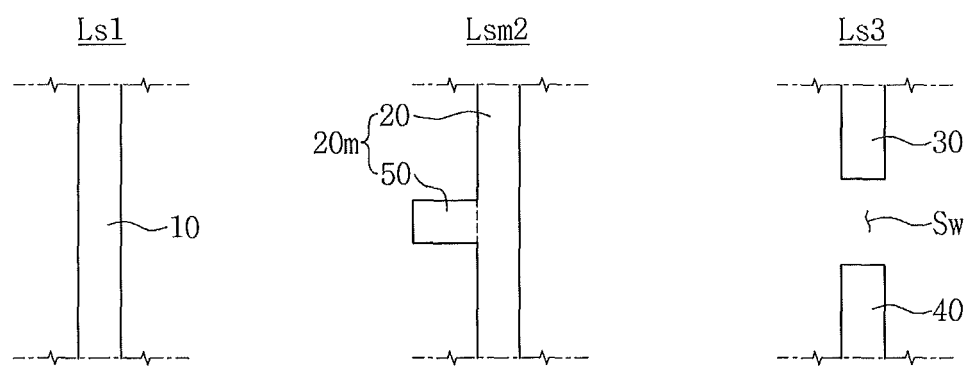
Figure 2J:
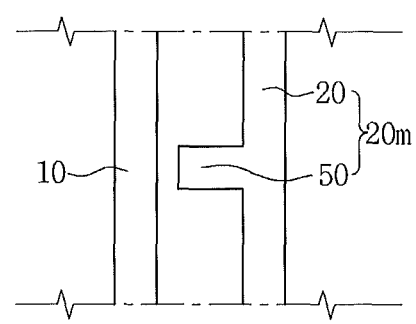
Figure 2K:
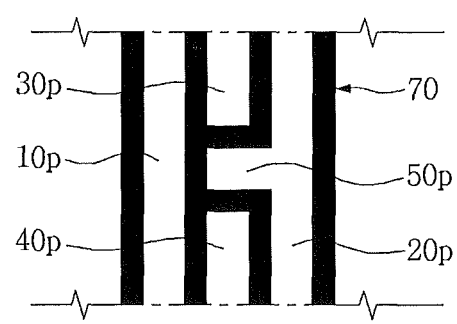

FIGS. 2I to 2K are plan views that illustrate methods of designing modified layouts for a self-aligned double patterning process, and patterns in a wafer formed using the modified layouts in accordance with an embodiment of the inventive concepts.

Referring to FIGS. 2A, 2B and 2I, the method may include separating the initial layout Li into a plurality of sub-layouts Ls1, Ls2 and Ls3, replacing the second design pattern 20 of the second sub-layout Ls2 with the second modified design pattern 20m to form a second modified sub-layout Lsm2. The second modified design pattern 20m may include an extra pattern 50 having a branch shape. The first sub-layout Ls1 may correspond to a first photo mask layout, and the second modified sub-layout Lsm2 may correspond to a second photo mask layout.

In another embodiment, the separating the initial layout Li may include extracting and separating the first sub-layout Ls1 including the first design pattern 10 and the second sub-layout Ls2 including the second design pattern 20, and omitting the third design pattern 30 and the fourth design pattern 40.

FIG. 2J is a modified layout Lm in which the first sub-layout Ls1 and the second modified sub-layout Lsm2 are adjacent each other. Referring to FIGS. 2I and 2J, the modified layout Lm may include the first sub-layout Ls1 that includes a first design pattern 10 and the second modified sub-layout Lsm2 that includes the second modified design pattern 20m. In the modified layout Lm, the extra pattern 50 of the second modified design pattern 20m may be adjacent to the first design pattern 10, or may abut or overlap the first design pattern 10. The wide space Sw disposed between the third design pattern 30 and the fourth design pattern 40 shown in FIG. 2A may be removed, or may be reduced in size to have a width that is similar to the width of the narrow space Sn that is equal to or less than the limiting resolution, by the extra pattern 50 of the second modified design pattern 20m. Thereafter, the method may further include performing a self-aligned double patterning process on a wafer using the modified layout Lm. As described above, the modified layout Lm may be separated into two layouts on two photo masks, respectively, in the self-aligned double patterning process. Further referring to FIG. 2I, the modified layout Lm may be separated into the first photo mask and the second photo mask, and used for the self-aligned double patterning process.

FIG. 2K is a pattern layout Lp conceptually illustrating shapes in which spacer patterns 70 are formed on a wafer when a self-aligned double patterning process is performed using the modified layout Lm shown in FIG. 2J. Referring to 2K, spacer patterns 70 are formed on perimeters of the first design pattern 10 and the second modified design pattern 20m to form the first final pattern 10p, the second final pattern 20p, the third final pattern 30p, and the fourth final pattern 40p The spacer patterns 70 formed on extra pattern 50 of the second design pattern 20 may separate the third final pattern 30p and the fourth final pattern 40p.

According to various embodiments of the inventive concepts, the initial layout Li having various patterns 10, 20, 30 and 40 is separated into at least two sub-layouts Ls1 and Ls2, respectively, having patterns 10 and 20 which do not individually overlap, a self-aligned double patterning process is performed using only two sub-layouts Ls1 and Ls2, i.e., two photo masks, and patterns 10p, 20p, 30p and 40p which are substantially the same as or similar to the initial layout Li may be formed. In other words, two or more patterns which exist in the initial layout Li, but which are omitted from the modified layout Lm, may be formed by the self-aligned double patterning process. According to embodiments of the inventive concepts, the two separated final patterns 30p and 40p may be formed without performing a direct formation process by performing the double patterning process.

FIGS. 3A to 3E are plan views that illustrate methods of designing modified layouts for a self-aligned double patterning process, and patterns in a wafer formed using the modified layouts in accordance with various embodiments of the inventive concepts.

Figure 3A:
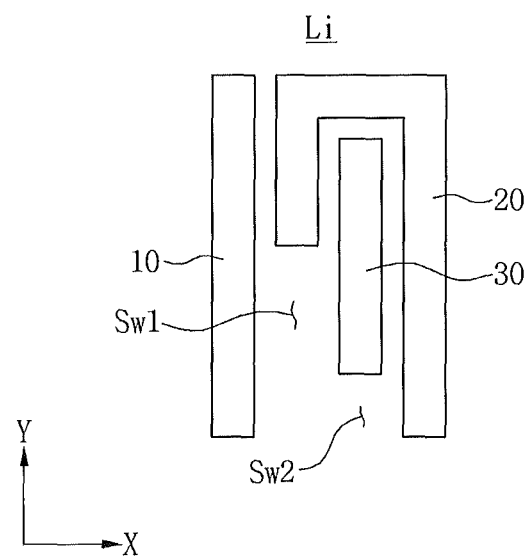

Referring to FIG. 3A, the method may include preparing an initial layout Li. The initial layout Li may include at least first, second and third patterns 10, 20 and 30 which are separate from each other. The patterns 10, 20 and 30 may include a first design pattern 10, a second design pattern 20 that is opposite to the first design pattern 10, and a third design pattern 30 that is between the first design pattern 10 and the second design pattern 20. Wide spaces Sw1 and Sw2 may be disposed adjacent to at least two sides of the third design pattern 30. For example, a first wide space Sw1 may be disposed between the first design pattern 10 and the third design pattern 30 in the X direction, a second wide space Sw2 may be disposed adjacent to one end of the third design pattern 30 in the Y direction.

Figure 3B:
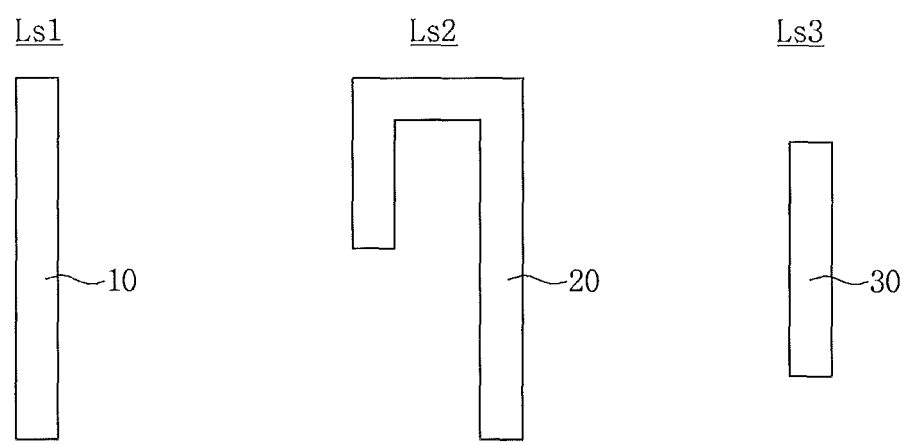

Referring to FIG. 3B, the method may include separating the initial layout Li into at least three sub-layouts Ls1, Ls2 and Ls3. The at least three sub-layouts Ls1, Ls2 and Ls3 may include different patterns 10, 20 and 30 so that the patterns do not overlap. For example, the method may include generating a first sub-layout Ls1 by extracting and separating the first design pattern 10 from the initial layout Li, and generating a second sub-layout Ls2 by extracting and separating the second design pattern 20 from the initial layout Li. A third sub-layout Ls3 including the third design pattern 30 may not be separated and generated as an independent layout (i.e., the third sub-layout Ls3 may be omitted).

Referring to FIG. 3C, the method may include forming a first modified sub-layout Lsm1 that includes a first modified design pattern 10m obtained by modifying the first design pattern 10 of the first sub-layout Ls1, and forming a second modified sub-layout Lsm2 that includes a second modified design pattern 20m obtained by modifying the second design pattern 20 of the second sub-layout Ls2. The first modified design pattern 10m may include a first horizontal extra pattern 51h, the second modified design pattern 20m may include a second horizontal extra pattern 52h and a vertical extra pattern 52v. The vertical extra pattern 52v of the second modified design pattern 20m may remove the first wide space Sw1 shown in the FIG. 3A or may reduce the width of the first wide space Sw1 shown in the FIG. 3A to the limiting resolution or less. The second horizontal extra pattern 52h of the second modified design pattern 20m may remove the second wide space Sw2 shown in the FIG. 3A or may reduce the width of the second wide space Sw2 shown in the FIG. 3A to the limiting resolution or less. The first horizontal extra pattern 51h of the first modified design pattern 10m may define an end of the vertical extra pattern 52v of the second modified design pattern 20m. In addition, the first horizontal extra pattern 51h of the first modified design pattern 10m may change the shape of the second modified design pattern 20m to a shape of a closed curve. Furthermore, the first horizontal extra pattern 51h of the first modified design pattern 10m may also ensure that the vertical extra pattern 52v and the second horizontal extra pattern 52h of the second modified design pattern 20m are geometrically continued or connected. The first modified sub-layout Lsm1 may correspond to a first photo mask layout, and the second modified sub-layout Lsm2 may correspond to a second photo mask layout.

FIG. 3D is a modified layout Lm in which the first modified sub-layout Lsm1 and the second modified sub-layout Lsm2 are positioned adjacent each other. Referring to FIG. 3D, the modified layout Lm may include the first modified sub-layout Lsm1 having the first modified design pattern 10m and the second modified sub-layout Lsm2 having the second modified design pattern 20m. In comparison with the initial layout Li shown in FIG. 3A, the first design pattern 10 is replaced with the first modified design pattern 10m, the second design pattern 20 is replaced with the second modified design pattern 20m, and the third design pattern 30 is omitted. The first wide space Sw1 and the second wide space Sw2 shown in FIG. 3A may be removed, or may be reduced in size to have a width that is similar to the width of the narrow space Sn that is equal to or less than the limiting resolution, by the first modified design pattern 10m and the second modified design pattern 20m. Thereafter, the method may further include performing a self-aligned double patterning process on a wafer using the modified layout Lm. As described above, the modified layout Lm may be separated into two layouts on two photo masks, respectively, in the self-aligned double patterning process. Further referring to FIG. 3C, the modified layout Lm may be separated into the first photo mask and the second photo mask and used for the self-aligned double patterning process.

Figure 3E:
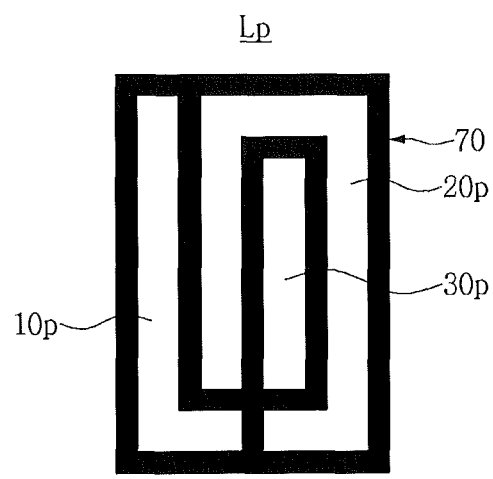

FIG. 3E is a pattern layout Lp conceptually illustrating shapes in which spacer patterns 70 are formed on a wafer when a self-aligned double patterning process is performed using the modified layout Lm shown in FIG. 3D. Referring to FIG. 3E, the spacer patterns 70 may be formed on perimeters of the first modified design pattern 10m and the second modified design pattern 20m, and thus the first final pattern 10m, the second final pattern 20p, and the third final pattern 30p may be formed. In other words, the spacer patterns 70 formed on the perimeters of the second modified design pattern 20m may define the third final pattern 30p, and the spacer patterns 70 formed on the perimeter of the first horizontal extra pattern 51h may ensure that the second final pattern 20p has a shape of a closed curve or is geometrically connected.

According to embodiments of the inventive concepts, two directions of a specific pattern may be spaced apart or separated from adjacent spaces. All of the initial layouts Li and the modified layouts Lm may be a dot, line or mirror symmetry.

The processes above with reference to FIGS. 1A to 3E may be performed using a computer except for the self-aligned double patterning processes that are performed on the wafer.

Figure 4A:
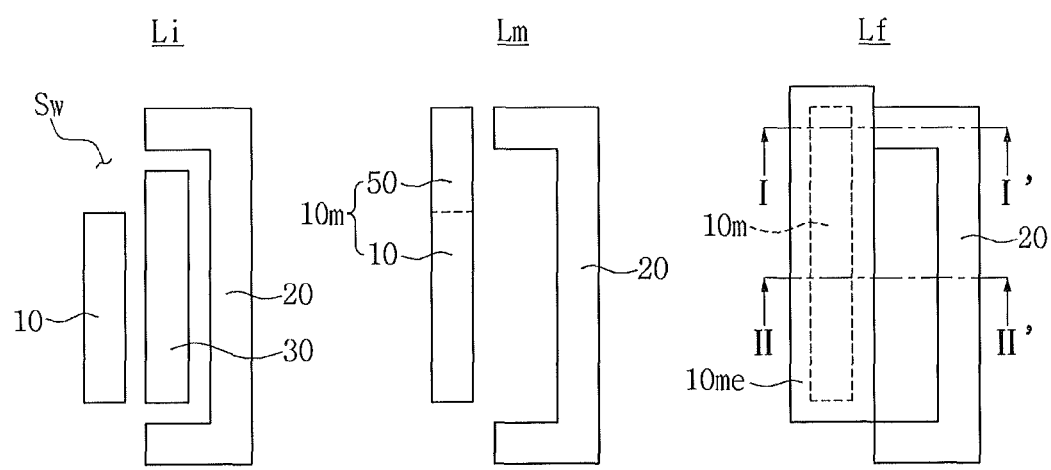
FIGS. 4A to 4Q, 5A to 5Q, and 6A to 6Q are plan views that illustrate methods of forming patterns in a wafer by performing a self-aligned double patterning process using modified layouts in accordance with embodiments of the inventive concepts.
Figure 4B:
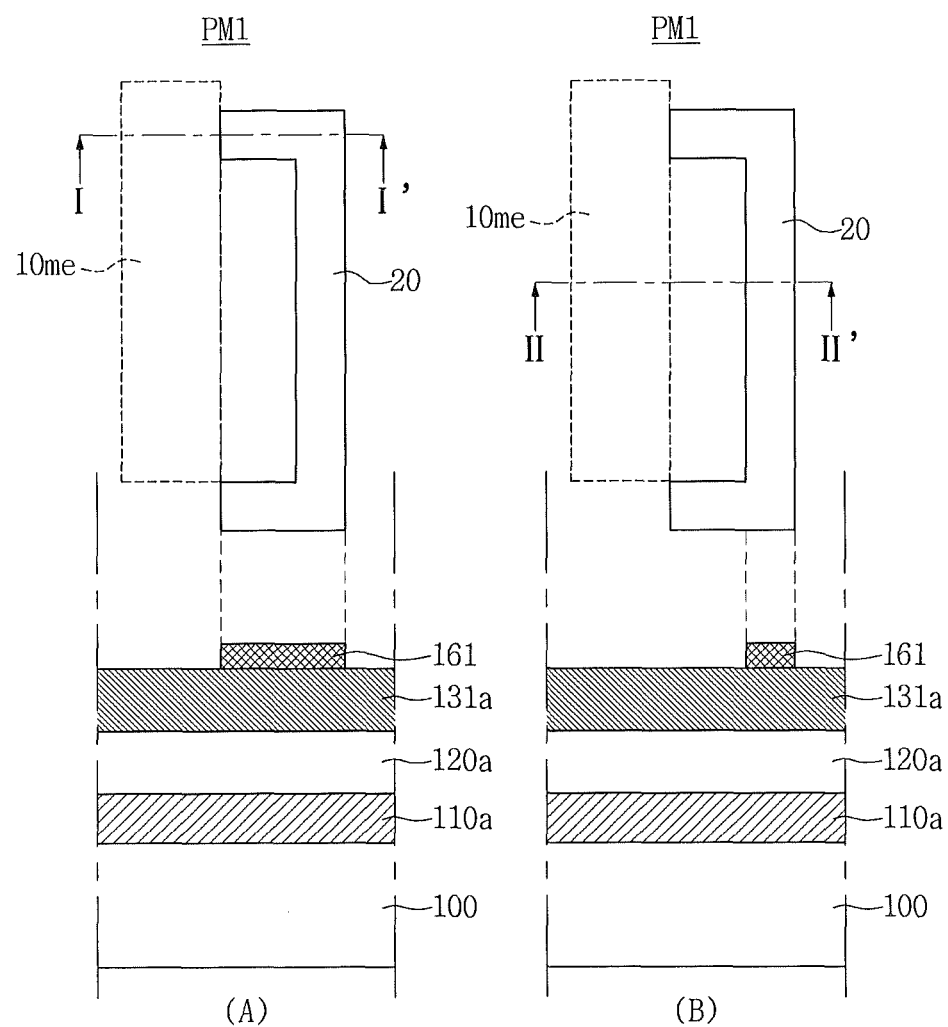
Figure 4C:
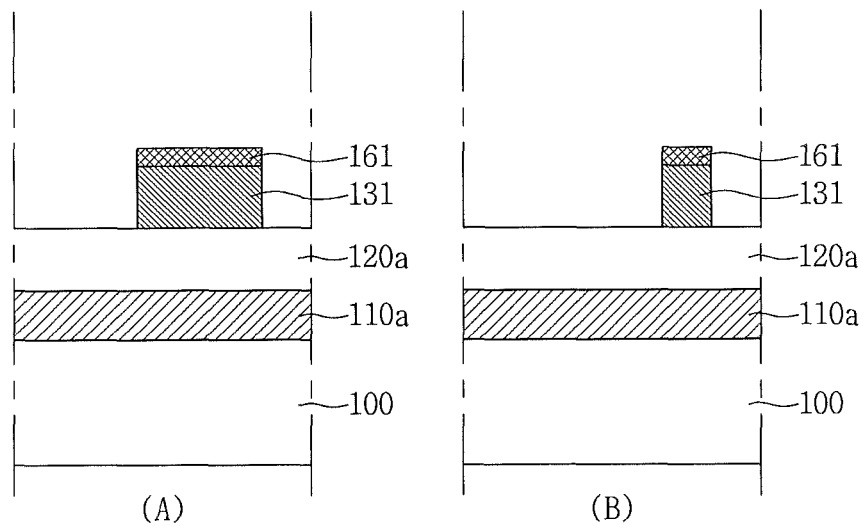
Figure 4D:
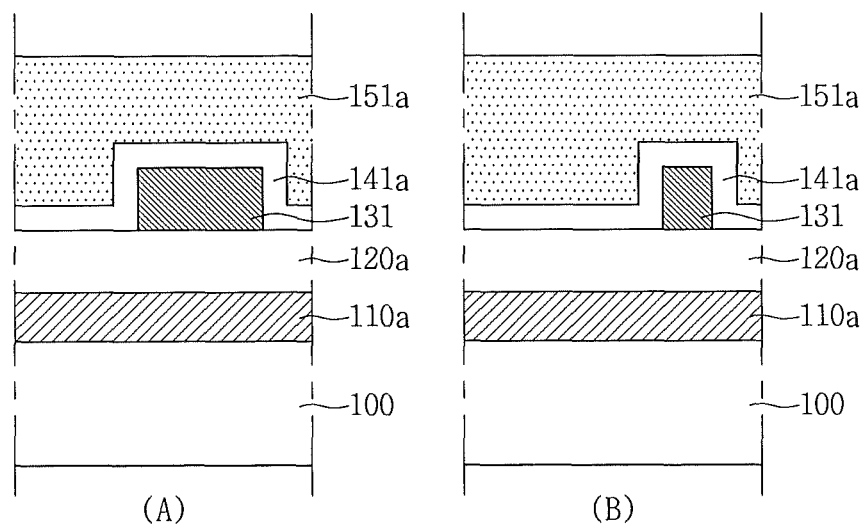
Figure 4E:
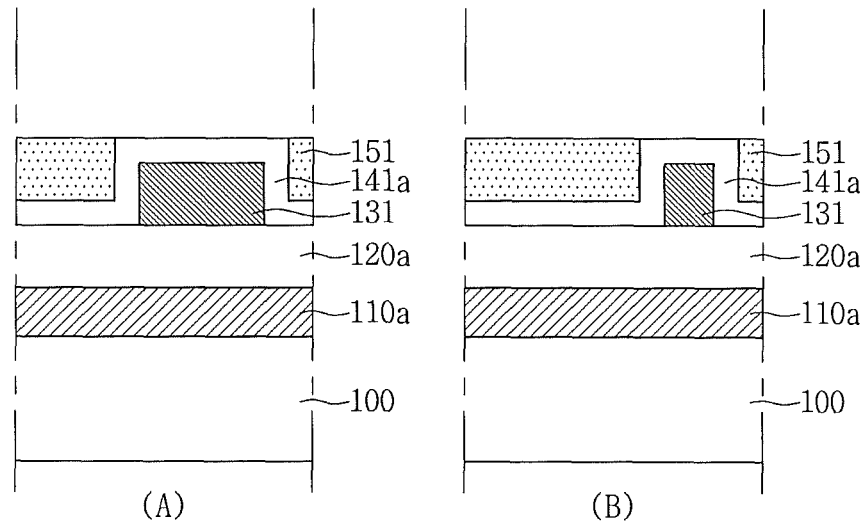
Figure 4F:
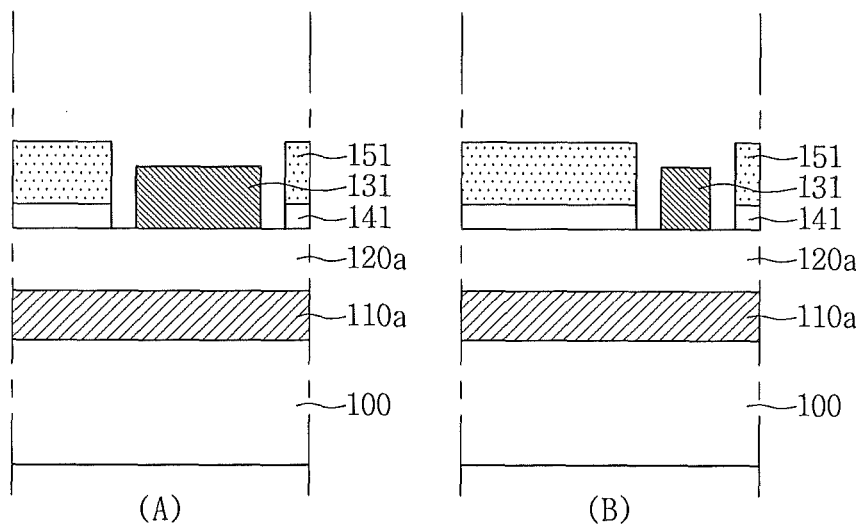
Figure 4G:
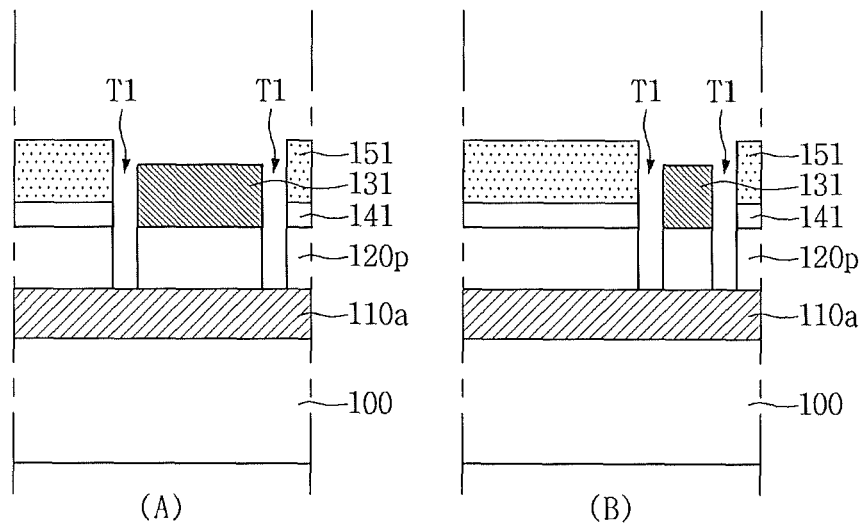
Figure 4H:
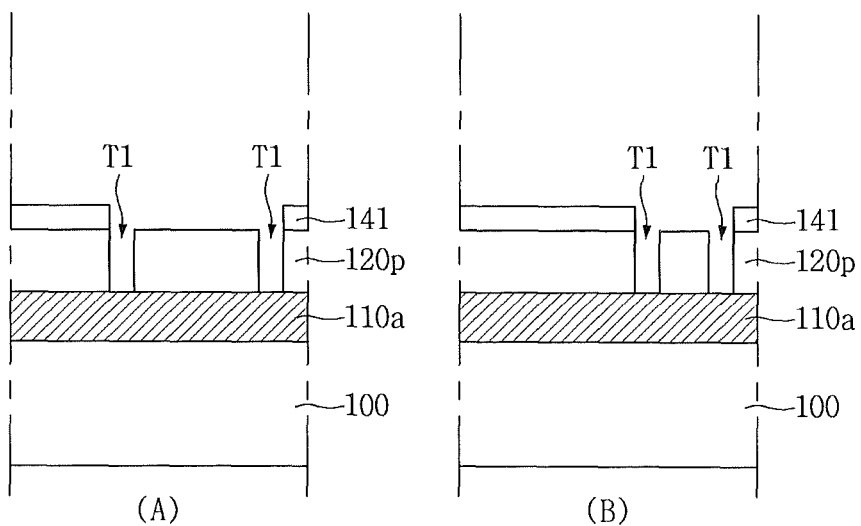
Figure 4I:
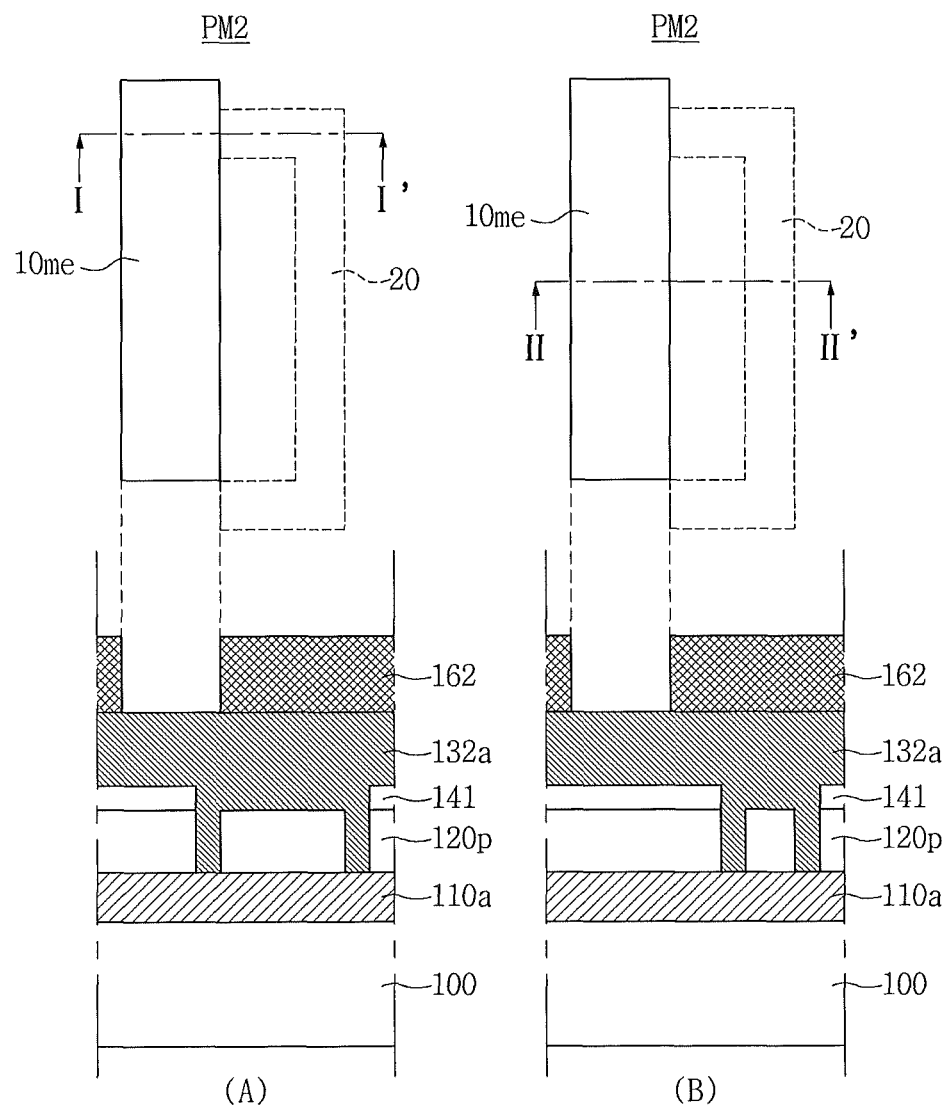
Figure 4J:
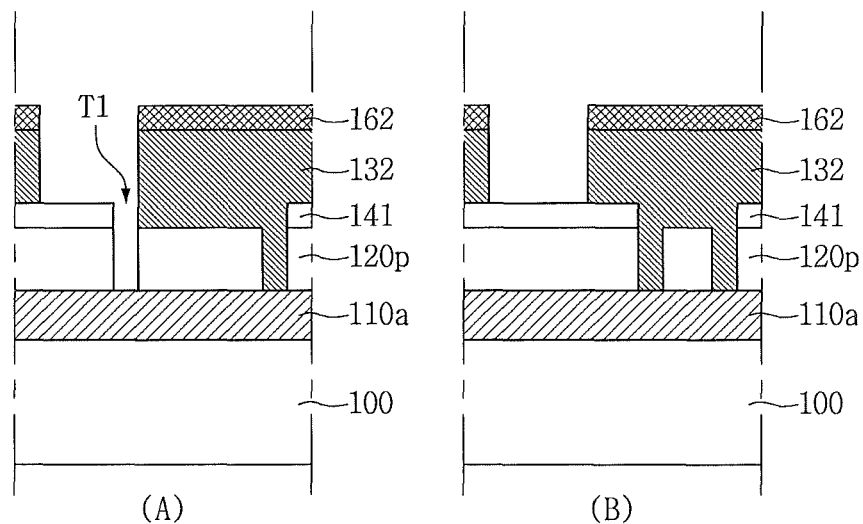
Figure 4K:
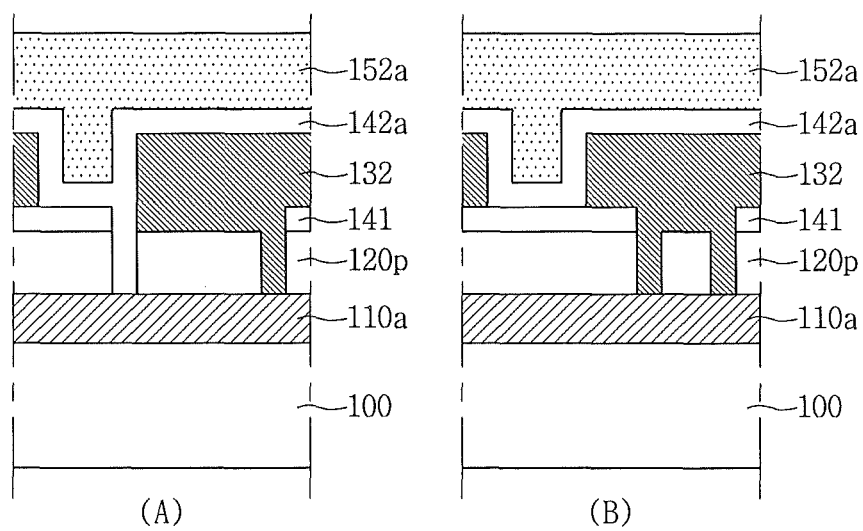
Figure 4L:
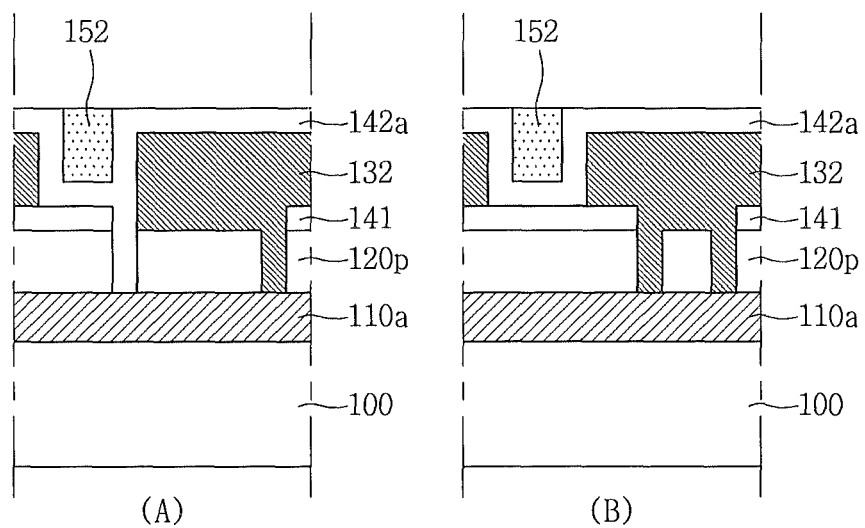
Figure 4M:
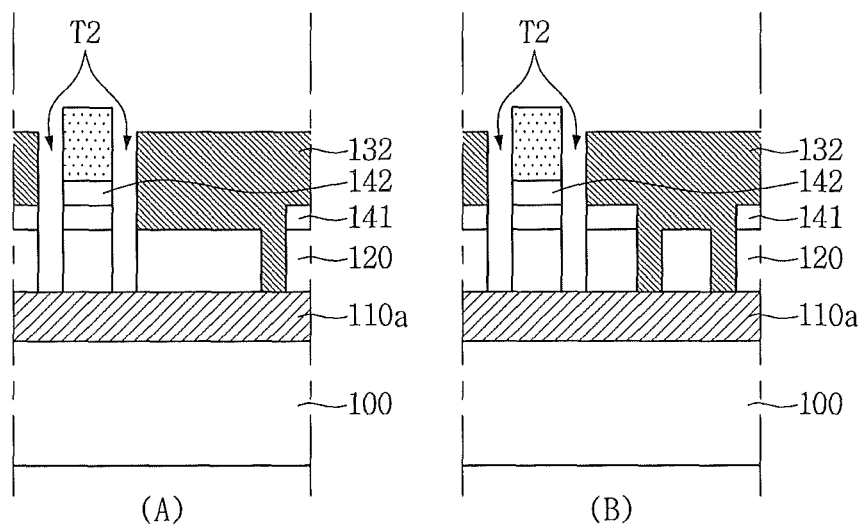
Figure 4N:
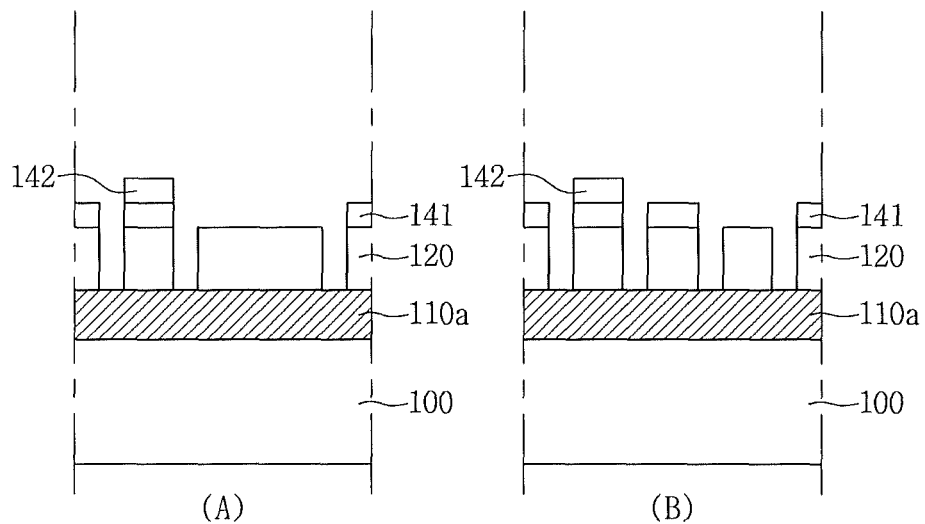
Figure 4O:
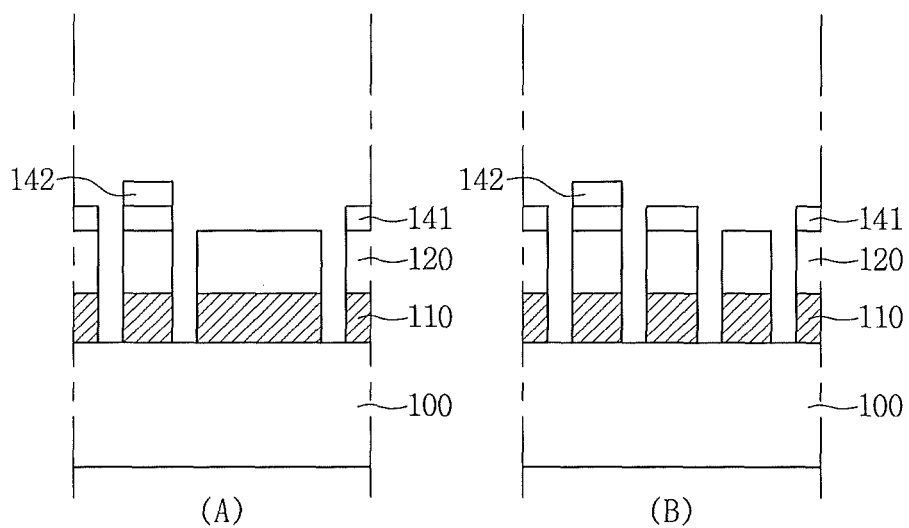
Figure 4P:
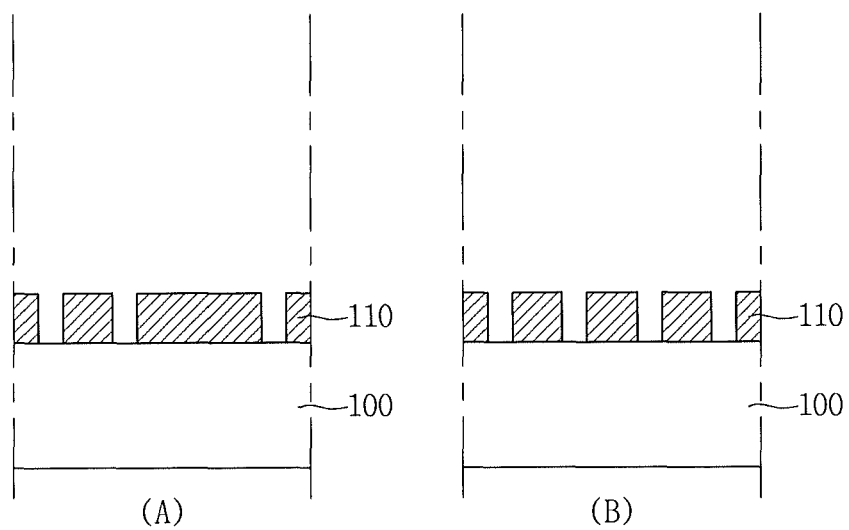
Figure 4Q:
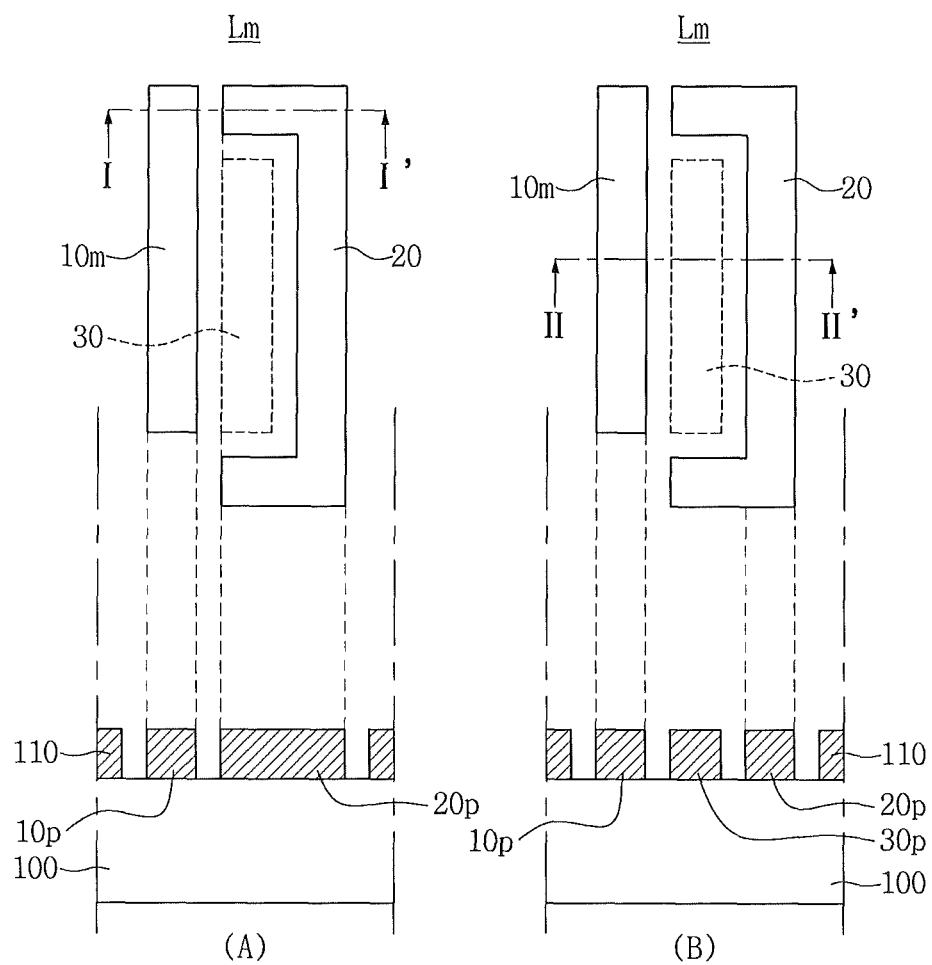

FIGS. 4A to 4Q are plan views that illustrate methods of performing a self-aligned double patterning process in accordance with an embodiment of the inventive concepts.

Referring to FIG. 4A, the method may include preparing an initial layout Li, a modified layout Lm obtained by modifying the initial layout Li, and a final layout Lf obtained by further modifying the modified layout Lm.

The initial layout Li may include a first design pattern 10, a second design pattern 20, a third design pattern 30 that is between the first design pattern 10 and the second design pattern 20, and a wide space Sw having a width that exceeds the width of a short side of the third design pattern 30. The wide space Sw may be a space between the first design pattern 10 and the second design pattern 20.

The modified layout Lm may include a first modified design pattern 10m and the second design pattern 20. The first modified design pattern 10m may include an extra pattern 50 that extends onto the wide space Sw of the initial layout Li.

Embodiments of the inventive concepts with reference to FIG. 4A will be more clearly understood with reference to FIGS. 1A to 1K.

The final layout Lf is obtained by further modifying the modified layout Lm according to processes to be performed in a process which forms patterns on a wafer using the modified layout Lm. For example, the modified layout Lm is further modified according to a combination of a positive photolithography process which forms a spacer pattern on an outer surface of a perimeter and a negative photolithography process which forms the spacer pattern on an inner surface of the perimeter. In the embodiments, a process which forms the spacer pattern on the inner surface of a perimeter of the first modified design pattern 10*m* will be described. Accordingly, the final layout Lf may include a first extended and modified design pattern 10*me*. The final layout Lf may be separated into a second photo mask layout including the first extended and modified design pattern 10*me* and a first photo mask layout including the second design pattern 20.

FIGS. 4B to 4Q are plan views that illustrate methods of forming a semiconductor device by performing a self-aligned double patterning process on a wafer that includes the semiconductor device using the modified layout Lm shown in FIG. 4A. In FIGS. 4B to 4Q, (A) is a longitudinal sectional view taken along line I-I' in FIGS. 4A, and (B) is a longitudinal sectional view taken along line II-IF in FIG. 4A. In FIGS. 4B, 4I and 4Q plan views of the final layout Lf are also provided above each longitudinal sectional view.

Referring to FIG. 4B, the method may include forming a target layer 110*a*, a lower mask layer 120*a*, a first upper mask layer 131*a*, and a first etching mask pattern 161 on a base layer 100. The first etching mask pattern 161 may be formed using a first photo mask PM1 that includes the second design pattern 20 shown in FIG. 4A. Accordingly, the first etching mask pattern 161 may define the second design pattern 20. For example, the first etching mask pattern 161 may be substantially the same as the second design pattern 20 of the modified layout Lm in a top view. The first extended and modified design pattern 10*me* in FIG. 4A is virtually indicated in FIG. 4B using a dotted line.

The base layer 100 may include a bulk silicon wafer, a silicon-on-insulator (SOI) wafer, an epitaxial growth layer such as an SiGe wafer, an insulating layer such as a silicon oxide layer or silicon nitride layer, or various other material layers.

The target layer 110*a* may include a material layer which is to be patterned. For example, the target layer 110*a* may include a conductive material such as tungsten (W) in embodiments of the inventive concepts.

The lower mask layer 120*a* may include a material having an etch selectivity with respect to the target layer 110*a*. For example, the lower mask layer 120*a* may include silicon nitride. A more soft, tender or sparse insulating material layer, such as silicon oxide, than the target layer 110*a* and the lower mask layer 120*a* may be further included between the target layer 110*a* and the lower mask layer 120*a*.

The first upper mask layer 131*a* may include a material having an etch selectivity with respect to the lower mask layer 120*a*. The first upper mask layer 131*a* may include silicon oxide or polysilicon. In another embodiment, the first upper mask layer 131*a* may include silicon oxide which has good fluidity and includes carbon (C) such as a spin-on-hard (SOH) mask.

The first etching mask pattern 161 may include a material having an etch selectivity with respect to the first upper mask layer 131*a*. For example, the first etching mask pattern 161 may include one of photoresist, silicon oxide, silicon nitride, silicon oxynitride, or polysilicon. The first etching mask pattern 161 may include a positive-type photoresist. Furthermore, the first etching mask pattern 161 may include one of a silicon nitride pattern, silicon oxynitride pattern, or polysilicon pattern formed by a photoresist pattern. In the description of example embodiments that follows, the first etching mask pattern 161 includes photoresist.

Referring to FIG. 4C, the method may include forming a first upper mask pattern 131 by etching the first upper mask layer 131*a* using the first etching mask pattern 161 as an etching mask. The first etching mask pattern 161 may have a small vertical thickness. The first etching mask pattern 161 may then be removed. However, it will be appreciated that in other embodiments (not shown) the first etching mask pattern 161 may be left on the first upper mask pattern 131.

Referring to FIG. 4D, the method may include conformally forming a first spacer layer 141*a* on side surfaces and an upper surface of the first upper mask pattern 131, and forming a first middle mask layer 151*a* on the entire surface of the first spacer layer 141*a*. The first spacer layer 141*a* may include a material having an etch selectivity with respect to the first upper mask pattern 131. For example, the first spacer layer 141*a* may include the same material as the lower mask layer 120*a*. The first middle mask layer 151*a* may include a material having an etch selectivity with respect to the first spacer layer 141*a*. For example, the first middle mask layer 151*a* may include silicon oxide, polysilicon or SOH.

Referring to FIG. 4E, the method may include forming a first middle mask pattern 151 which exposes an uppermost surface of the first spacer layer 141*a* by partly removing an upper portion of the first middle mask layer 151*a* by performing a planarization process such as an etch-back or CMP process.

Referring to FIG. 4F, the method may include partially exposing a surface of the lower mask layer 120*a* by etching the exposed first spacer layer 141*a* using the first middle mask pattern 151 as an etching mask to form a first spacer pattern 141.

Referring to FIG. 4G, the method may include forming a preliminary lower mask pattern 120*p* having first trenches T1 which partly expose an upper surface of the target layer 110*a* by selectively etching the exposed lower mask layer 120*a*. When the first spacer layer 141*a* and the lower mask layer 120*a* include the same material, the first spacer layer 141*a*, and the lower mask layer 120*a* may be continuously removed through the same etching process.

Referring to FIG. 4H, the method may include removing the first middle mask pattern 151 and the first upper mask pattern 131. In embodiments in which the first middle mask pattern 151 and the first upper mask pattern 131 include the same material, both may be simultaneously removed.

Referring to FIG. 4I, the method may include forming a second upper mask layer 132*a* on the entire surface of the resultant structure, and forming a second etching mask pattern 162 on the second upper mask layer 132*a*. The second etching mask pattern 162 may be formed using a second photo mask PM2 that includes the first extended and modified design pattern 10*me* shown in FIG. 4A. Accordingly, the second etching mask pattern 162 may define the first extended and modified design pattern 10*me*. For example, the second etching mask pattern 162 may be substantially the same as the first extended and modified design pattern 10*me* shown in FIG. 4A in a top view. The second design pattern 20 of FIG. 4A is virtually indicated using a dotted line in FIG. 4I.

The second upper mask layer 132*a* may fill the first trenches T1. The second upper mask layer 132*a* may include the same material as the first upper mask layer 131*a*. For example, the second upper mask layer 132a may include silicon oxide, SOH, or polysilicon. The second etching mask pattern 162 may include the same material as the first etching mask pattern 161. For example, one of photoresist, silicon oxide, silicon nitride, silicon oxynitride, or polysilicon may be included in the second etching mask pattern 162. In some embodiments, the second etching mask pattern 162 may include one of a silicon nitride pattern, a silicon oxynitride pattern, or a polysilicon pattern formed by a negative-type photoresist or photoresist pattern.

Referring to FIG. 4J, the method may include forming a second upper mask pattern 132 by etching the second upper mask layer 132a using the second etching mask pattern 162 as an etching mask. A portion of an upper surface of the target layer 110a may be exposed by removing portions of the second upper mask layer 132a that are in the first trenches T1. The second etching mask pattern 162 may be thinned to have a small vertical thickness. The second etching mask pattern 162 may be removed once the second upper mask pattern 132 is formed.

Referring to FIG. 4K, the method may include conformally forming a second spacer layer 142a on the second upper mask pattern 132, and forming a second middle mask layer 152a on the entire surface of the second spacer layer 142a. The second spacer layer 142a may fully fill the first trenches T1.

Referring to FIG. 4L, the method may include forming a second middle mask pattern 152 which exposes an uppermost surface of the second spacer layer 142a by partly removing an upper portion of the second middle mask layer 152a. The upper portion of the second middle mask layer 152a may be removed by performing a planarization process such as an etch-back or CMP process.

Referring to FIG. 4M, the method may include using the second middle mask pattern 152 as an etching mask to sequentially etch the exposed second spacer layer 142a, parts of the first spacer pattern 141 that are exposed by the etching of the exposed portions of the second spacer layer 142a, and parts of the preliminary lower mask pattern 120p that are exposed by the etching of the exposed portions of the first spacer pattern 141. Via this etching process, the second spacer layer 142a is converted into a second spacer pattern 142 and the preliminary lower mask pattern 120p is converted into a lower mask pattern 120 that has second trenches T2 which expose other parts of the upper surface of the target layer 110a.

Referring to FIG. 4N, the method may include removing the second middle mask pattern 152 and the second upper mask pattern 132. The lower mask pattern 120, the first spacer pattern 141, and the second spacer pattern 142 may remain on the target layer 110a.

Referring to FIG. 4O, the method may include forming a target pattern 110 by selectively etching the target layer 110a using the first spacer pattern 141, the second spacer pattern 142, and the lower mask pattern 120 as an etching mask.

Referring to FIG. 4P, the method may include removing the first spacer pattern 141, the second spacer pattern 142, and the lower mask pattern 120. The first spacer pattern 141, the second spacer pattern 142, and the lower mask pattern 120 may be removed, for example by performing a wet etching process using phosphorous acid ($H_3PO_4$) or hydrofluoric acid (HF).

FIG. 4Q is a comparison view of target patterns 110 formed using the modified layout Lm. Referring to FIG. 4Q, the third design pattern 30 that is omitted in the modified layout Lm and/or the final layout Lf is formed in the target pattern 110 in accordance with embodiments of the inventive concepts.

Figure 5A:
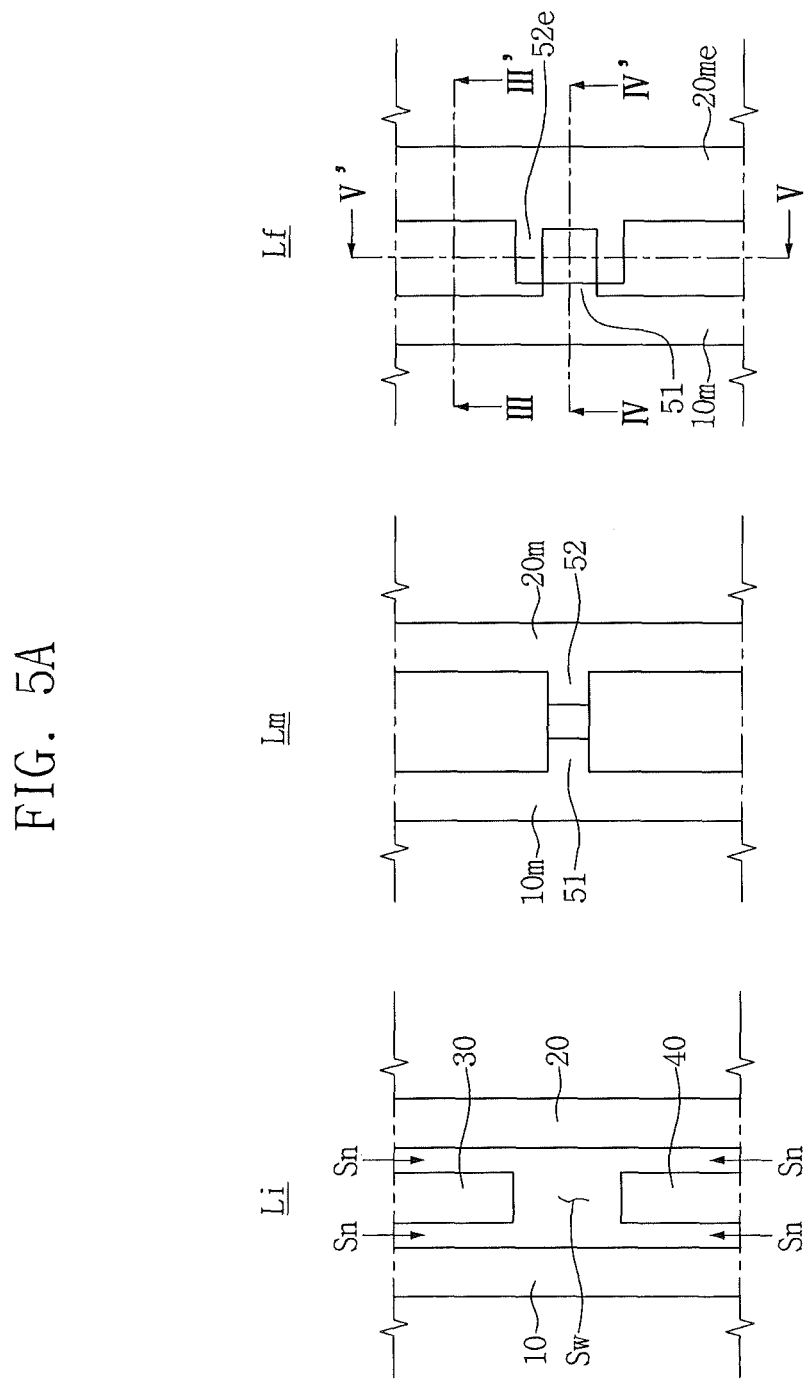
Figure 5C:
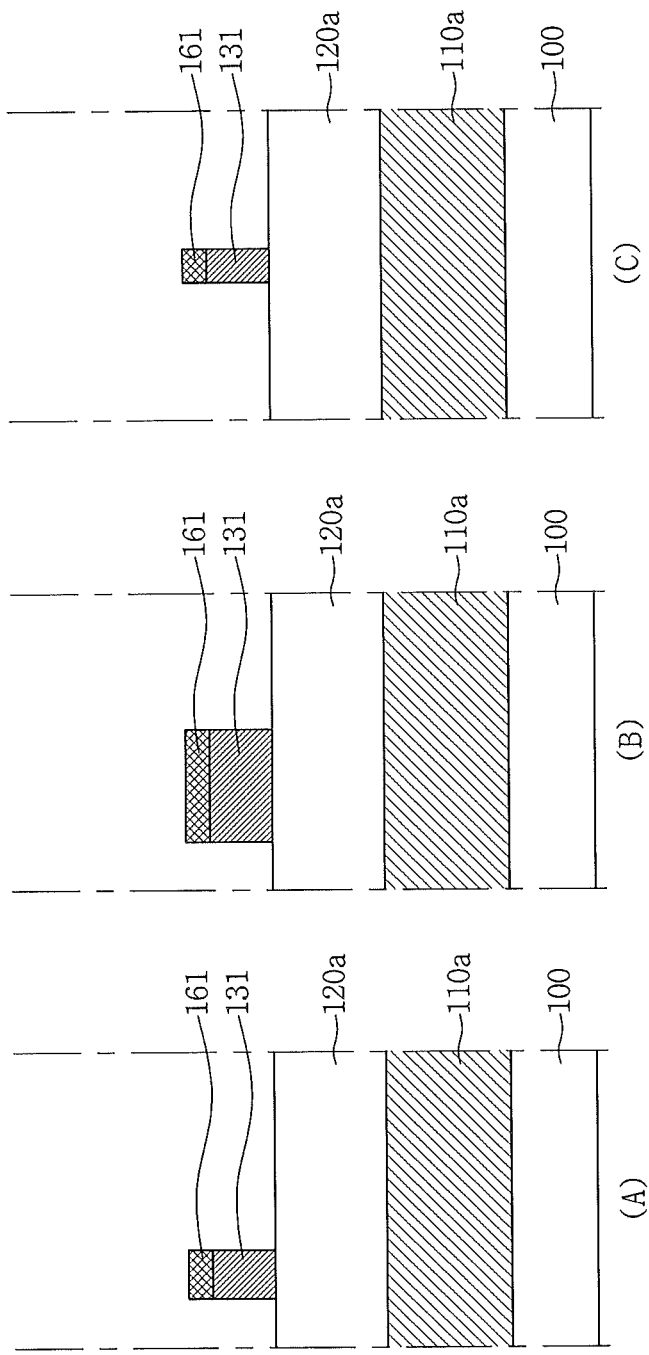
Figure 5D:
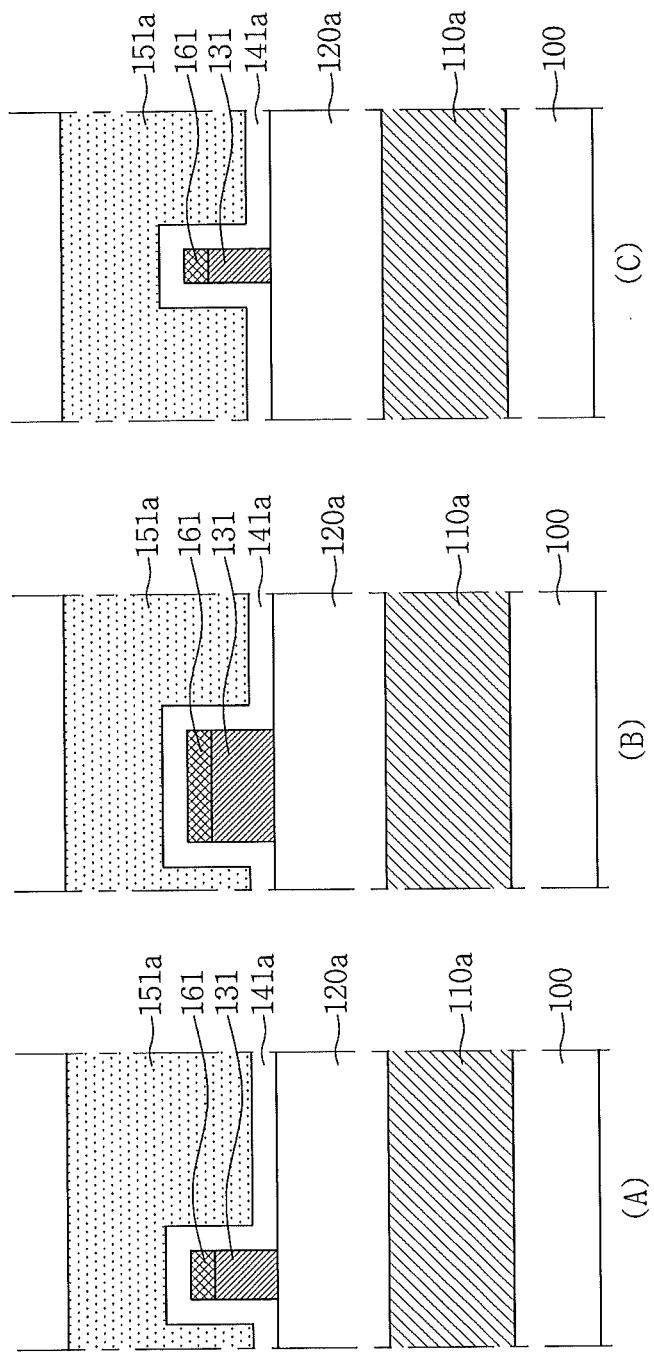
Figure 5E:
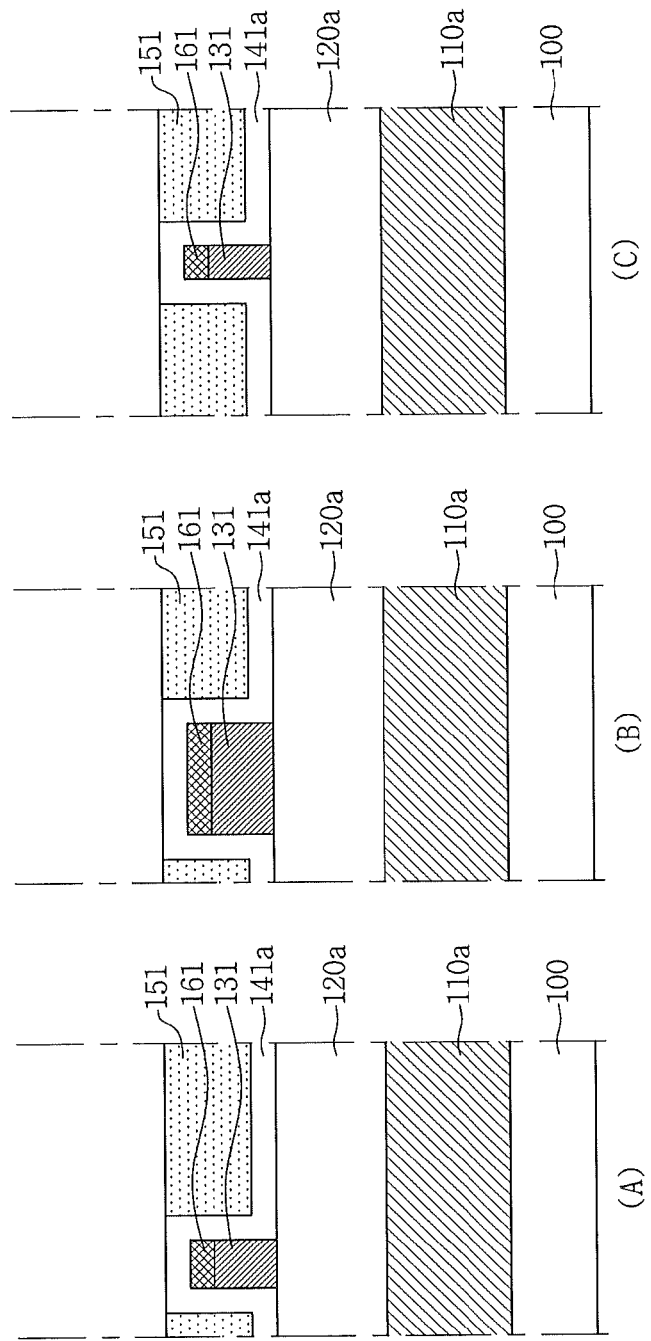
Figure 5F:
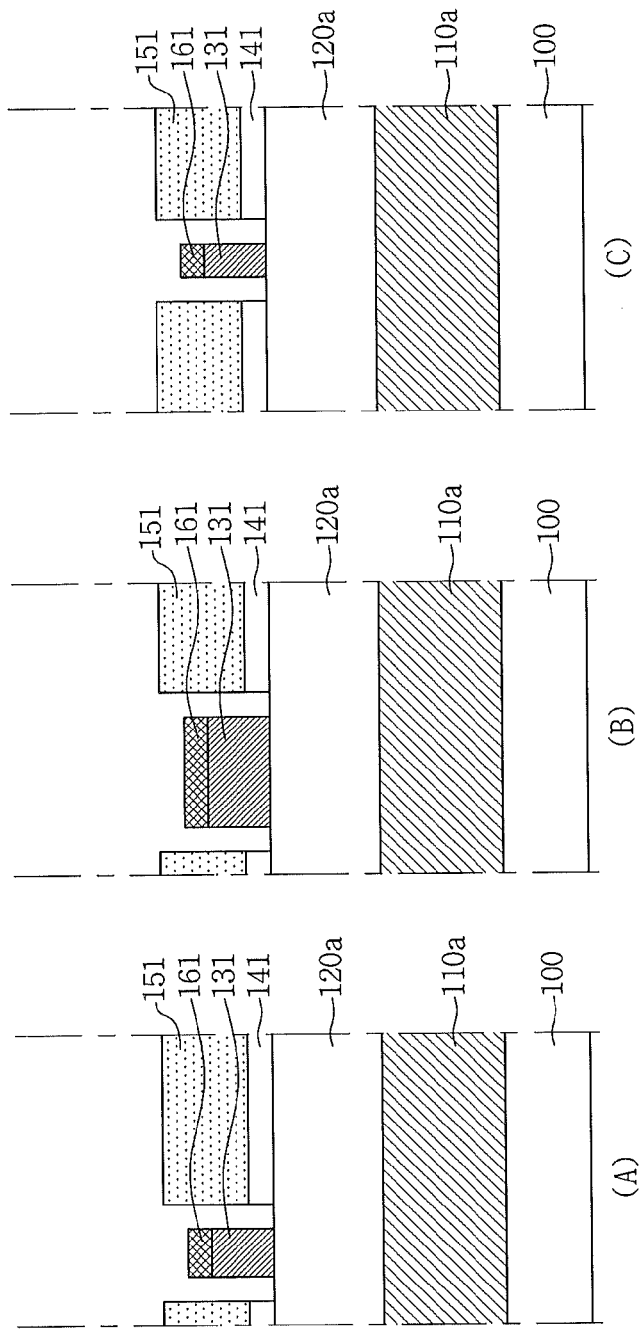
Figure 5G:
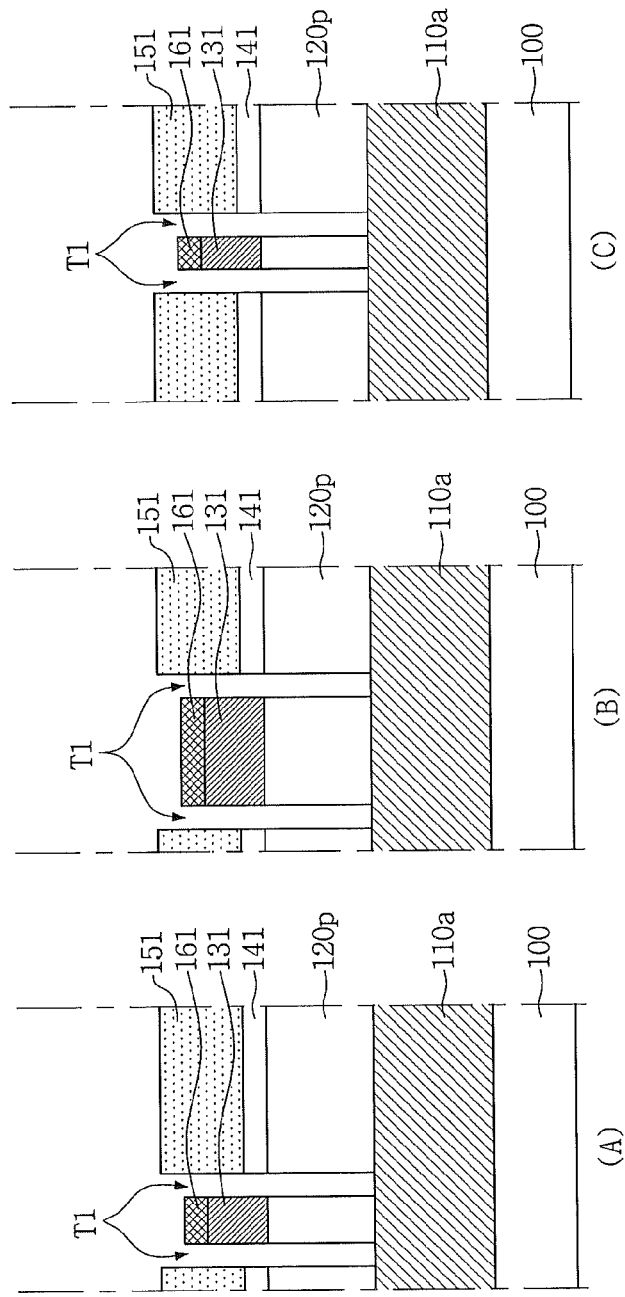
Figure 5H:
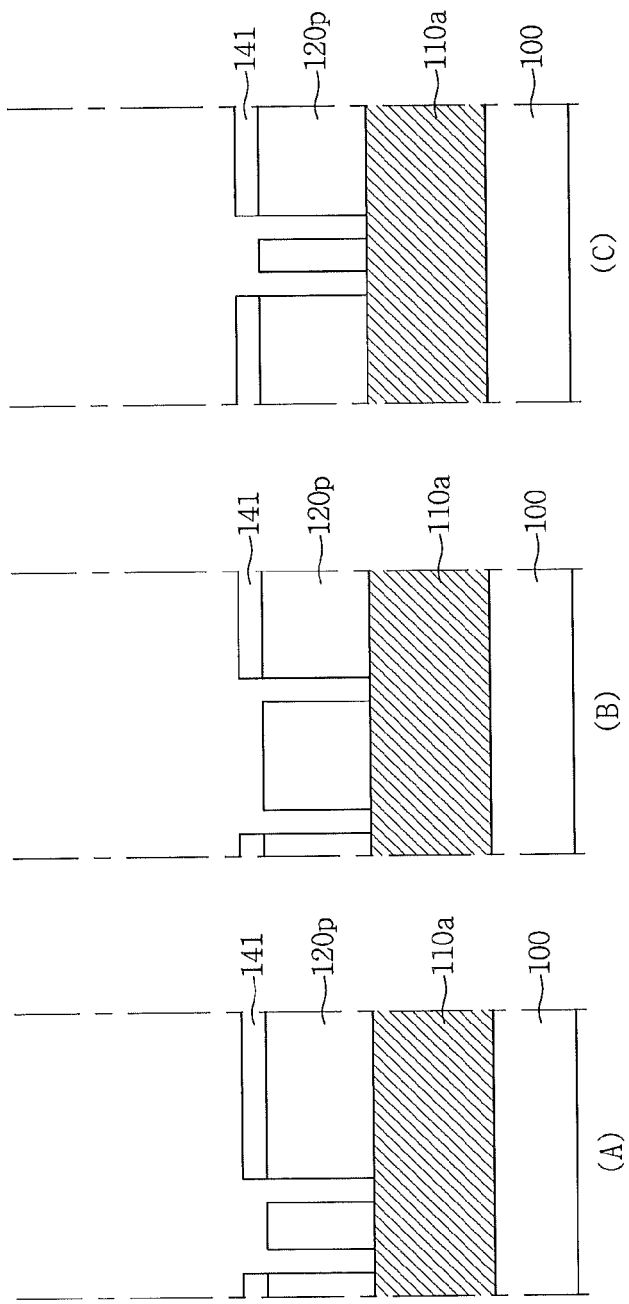
Figure 5I:
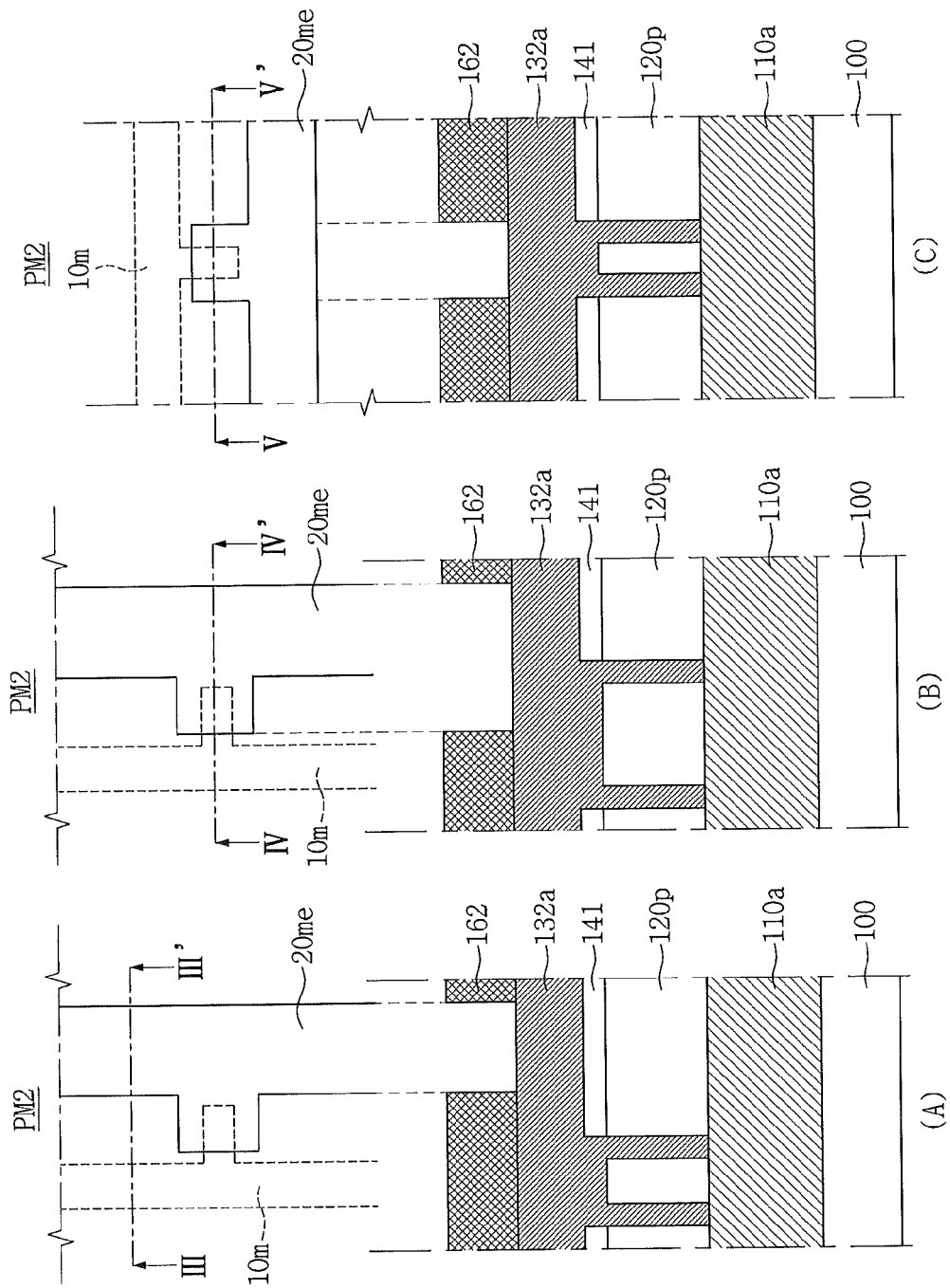
Figure 5J:
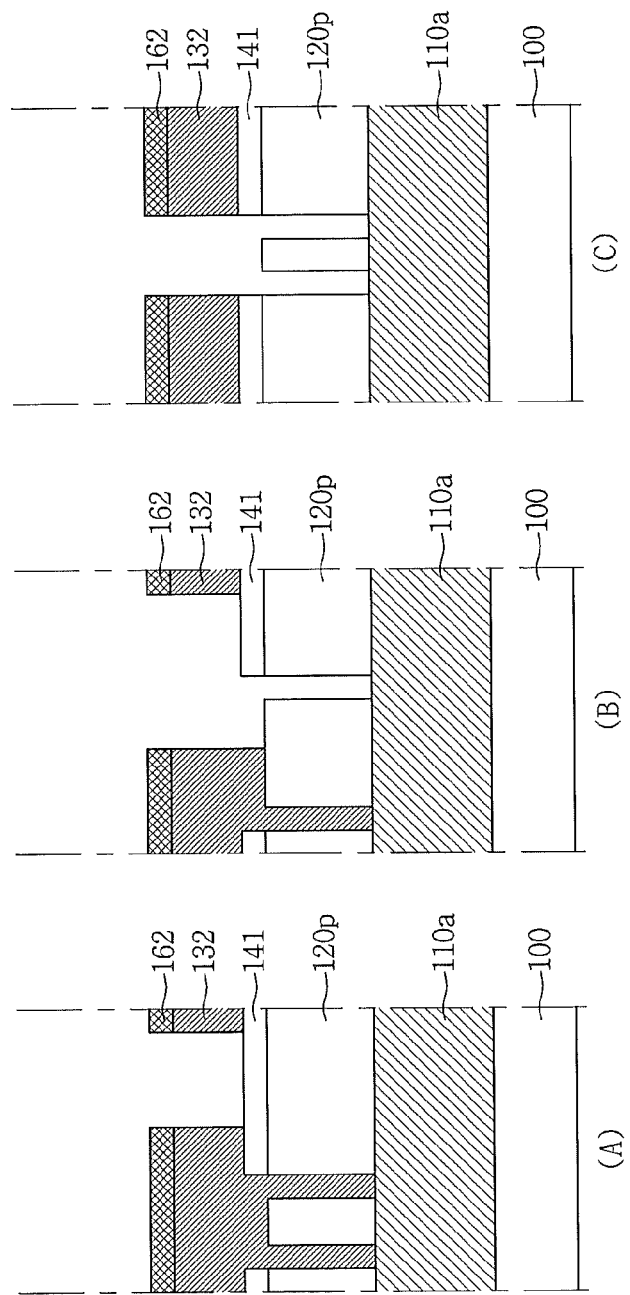
Figure 5K:
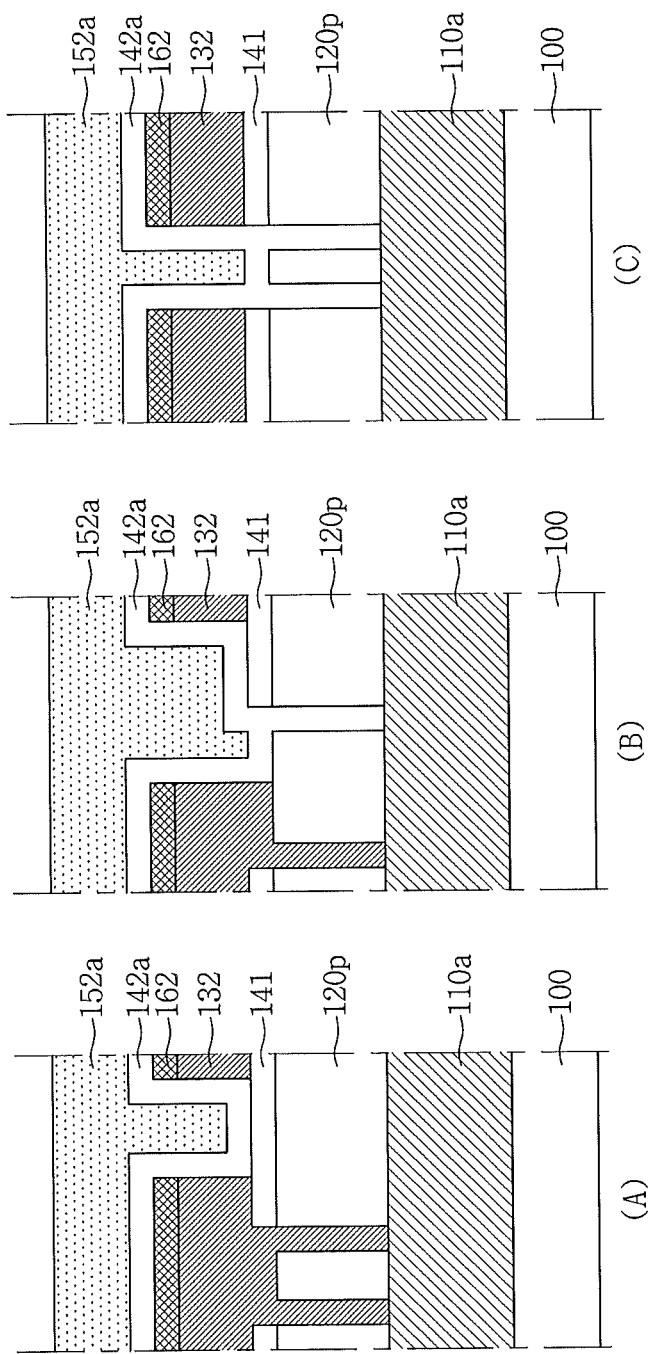
Figure 5L:
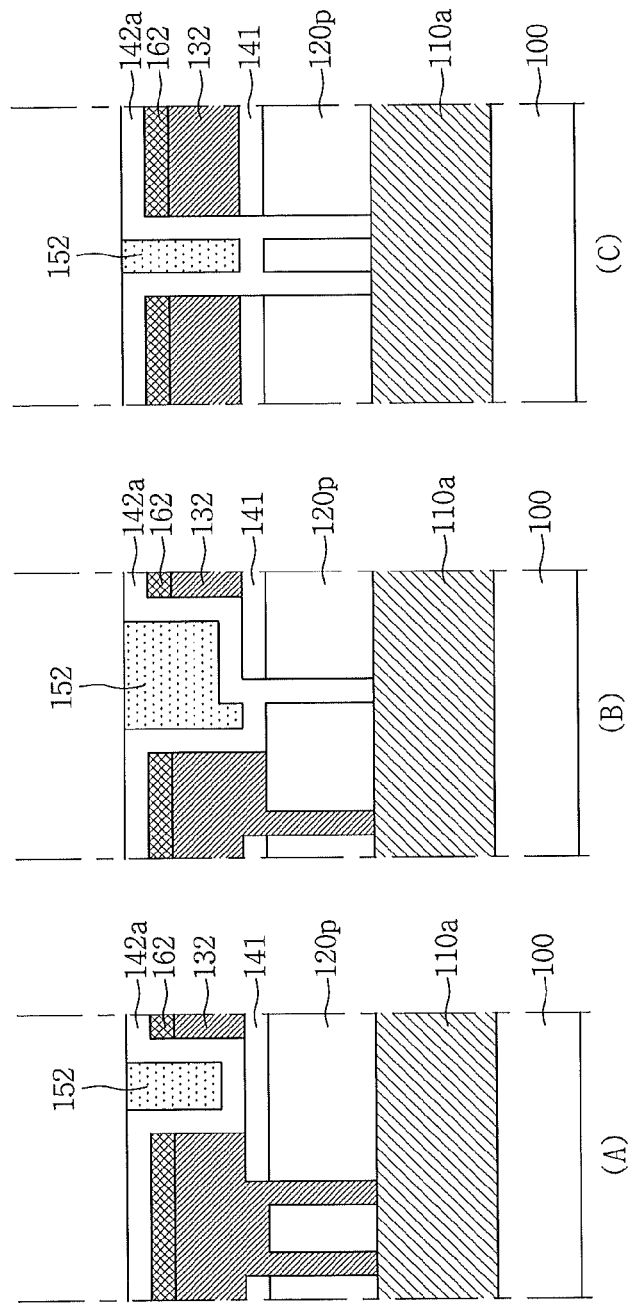
Figure 5M:
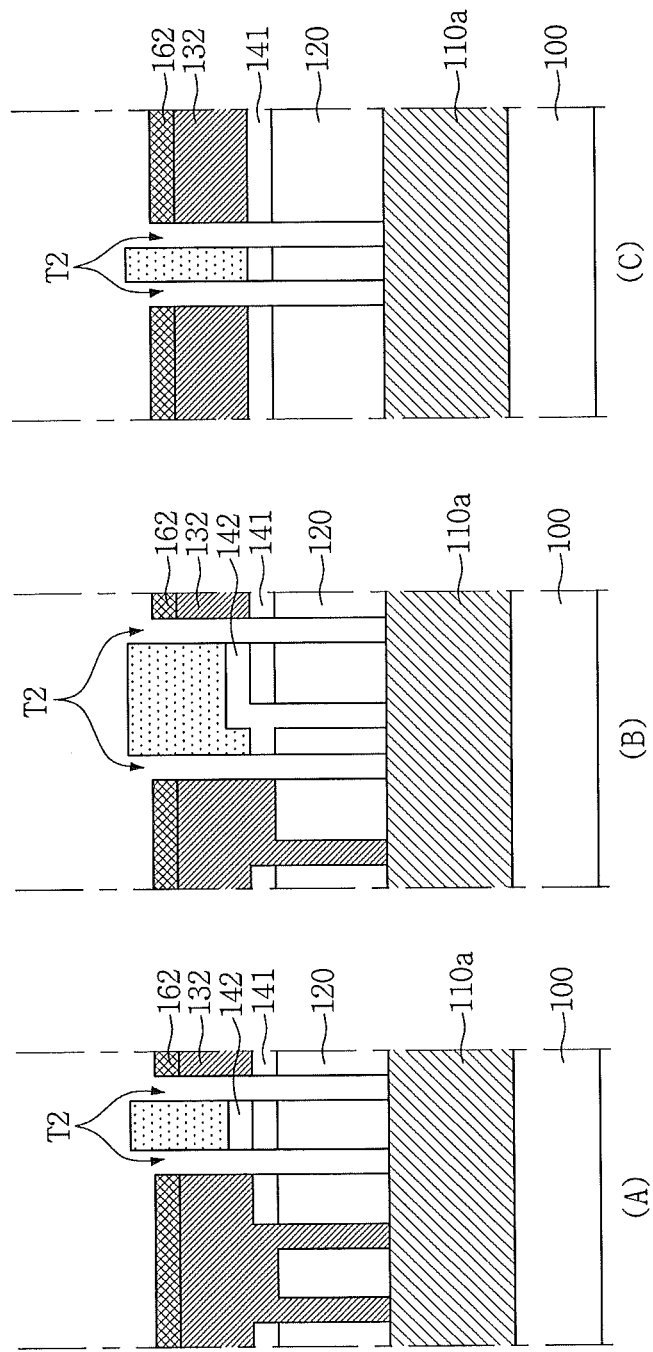
Figure 50:
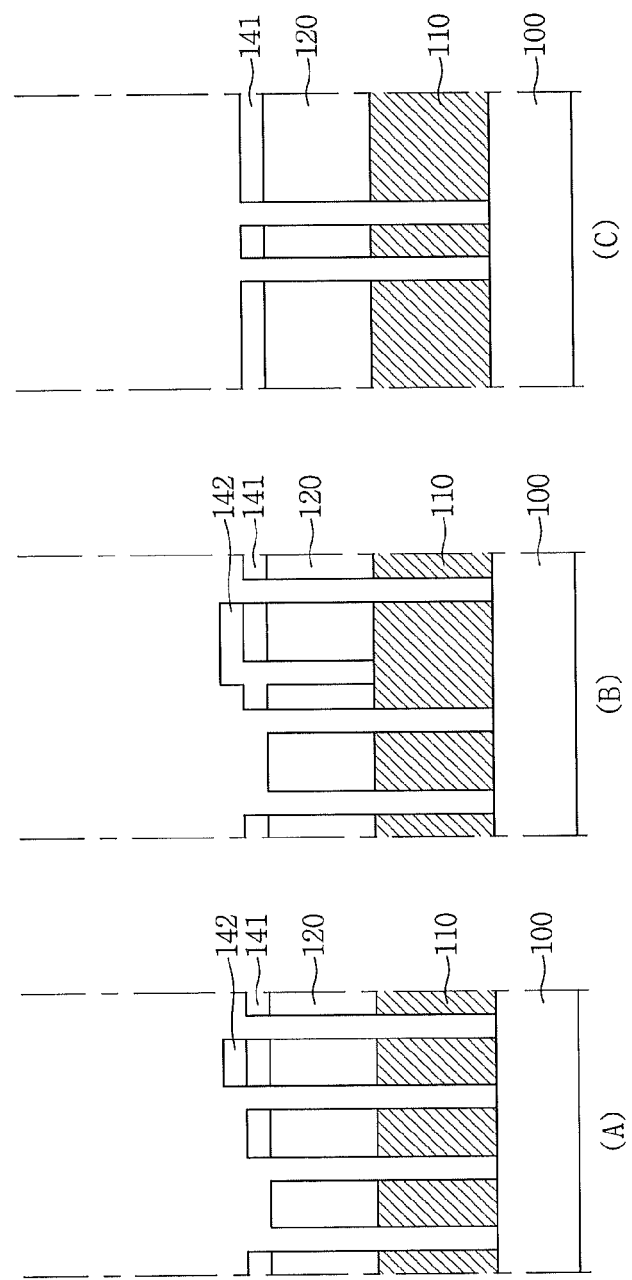
Figure 5P:
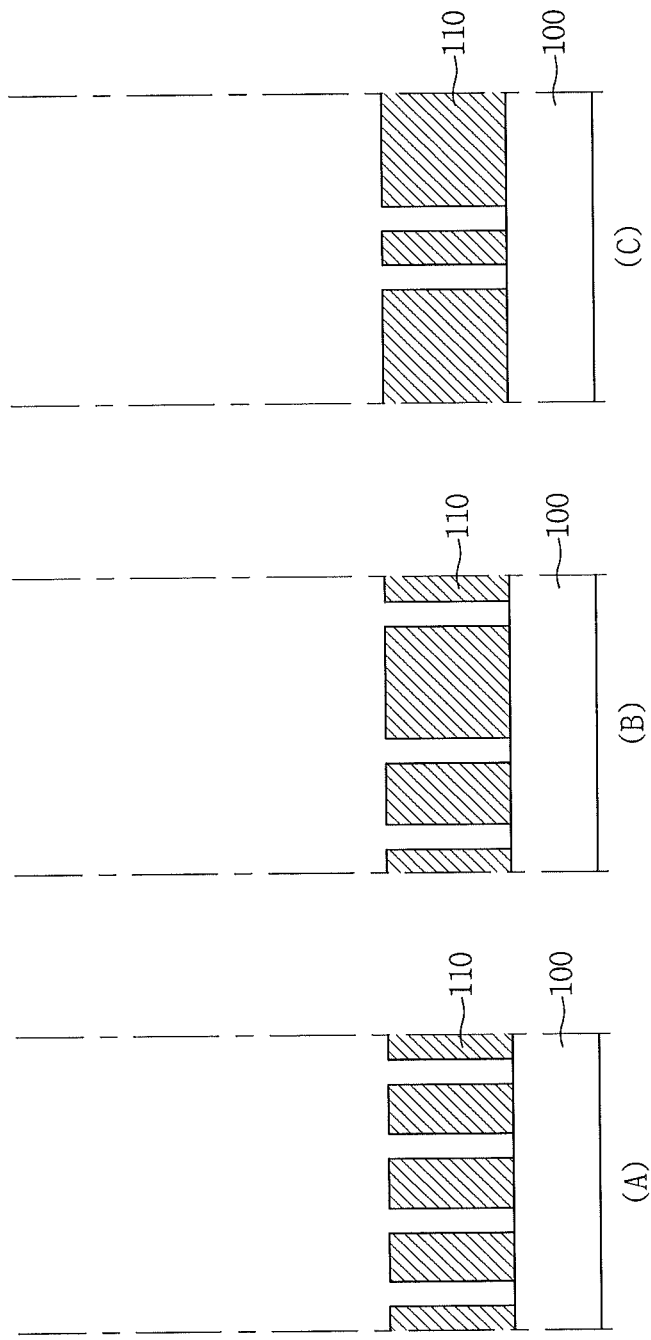
Figure 5Q:
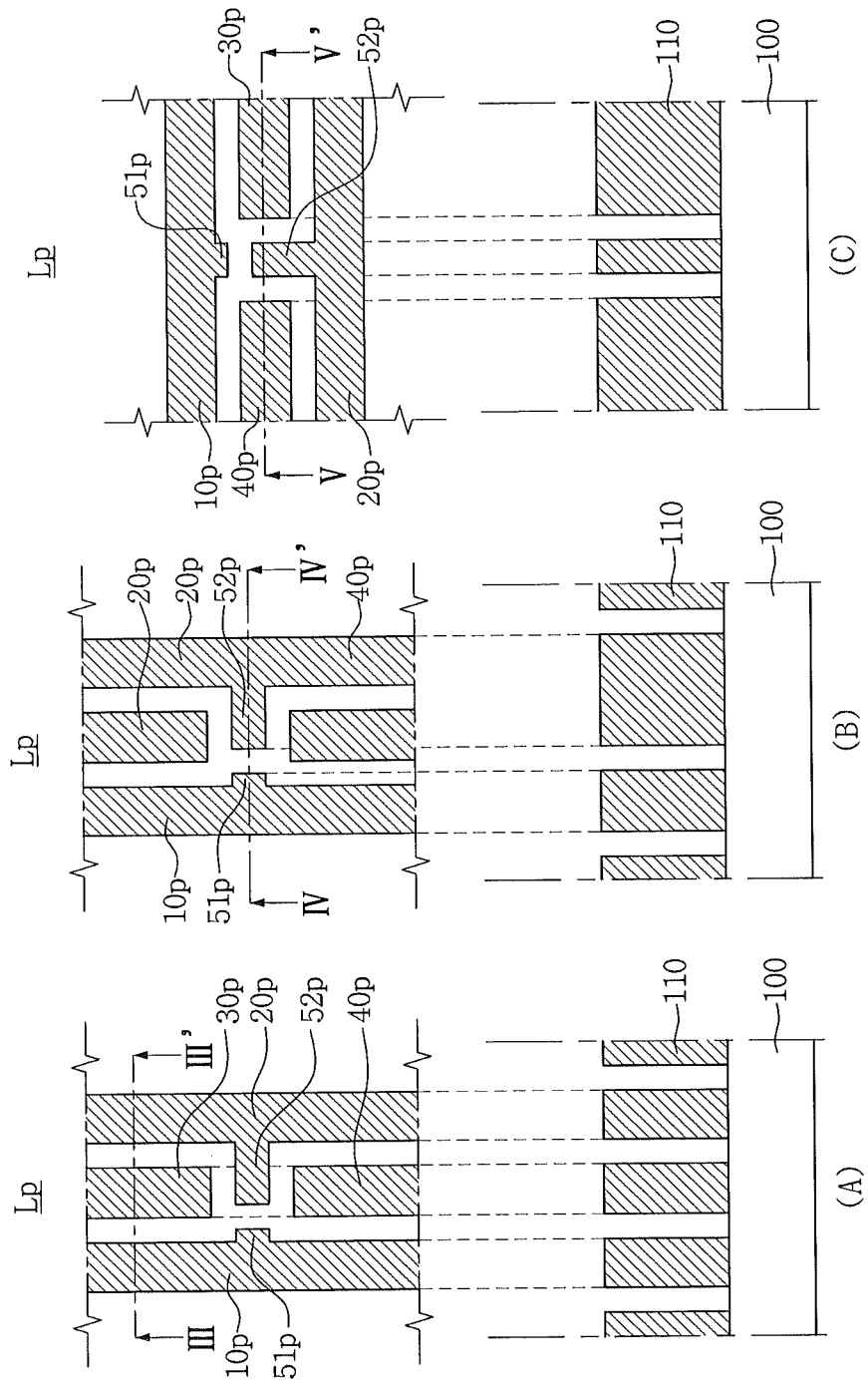

FIGS. 5A to 5Q are plan views that illustrate methods of forming patterns in a wafer by performing a self-aligned double patterning process using modified layouts in accordance with an embodiment of the inventive concepts.

Referring to FIG. 5A, the method may include preparing an initial layout Li, preparing a modified layout Lm by modifying the initial layout Li, and preparing a final layout Lf obtained by modifying the modified layout Lm.

The initial layout Li may include a first design pattern 10, a second design pattern 20, a third design pattern 30, and a fourth design pattern 40. The initial layout Li may include narrow spaces Sn that are between the first design pattern 10 and the third design pattern 30, between the first design pattern 10 and the fourth design pattern 40, between the second design pattern 20 and the third design pattern 30, and between the second design pattern 20 and the fourth design pattern 40, and a wide space Sw that is between the third design pattern 30 and the fourth design pattern 40. As described above, the narrow spaces Sn may have widths that are equal to or less than the limiting resolution, and the wide space Sw may have a width that is equal to or greater than the limiting resolution.

The modified layout Lm may include a first modified design pattern 10m and a second modified design pattern 20m. In the modified layout Lm, the third design pattern 30 and the fourth design pattern 40 of the initial layout Li may be omitted. The first modified design pattern 10m may include a first extra pattern 51 that extends onto the wide space Sw. The first extra pattern 51 may be adjacent to the second modified design pattern 20m or may abut the second modified design pattern 20m. The second modified design pattern 20m may include a second extra pattern 52 that also extends onto the wide space Sw. The second extra pattern 52 may be adjacent to the first modified design pattern 10m or may abut the first modified design pattern 10m. The first extra pattern 51 and the second extra pattern 52 may partly overlap.

The final layout Lf is obtained by modifying the modified layout Lm according to processes to be processed in a process which forms patterns on a wafer using the modified layout Lm. For example, the modified layout Lm is further modified according to a combination of a positive photolithography process which forms a spacer pattern on an outer surface of a perimeter, and a negative photolithography process which forms the spacer pattern on an inner surface of the perimeter. In the embodiments, it will be described that the spacer pattern is formed on an inner surface of the perimeter of the first modified design pattern 10m. Accordingly, a final layout Lf may be separated into a first photo mask layout including the first modified design pattern 10m and a second photo mask layout including the second extended and modified design pattern 20me and a second extended extra pattern 52e. The embodiments of the inventive concept with reference to FIG. 5A will be understood in more detail with reference to FIGS. 2A to 2K.

FIGS. 5B to 5Q are plan views that illustrate methods of forming patterns in a wafer by performing a self-aligned double patterning process using the final layout Lf shown in FIG. 5A, In FIGS. 5B to 5Q, (A) is a longitudinal sectional view taken along line in FIG. 5A, (B) is a longitudinal sectional view taken along line IV-IV' in FIGS. 5A, and (C) is a longitudinal sectional view taken along line V-V' in FIG. 5A. In FIGS. 5B, 5I and 5Q, plan views of the final layout Lf are also provided above each longitudinal sectional view.

Referring to FIG. 5B, the method may include forming a target layer 110a, a lower mask layer 120a, a first upper mask layer 131a, and a first etching mask pattern 161 on a base layer 100. The first etching mask pattern 161 may be formed using a first photo mask PM1 that includes the first modified design pattern 10m shown in FIG. 5A. Accordingly, the first etching mask pattern 161 may define the first modified design pattern 10m. For example, the first etching mask pattern 161 may be substantially the same as the first modified design pattern 10m of the modified layout Lm and/or the final layout Lf in a top view. The second extended and modified design pattern 20me shown in FIG. 5A is virtually indicated in FIG. 5B using a dotted line.

Referring to FIG. 5C, the method may include forming a first upper mask pattern 131 by etching the first upper mask layer 131a using the first etching mask pattern 161 as an etching mask. The first etching mask pattern 161 may be thinned to have a small vertical thickness. In the depicted embodiment, the first etching mask pattern 161 is left on the first upper mask pattern 131. In other embodiments, the first etching mask pattern 161 may be removed after the first upper mask pattern 131 is formed.

Referring to FIG. 5D, the method may include conformally forming a first spacer layer 141a on side surfaces of the first upper mask pattern 131 and side surfaces and an upper surface of the thinned first etching mask pattern 161. Additionally, a first middle mask layer 151a may be formed on the entire surface of the first spacer layer 141a.

Referring to FIG. 5E, the method may include partly removing an upper portion of the first middle mask layer 151a by, for example, performing a planarization process such as an etch-back or CMP process, to form a first middle mask pattern 151 which exposes an uppermost surface of the first spacer layer 141a. As shown in FIG. 5E, an upper portion of the first spacer layer 141a that is formed on an upper surface and sidewalls of the first upper mask pattern 131 and/or the first etching mask pattern 161 may be exposed by the first middle mask pattern 151.

Referring to FIG. 5F, the method may include partly exposing a surface of the lower mask layer 120a by etching the exposed first spacer layer 141a using the first middle mask pattern 151 as an etching mask. A first spacer pattern 141 which partly exposes a surface of the lower mask layer 120a may be formed by this etching process. An upper surface and side surfaces of the first etching mask pattern 161, and side surfaces of the first upper mask pattern 131 may be exposed. The exposed first etching mask pattern 161 may have an etching selectivity with respect to the first spacer layer 141a so that the first etching mask pattern 161 is not substantially etched during the etching of the first spacer layer 141a.

Referring to FIG. 5G, the method may include forming a preliminary lower mask pattern 120p having first trenches T1 which expose parts of an upper surface of the target layer 110a by selectively etching the exposed the lower mask layer 120a.

Referring to FIG. 5H, the method may include removing the first middle mask pattern 151, the first etching mask pattern 161, and the first upper mask pattern 131. In some embodiments, since the first middle mask pattern 151 and the first upper mask pattern 131 include the same material, both may be removed at the same time. The first etching mask pattern 161 may also be removed at the same time. For example, when the first etching mask pattern 161 includes photoresist, and the first middle mask pattern 151 and the first upper mask pattern 131 include silicon oxide having carbon, all three patterns may be removed through an ashing process using oxygen (O2) plasma. Furthermore, when the first etching mask pattern 161, the first middle mask pattern 151, and the first upper mask pattern 131 include the same material, the first etching mask pattern 161, the first middle mask pattern 151, and the first upper mask pattern 131 may be removed at the same time.

Referring to FIG. 5I, the method may include forming a second upper mask layer 132a on the entire surface of the resultant structure, and forming a second etching mask pattern 162 on the second upper mask layer 132a. The second etching mask pattern 162 may be formed using a second photo mask PM2 that includes the second extended and modified design pattern 20me shown in FIG. 5A. Accordingly, the second etching mask pattern 162 may define the second extended and modified design pattern 20me. For example, the second etching mask pattern 162 may be substantially the same as the second extended and modified design pattern 20me shown in FIG. 5A in a top view. The first modified design pattern 10m shown in FIG. 5A is virtually indicated using a dotted line in FIG. 5I.

Referring to FIG. 5J, the method may include thinning the second etching mask pattern 162 so that the second etching mask pattern has a small vertical thickness. A second upper mask pattern 132 may then be formed by etching the second upper mask layer 132a using the second etching mask pattern 162 as an etching mask. In the depicted embodiment, the second etching mask pattern 162 is left on the second upper mask pattern 132. However, in other embodiments, the second etching mask pattern 162 may be removed after the second upper mask pattern 132 is formed.

Referring to FIG. 5K, the method may include conformally forming a second spacer layer 142a on the second upper mask pattern 132 and the thinned second etching mask pattern 162, and forming a second middle mask layer 152a on the entire surface of the second spacer layer 142a.

Referring to FIG. 5L, the method may include partly removing an upper portion of the second middle mask layer 152a by performing a planarization process such as an etch-back or CMP process to form a second middle mask pattern 152 which exposes an uppermost surface of the second spacer layer 142a.

Referring to FIG. 5M, the method may include sequentially etching the exposed second spacer layer 142a using the second middle mask pattern 152 as an etching mask, etching parts of the first spacer pattern 141 that are exposed by the etching of the second spacer layer 142a, and etching parts of the preliminary lower mask pattern 120p that are exposed by the etching of the first spacer pattern 141 to form a second spacer pattern 142 and a lower mask pattern 120 which has second trenches T2 therethrough that expose selected portions of the upper surface of the target layer 110a.

Referring to FIG. 5N, the method may include removing the second middle mask pattern 152, the second etching mask pattern 162, and the second upper mask pattern 132.

Referring to FIG. 5O, the method may include forming a target pattern 110 by selectively etching the target layer 110a using the first spacer pattern 141, the second spacer pattern 142, and the lower mask pattern 120 as etching masks.

Referring to FIG. 5P, the method may include removing the first spacer pattern 141, the second spacer pattern 142, and the lower mask pattern 120.

FIG. 5Q is a pattern layout Lp of patterns formed by the above-described method using the initial layout Li and the modified layout Lm. The pattern layout Lp may include a first final pattern 10p, a second final pattern 20p, a third final pattern 30p and a fourth final pattern 40p. The third final pattern 30p and the fourth final pattern 40p may be naturally formed by forming the first final pattern 10p and the second final pattern 20p by the above-described method. The first final pattern 10p and the second final pattern 20p may include final extra patterns 51 and 52 protruding in a branch shape, respectively. The extra patterns 51 and 52 may be divided to define the third final pattern 30*p* and the fourth final pattern 40*p*, respectively.

Figure 6A:
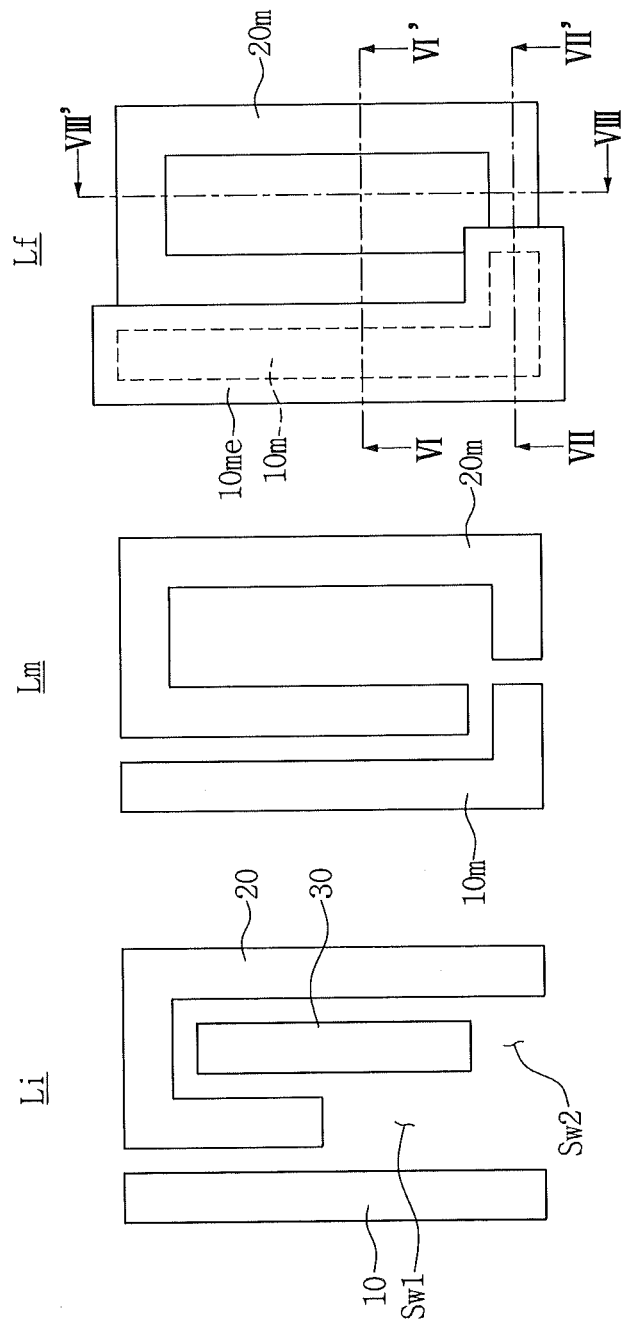

FIGS. 6A to 6Q are plan views that illustrate methods of forming patterns in a wafer by performing a self-aligned double patterning process using modified layouts in accordance with an embodiment of the inventive concepts. Referring to FIG. 6A, the method may include preparing an initial layout Li, a modified layout Lm obtained by modifying the initial layout Li, and a final layout Lf obtained by modifying the modified layout Lm. The final layout Lf may include a first extended and modified design pattern 10*me*.

The initial layout Li may include at least first, second and third design patterns 10, 20 and 30 which are separated, a first wide space Sw1 and a second wide space Sw. The initial layout Li will be understood in more detail with reference to FIG. 3A.

The modified layout Lm may include a first modified design pattern 10*m* and a second modified design pattern 20*m*. In comparison with the initial layout Li, the third design pattern 30 is omitted and removed. The modified layout Lm will be understood in more detail with reference with FIG. 3D.

The final layout Lf is obtained by modifying the modified layout Lm according to processes in a process which forms patterns in a wafer using the modified layout Lm. For example, the modified layout Lm is modified using a positive photolithography process which forms a spacer pattern on an outer surface of a perimeter, and a negative photolithography process which forms the spacer pattern on an inner surface of the perimeter. In the embodiments, a process which forms the spacer pattern on an inner surface of a perimeter of the first modified design pattern 10*m* will be described. Accordingly, the final layout Lf may be separated into a second photo mask layout including the first extended and modified design pattern 10*me* and a first photo mask layout including the second modified design pattern 20*m*.

FIGS. 6B to 6Q are plan views that illustrate methods of forming patterns on a wafer by performing a self-aligned double patterning process using the final layout Lf shown in FIG. 6A. In FIGS. 6B to 6Q, (A) is a longitudinal sectional view taken along line VI-VI' shown in FIG. 6A, (B) is a longitudinal sectional view taken along line VII-VII' shown in FIGS. 6A, and (C) is a longitudinal sectional view taken along line VIII-VIII' shown in FIG. 6A. In FIGS. 6B, 6I and 6Q, plan views of the final layout Lf are also provided above each longitudinal sectional view.

Referring to FIG. 6B, the method may include forming a target layer 110*a*, a lower mask layer 120*a*, a first upper mask layer 131*a*, and a first etching mask pattern 161 on a base layer 100. The first etching mask pattern 161 may be formed using a first photo mask PM1 that includes the second modified design pattern 20*m* shown in FIG. 6A. Accordingly, the first etching mask pattern 161 may define the second modified design pattern 20*m*. For example, the first etching mask pattern 161 may be substantially the same as the second modified design pattern 20*m* of the modified layout Lm in a top view. The first etching mask pattern 161 may include one of a photoresist pattern, or a silicon nitride pattern, silicon oxynitride pattern, or polysilicon pattern that is formed using a photoresist pattern. The first extended and modified design pattern 10*me* shown in FIG. 6A is virtually indicated using a dotted line in FIG. 6B.

Figure 6C:
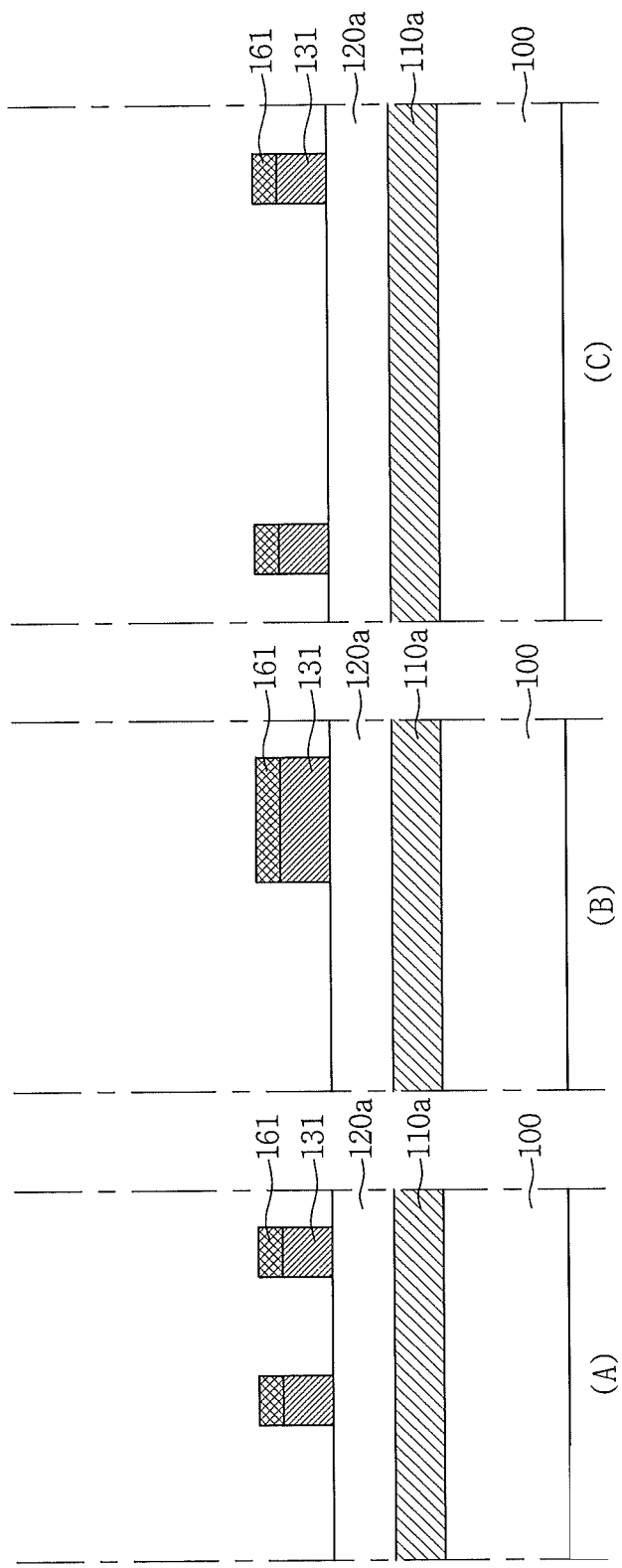

Referring to FIG. 6C, the method may include forming a first upper mask pattern 131 by etching the first upper mask layer 131*a* using the first etching mask pattern 161 as an etching mask. The first etching mask pattern 161 may be left on the first upper mask layer 131*a*, as shown in FIG. 6C. However, it will be appreciated that in other embodiments the first etching mask pattern 161 may be removed after the first upper mask pattern 131 is formed.

Figure 6D:
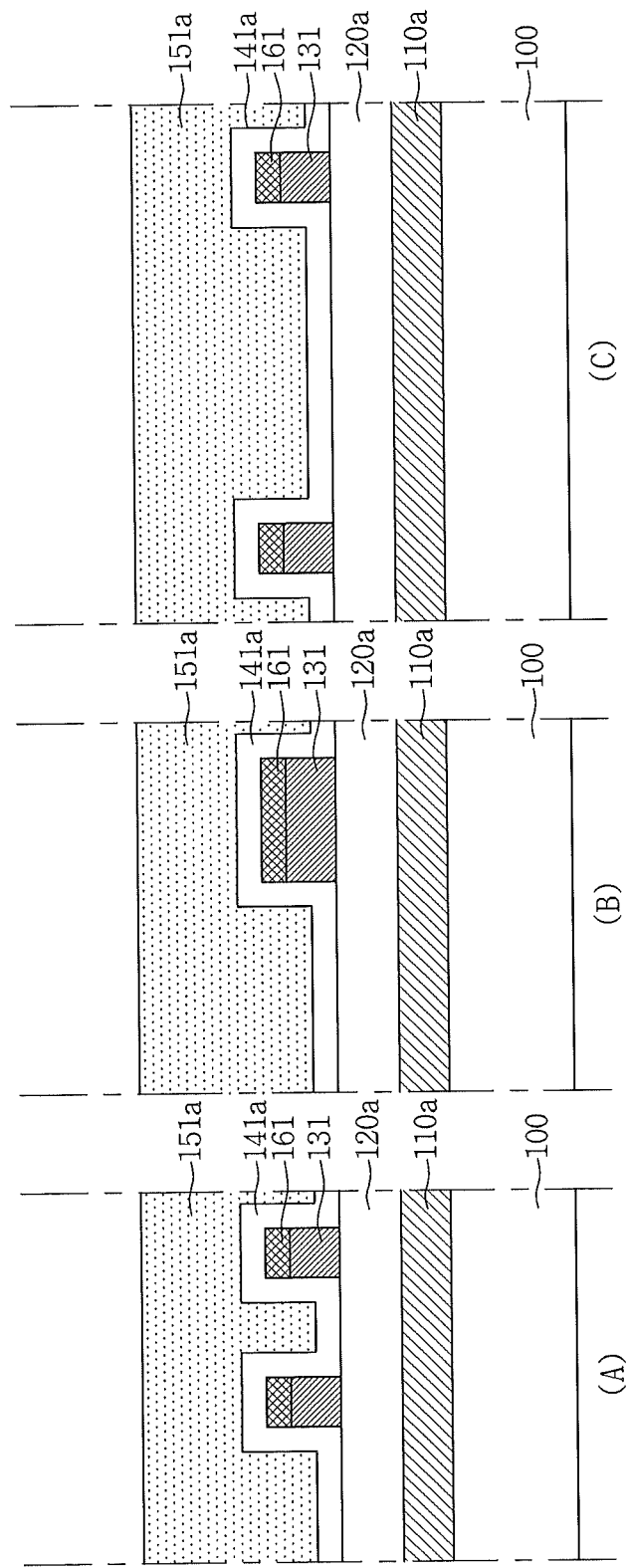

Referring to FIG. 6D, the method may include conformally forming a first spacer layer 141*a* on side surfaces and an upper surface of the first upper mask pattern 131, and forming a first middle mask layer 151*a* on the entire surface of the first spacer layer 141*a*.

Figure 6E:
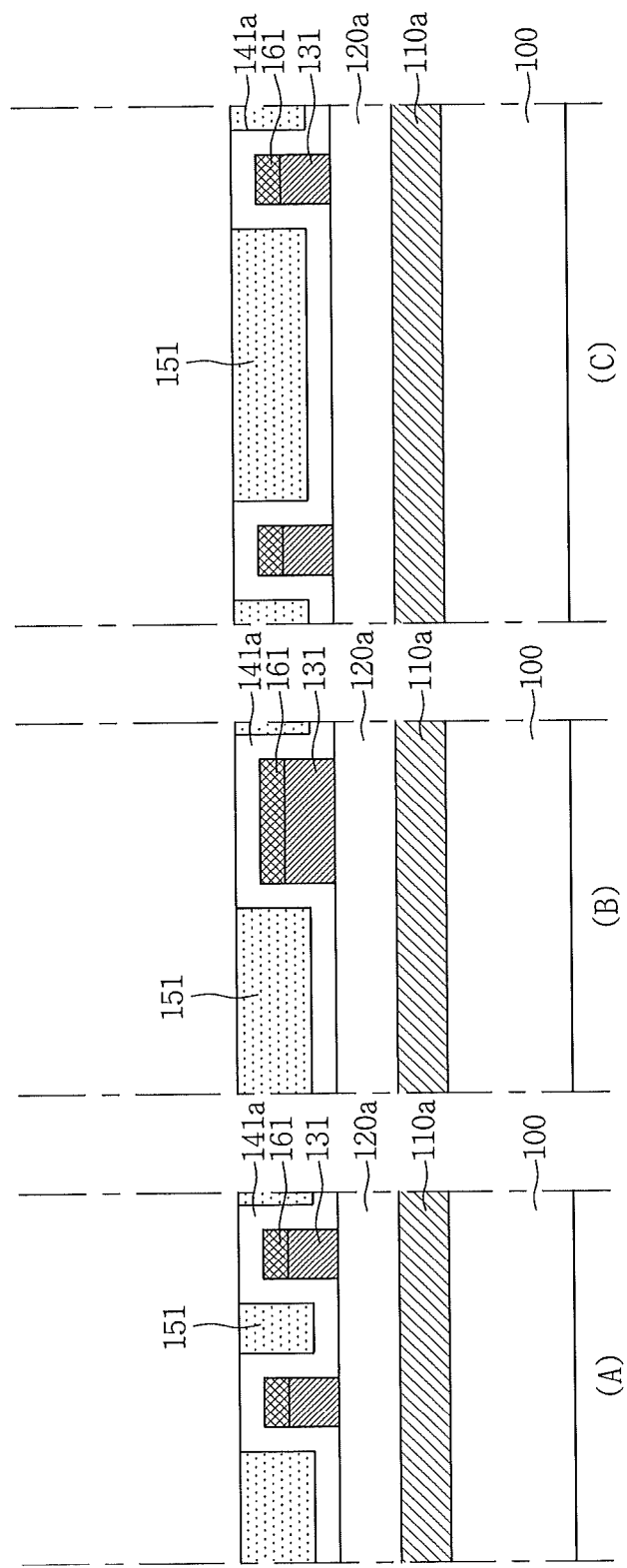

Referring to FIG. 6E, the method may include forming a first middle mask pattern 151 which exposes an uppermost surface of the first spacer layer 141*a* by partly removing an upper portion of the first middle mask layer 151*a* by performing a planarization process such as an etch-back or CMP process. An upper surface of the first spacer layer 141*a* that is formed on an upper surface and sidewalls of the first upper mask pattern 131 and/or the first etching mask pattern 161 may be exposed by the first middle mask pattern 151.

Referring to FIG. 6F, the method may include forming a first spacer pattern 141 by etching the exposed first spacer layer 141*a* using the first middle mask pattern 151 as an etching mask. This etching process may partly expose a surface of the lower mask layer 120*a*.

Figure 6G:
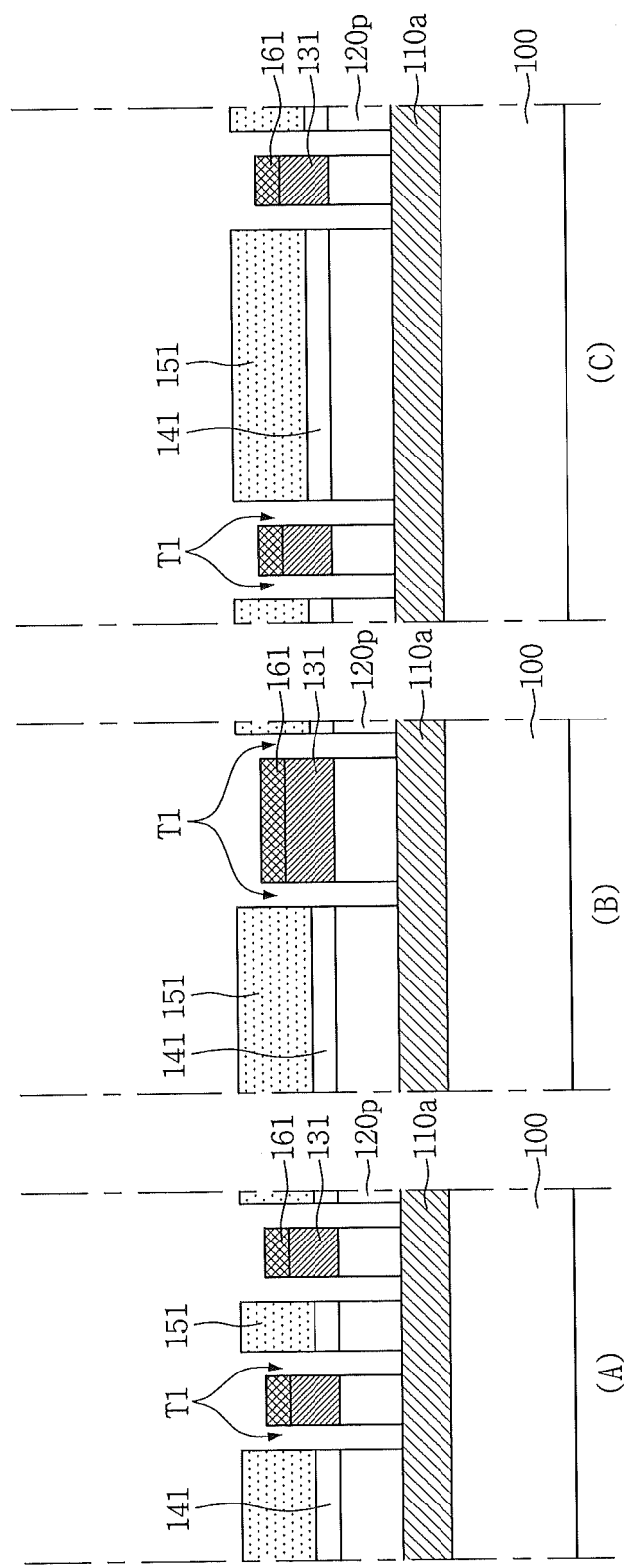

Referring to FIG. 6G, the method may include forming a preliminary lower mask pattern 120*p* having first trenches T1 which expose a part of an upper surface of the target layer 110*a* by selectively etching the exposed lower mask layer 120*a*.

Figure 6H:
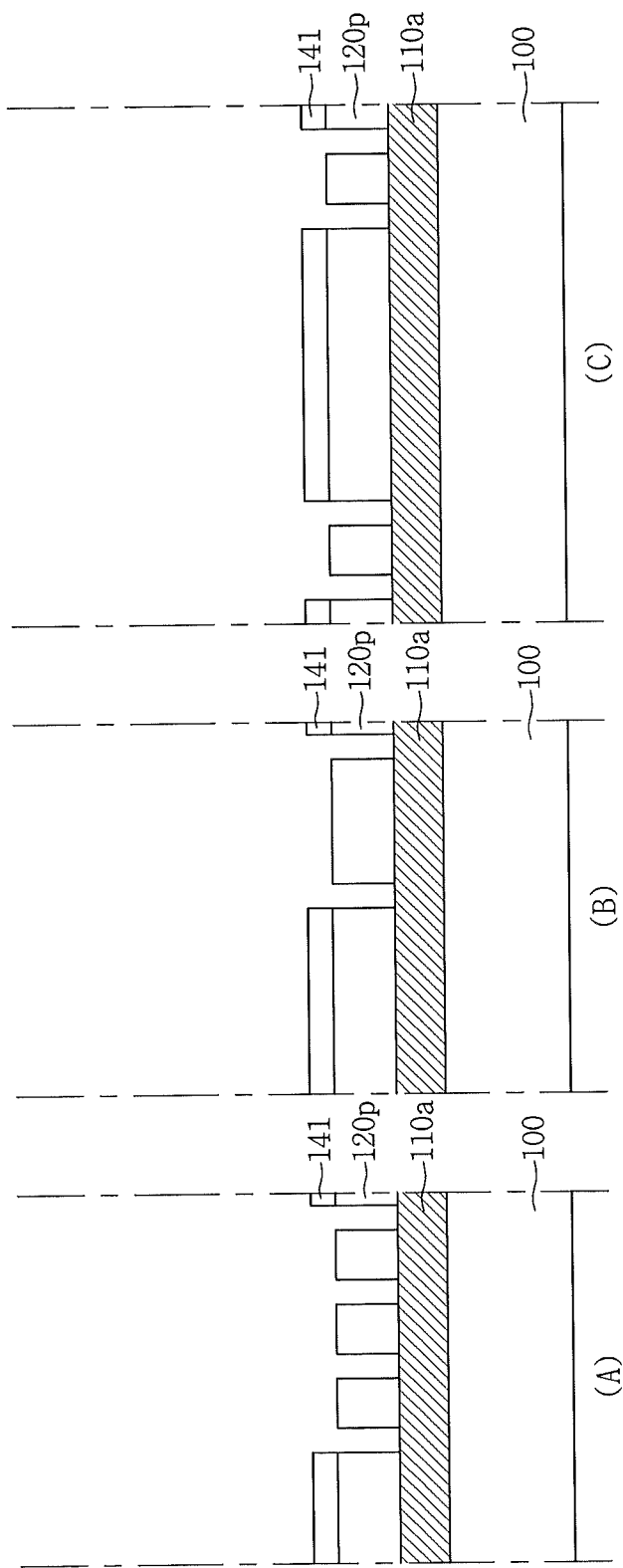

Referring to FIG. 6H, the method may include removing the first middle mask pattern 151, the first etching mask pattern 161, and the first upper mask pattern 131.

Referring to FIG. 6I, the method may include forming a second upper mask layer 132*a* on the entire surface of the resultant structure, and forming a second etching mask pattern 162 on the second upper mask layer 132*a*. The second etching mask pattern 162 may be formed using a second photo mask PM2 that includes the first extended and modified design pattern 10*me* shown in FIG. 6A. Accordingly, the second etching mask pattern 162 may define the first extended and modified design pattern 10*me*. The second modified design pattern 20*m* shown in FIG. 6A is virtually indicated using a dotted line in FIG. 6I.

Figure 6J:
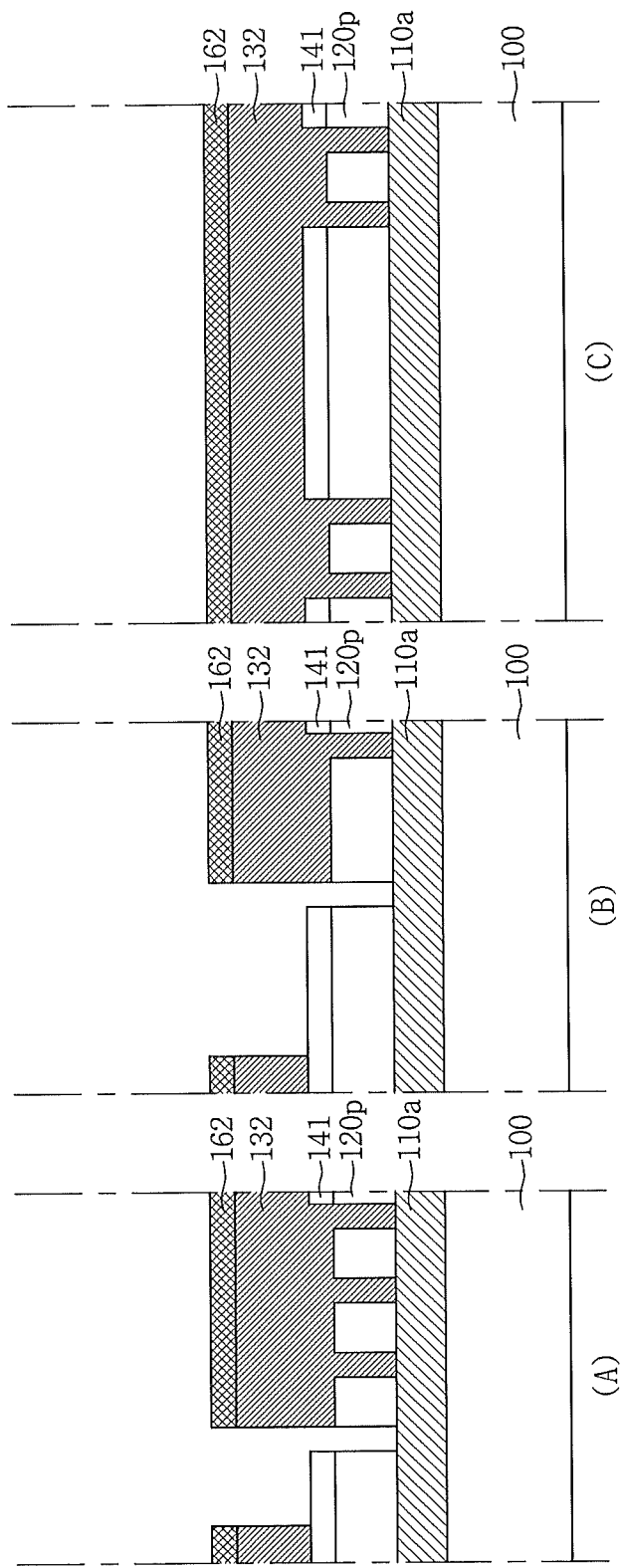

Referring to FIG. 6J, the method may include forming a second upper mask pattern 132 by etching the second upper mask layer 132*a* using the second etching mask pattern 162 as an etching mask. The second etching mask pattern 162 may be left on the second upper mask pattern 132 in some embodiments, but the second etching mask pattern 162 is removed in the present embodiment.

Referring to FIG. 6K, the method may include conformally forming a second spacer layer 142*a* on the second upper mask pattern 132 after the second etching mask pattern 162 is removed, and forming a second middle mask layer 152*a* on the entire surface of the second spacer layer 142*a*. The second spacer layer 142*a* may fill the first trenches T1.

Figure 6L:
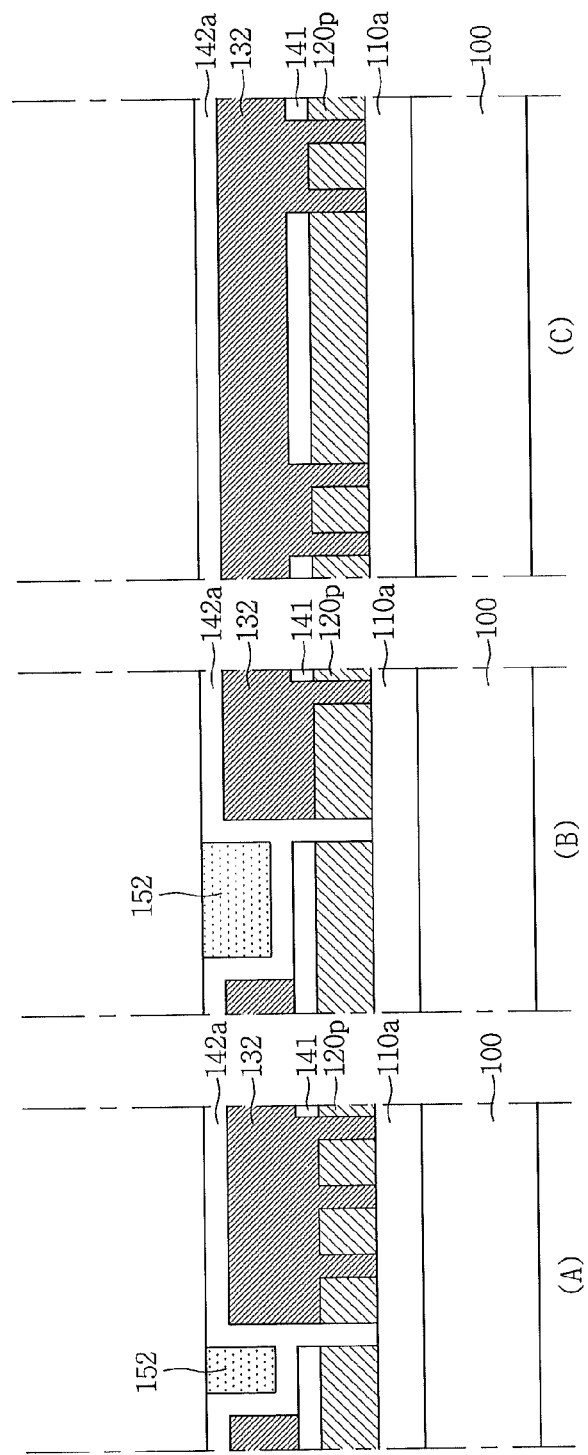
Figure 60:
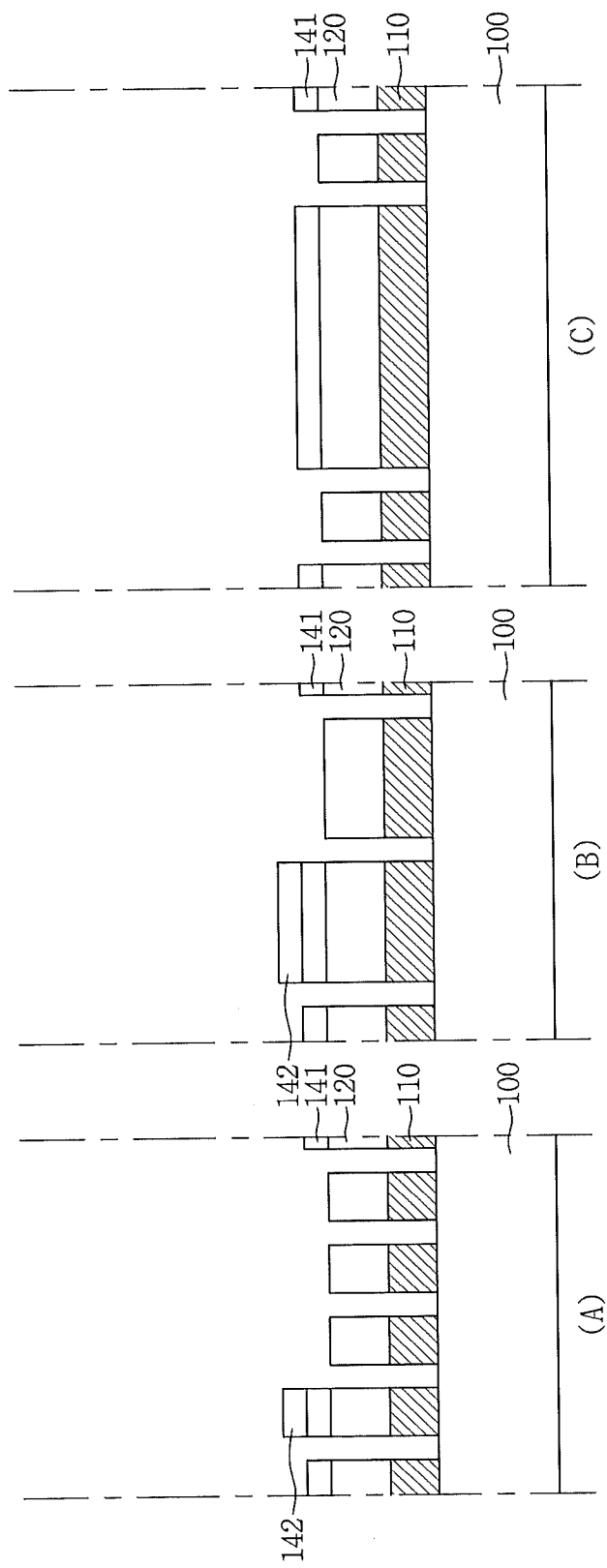

Referring to FIG. 6L, the method may include forming a second middle mask pattern 152 which exposes an upper surface of the second spacer layer 142*a* by partly removing an upper portion of the second middle mask layer 152*a* by performing a planarization process such as an etch-back or CMP process.

Referring to FIG. 6M, the method may include etching the exposed second spacer layer 142*a* using the second middle mask pattern 152 as an etching mask, and etching exposed portions of the first spacer pattern 141 and portions of the preliminary lower mask pattern 120*p* to form a second spacer pattern 142 and a lower mask pattern 120 along with second trenches T2 that expose portions of the upper surface of the target layer 110a.

Referring to FIG. 6N, the method may include removing the second middle mask pattern 152, the second etching mask pattern 162, and the second upper mask pattern 132. The lower mask pattern 120, the first spacer pattern 141, and the second spacer pattern 142 may remain on the target layer 110a.

Referring to FIG. 6O, the method may include forming a target pattern 110 by selectively etching the target layer 110a using the first spacer pattern 141, the second spacer pattern 142, and the lower mask pattern 120 as etching masks.

Figure 6P:
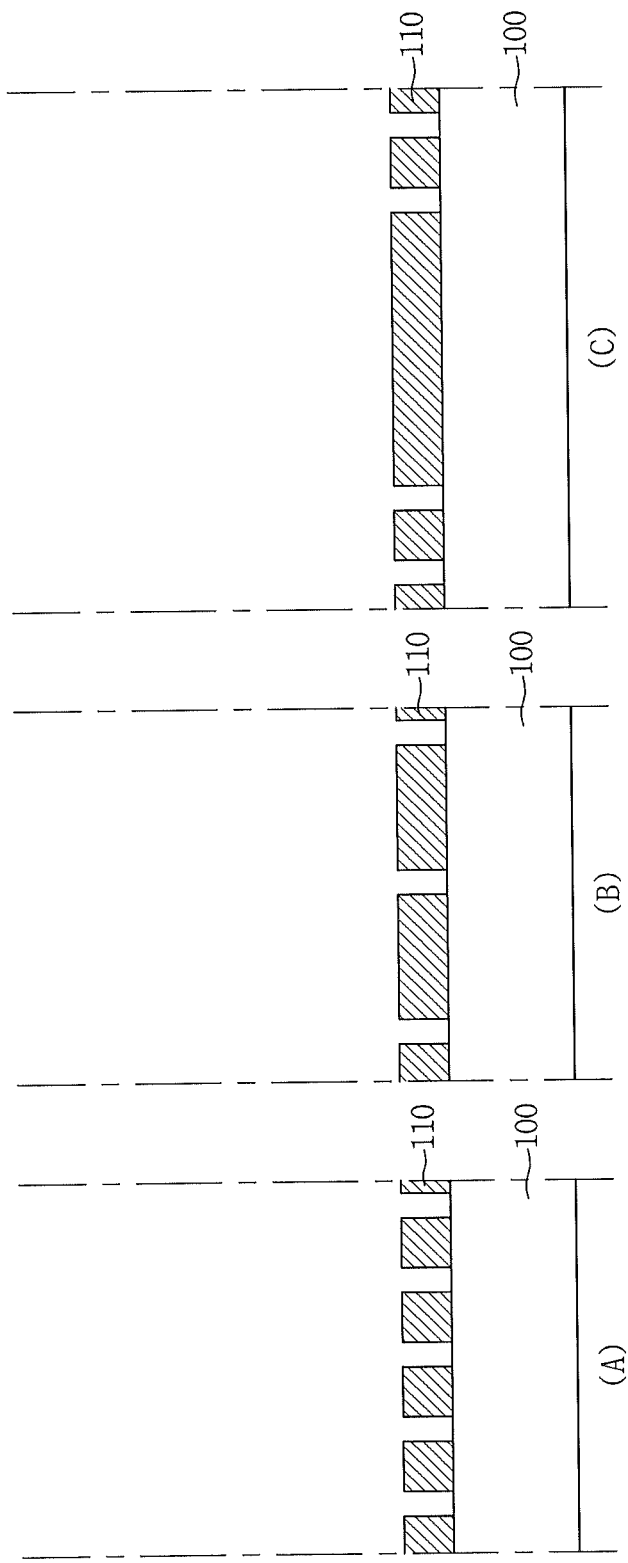

Referring to FIG. 6P, the method may include removing the first spacer pattern 141, the second spacer pattern 142, and the lower mask pattern 120.

FIG. 6Q is a view in which a pattern layout Lp is compared with the target pattern 110. Referring to FIG. 6Q, the first modified design pattern 10m, the second modified design pattern 20m and the modified layout Lm of the modified layout Lm, and the third design pattern 30 omitted in the final layout Lf are formed in accordance with embodiments of the inventive concepts.

Figure 7A:
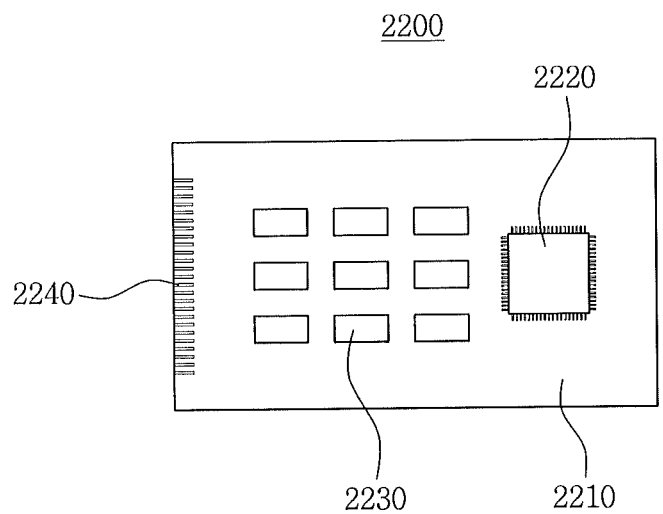
FIGS. 7A to 7C are schematic and bloc diagrams that illustrate a semiconductor module and electronic systems that include semiconductor devices manufactured in accordance with embodiments of the inventive concepts.

FIG. 7A is a schematic view conceptually illustrating a semiconductor module 2200 according to an embodiment of the inventive concepts. Referring to FIG. 7A, the semiconductor module 2200 may include a processor 2220 and semiconductor devices 2230 which are mounted on a module substrate 2210. The processor 2220 and/or the semiconductor devices 2230 may include at least one of semiconductor devices fabricated by various embodiments of the inventive concepts. Input/output terminals 2240 may be disposed on at least one side of the module substrate 2210.

Figure 7B:
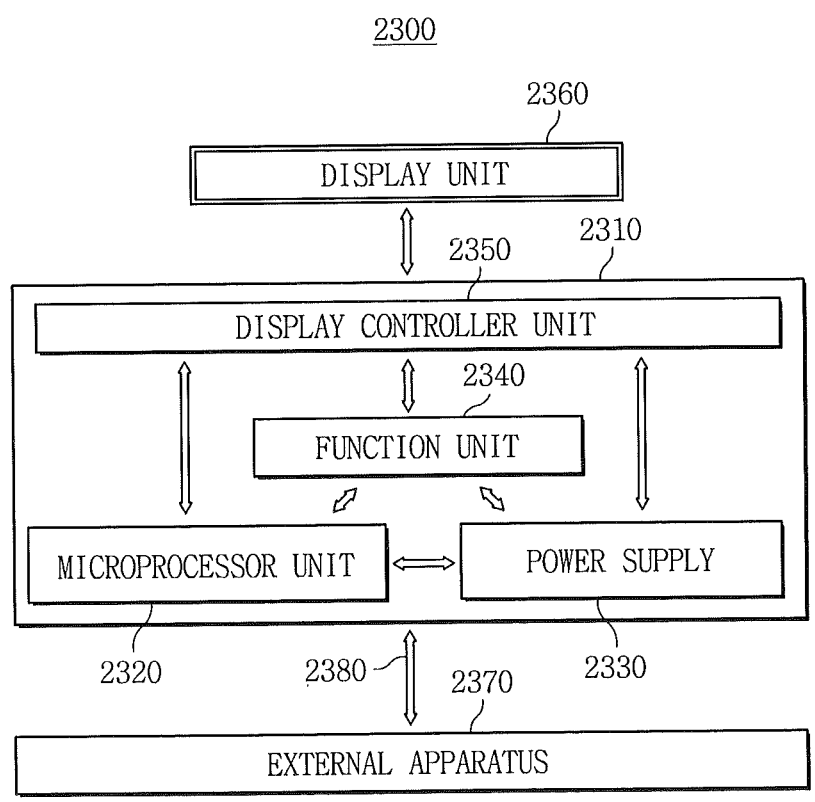
Figure 7C:
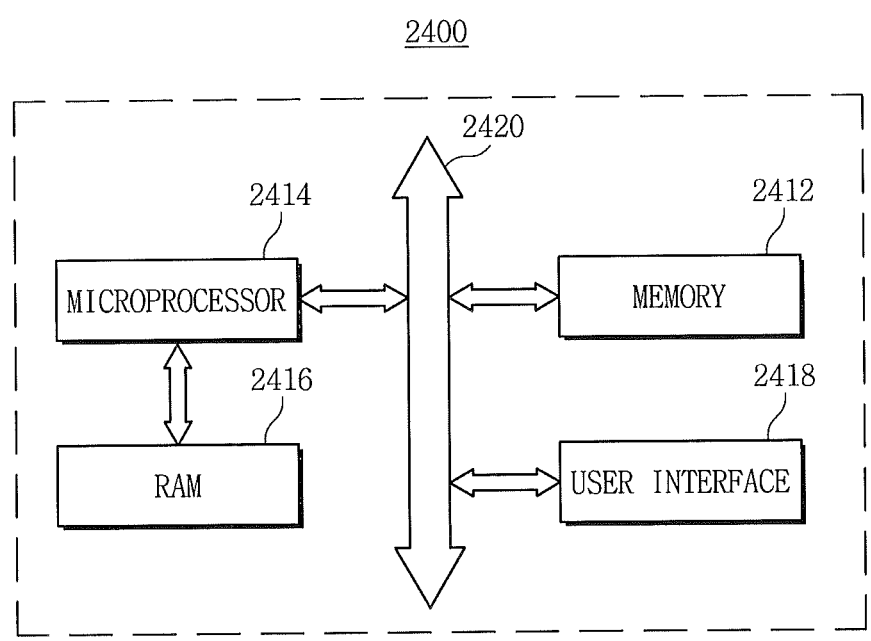

FIGS. 7B and 7C are block diagrams conceptually illustrating electronic systems in accordance with embodiments of the inventive concepts. Referring to FIG. 7B, an electronic system 2300 according to an embodiment of the inventive concepts may include a body 2310, a display unit 2360, and an external apparatus 2370.

The body 2310 may include a microprocessor unit 2320, a power supply 2330, a function unit 2340, and/or display controller unit 2350. The body 2310 may include a system board or mother board having a printed circuit board (PCB) and/or a case. The microprocessor unit 2320, the power supply 2330, the function unit 2340, and the display control unit 2350 may be installed or disposed on an upper surface of or inside the body 2310. The display unit 2360 may be disposed on an upper surface of or inside/outside the body 2310.

The display unit 2360 may display an image processed by the display control unit 2350. For example, the display unit 2360 may include a liquid crystal display (LCD), an active matrix organic light emitting diode (AMOLED), or various display panels. The display unit 2360 may include a touch screen. Accordingly, the display unit 2360 may have an input/output function.

The power supply 2330 may supply a current or voltage to the microprocessor unit 2320, the function unit 2340, the display control unit 2350, etc. The power supply 2330 may include a charging battery, a socket for a dry cell, and/or a voltage/current converter.

The microprocessor unit 2320 may receive a voltage from the power supply 2330 to control the function unit 2340 and the display unit 2360. For example, the microprocessor unit 2320 may include a CPU or application processor (AP).

The function unit 2340 may perform various functions of the electronic system 2300. For example, the function unit 2340 may include a touch pad, a touch screen, a volatile or non-volatile memory, a memory card controller, a camera, a light, a voice and moving picture reproducing processor, a wireless transmitting/receiving antenna, a speaker, a microphone, a USB port, or a unit having various functions.

The microprocessor unit 2320 or the function unit 2340 may include at least one of semiconductor devices fabricated by various embodiments of the inventive concepts.

Referring to FIG. 7C, an electronic system 2400 according to an embodiment of the inventive concept may include a microprocessor 2414, a memory system 2412 and a user interface 2418 which perform data communication through a bus 2420. The microprocessor 2414 may include a CPU or AP. The electronic system 2400 may further include a RAM 2416 that is in direct communication with the microprocessor 2414. The microprocessor 2414 and/or the RAM 2416 may be assembled in a package. The user interface 2418 may be used to input information into the electronic system 2400 or output information from the electronic system 2400. For example, the user interface 2418 may include a touch pad, a touch screen, a keyboard, a mouse, a scanner, a voice detector, a cathode ray tube (CRT) monitor, an LCD, an AMOLED, a plasma display panel (PDP), a printer, a light, or various input/output devices. The memory system 2412 may store operating codes of the microprocessor 2414, data processed by the microprocessor 2414, or externally input data. The memory system 2412 may include a memory controller, a hard disk, or a solid state drive (SSD). The microprocessor 2414, the RAM 2416, and/or the memory system 2412 may include at least one of semiconductor devices fabricated by various embodiments of the inventive concepts.

In accordance with various embodiments of the inventive concepts, a layout design method can form a modified layout obtained by modifying at least one pattern in an initial layout which has independent patterns having three or more shapes.

When the modified layout is used, three or more independent patterns can be formed through a self-aligned double patterning process which performs a photolithography process twice.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method of patterning a wafer, comprising:
preparing an initial layout having a first design pattern, a second design pattern, and a third design pattern, where the third design pattern is between the first design pattern and the second design pattern, and wherein a distance between a portion of the third design pattern and a portion of one of the first design pattern and the second design pattern is less than a resolution of a photolithography apparatus;
extracting a first sub-layout that includes the first design pattern and a second sub-layout that includes the second design pattern from the initial layout;

forming a first modified sub-layout that includes a first modified design pattern obtained by modifying the first design pattern of the first sub-layout;

generating a modified layout that includes the first modified sub-layout and the second sub-layout;

generating a final layout that includes the second sub-layout and a first extended and modified sub-layout that is formed by modifying the first modified sub-layout;

forming a first photo mask that includes the second sub-layout;

using the first photo mask to form a first etching mask pattern and etching the wafer using the first etching mask as an etch mask;

forming a second photo mask that includes the first extended and modified sub-layout; and using the second photo mask to form a second etching mask pattern and etching the wafer using the second etching mask as an etch mask.

2. The method of claim 1, wherein the first design pattern, the second design pattern, the third design pattern and the first modified design pattern are patterns displayed on a computer monitor.

3. The method of claim 1, wherein the first sub-layout comprises only the first design pattern and the second sub-layout comprises only the second design pattern.

4. The method of claim 1, wherein the modified layout excludes the third design pattern.

5. The method of claim 1, wherein the initial layout further comprises a first space which is between the first design pattern and the second design pattern and adjacent the third design pattern, wherein the first space has a greater width than the third design pattern.

6. The method of claim 5, wherein the initial layout further comprises a second space disposed between the first design pattern and the third design pattern, and a third space disposed between the second design pattern and the third design pattern, and the first space has a greater width than the second space and the third space.

7. The method of claim 5, wherein the first modified design pattern comprises a first extra pattern that is connected to the first design pattern and that extends onto the first space from the first design pattern to overlap the first space.

8. The method of claim 1, wherein the first design pattern, the second design pattern and the third design pattern are geometrically separated.

9. A method of patterning a wafer, comprising:

preparing an initial layout including a first design pattern, a second design pattern that extends parallel to the first design pattern, a third design pattern disposed between the first design pattern and the second design pattern, a fourth design pattern disposed between the first design pattern and the second design pattern, the third and fourth design patterns including co-linear segments that are separated by a space that is between the third design pattern and the fourth design pattern;

forming a modified layout that includes a first modified design pattern obtained by modifying the first design pattern and a second modified design pattern obtained by modifying the second design pattern, wherein the first modified design pattern includes the first design pattern and a first extra pattern that extends from the first design pattern onto the space, and the second modified design pattern includes the second design pattern and a second extra pattern that extends from the second design pattern onto the space;

forming a first photo mask that includes the first modified design pattern;

forming a second photo mask that includes the second modified design pattern and an additional pattern; and using the first and second photo masks in a double patterning process to pattern the wafer.

10. The method of claim 9, wherein the third design pattern is substantially the same as the third final pattern, and the fourth design pattern is substantially the same as the fourth final pattern.

11. The method of claim 9, wherein the first extra pattern is between the third final pattern and the fourth final pattern.

12. The method of claim 9, wherein the wafer is patterned to include the third design pattern and the fourth design pattern as well as a first final pattern that corresponds to the first design pattern with a first additional stub and a second final pattern that corresponds to the second design pattern with a second additional stub.

* * * * *